United States Patent [19]

Finster et al.

[11] 3,761,906

[45] Sept. 25, 1973

[54] TAPE SYSTEM

[75] Inventors: Leslie P. Finster, Ilion; William J. Kelley, Sauquoit; Erich Otto Naegele, Herkimer; Richard J. Petkovsek, Middleville; Trevor D. Reader, New Hartford; Warren A. Reynolds, Ilion; Torkjell Sekse, Utica; Ernesto G. Sevilla, Herkimer; William A. Sours, Sauquoit, all of N.Y.

[73] Assignee: Cogar Corporation, Wappingers Falls, N.Y.

[22] Filed: Jan. 8, 1971

[21] Appl. No.: 104,931

[52] U.S. Cl. .......... 340/174.1 A, 226/196, 308/305, 340/174.1 H

[51] Int. Cl. .......... G11b 5/02

[58] Field of Search .......... 340/174.1 A, 174.1 H; 226/196; 242/76; 308/305, 386, 345

[56] References Cited

UNITED STATES PATENTS

| | | | |
|---|---|---|---|
| 3,500,385 | 3/1970 | Padalino et al. | 340/174.1 H |
| 3,097,779 | 7/1963 | Rock et al. | 226/196 |
| 3,593,327 | 7/1971 | Shill | 340/174.1 C |
| 3,229,045 | 1/1966 | Bakos et al. | 226/196 |
| 3,109,573 | 11/1963 | Sameshima | 242/76 |
| 3,209,340 | 9/1965 | Pingey | 340/174.1 C |
| 3,541,271 | 11/1970 | Joslow et al. | 340/174.1 C |
| 3,404,391 | 10/1968 | Chur | 340/174.1 H |
| 3,467,955 | 10/1969 | Poumakis | 340/174.1 H |
| 3,537,084 | 10/1970 | Behr | 340/174.1 H |
| 3,585,619 | 6/1971 | Cogzr | 340/174.1 H |
| 3,560,947 | 2/1971 | Franchini | 340/174.1 H |
| 3,593,088 | 7/1971 | Pantelakis | 318/345 |
| 3,560,828 | 2/1971 | Koboyashi et al. | 318/345 |
| 3,317,806 | 5/1967 | Farinelli | 318/305 |
| 3,674,942 | 7/1972 | Sugaya | 179/100.2 ZA |
| 3,656,761 | 4/1972 | Laschewski | 179/100.2 Z |

*Primary Examiner*—Vincent P. Canney
*Attorney*—Gottlieb, Rackman & Reisman and Harry M. Weiss

[57] ABSTRACT

A tape system having a loader for properly positioning a tape cartridge. The cartridge includes an internal supply reel which is adapted to rotate freely within the cartridge housing when the cartridge is mounted, by means of the loader, onto the supply drive spindle. A spring in the supply drive spindle forces the supply reel to assume a free rotation orientation. The position of the cartridge within the loader is such that lowering the loader causes an eyelet attached to the recording tape in the supply reel of the cartridge to be affixed to a clasp attached to a permanent leader element coupled to the tape deck take-up reel. A plurality of electromechanical sensors on the tape deck is responsive to loading and locking steps to initiate specific electronic actions relating to the tape drive and the data control functions performed by the system processor. The tape is guided past the read/write heads by two pairs of double-post guides. Changes in the tape speed are controlled by a DC command generator which includes a smoothing circuit for controlling a gradual change from one tape speed to another. A tracking window is provided for correctly recovering phase-modulated data from the tape even as the tape speed varies. A control circuit is provided for verifying the presence of a data block.

62 Claims, 23 Drawing Figures

INVENTORS
LESLIE P. FINSTER
WILLIAM J. KELLY
ERICHO. NAEGELE
RICHARD J. PETKOVSEK
TREVOR D. READER
WARREN A. REYNOLDS
TORKJELL SEKSE
ERNESTO G. SEVILLA
WILLIAM A. SOURS

BY Gottlieb Rackman & Reisman
Harry M. Weiss
ATTORNEYS

TAPE SYSTEM

This invention relates to tape systems and more particularly to a tape system which is simple to operate, highly reliable, and capable of manufacture at a relatively low cost.

Current developments in several important industrial areas have marked the increasing need for information recording and dissemination apparatus. Of primary significance in this regard is the new equipment required to prepare, store and present the large quantities of information which must be preserved and to which access is then necessary. Similarly, other fields are also utilizing some of the latest advances in information storage and retrieval, although in somewhat different ways. Two examples of these related fields of activity are in data processing, where information is stored and read out, and in consumer electronics, where various recording media are utilized generally for entertainment purposes.

In both of the foregoing illustrative fields, one of the leading media for the needed recording and playback is magnetic tape. And as fields such as these have developed, so have the techniques for preparing tape for recording, loading it into machines and automating the various steps associated with the use of the tape, such as motor operation, "reading" (or playback) and "writing" (or recording). One desirable and widely accepted improvement in this technology is the use of tape cassettes, which facilitate storage (e.g., when a tape unit is not mounted in a machine) and also the loading of tape into the machine. Cassettes of various designs have been evolved, but there have often been problems of friction and wear with respect to the constant rotation required of the tape reels which actually carry the tape within the cassettes. Such factors detract from the usefulness of tape cassettes.

The use of tape cassettes has not completely eliminated the problem of reliably introducing the initial portion of the tape into the active elements of the machine so that the read and write steps can commence immediately with no need for threading and with no substantial delay. While self-threading devices and closed tape loop arrangements (which eliminate the need for threading per se) have been devised, these solutions have not been completely satisfactory in the context of providing a complete and integrated tape-based system. Thus careful manual supervision of the loading of cassettes is still often required, and the loading step itself has not been sufficiently routinized to preclude errors. Moreover, once the loading has been accomplished, most systems then overlook the problem of subsequent supervision over the position of the cassette and the attendant importance of retaining the cassette on the tape deck, particularly before all the tape has been rewound. Premature withdrawal of the cassette (e.g., by negligent or careless handling) can cause and indeed has caused critically important data-bearing tape to be either mutilated or destroyed subsequent to correct loading.

The prior art has also tended to consider the cassette loading problem as a strictly "mechanical" one, involving only the placement of the cassette in a position to supply or receive tape. Once the loading step has been completed, separate electronic controls may be energized (either manually or automatically) to achieve the necessary power and operation steps such as the application of tension to the tape drive, responding to the initial tape advance to give special instructions to control the system, and furnishing additional information to the control unit based on the cassette loading step. The integration of electronic sensing equipment and the mechanical design features enables the system to be directly responsive to the cassette and its loading, and this has also been largely ignored heretofore.

It is therefore an object of this invention to obviate one or more of the aforesaid difficulties.

It is also an object of this invention to improve the structure of a tape cartridge to enhance the ease of tape movement.

It is another object of this invention to permit loading of a tape cartridge to be more easily accomplished.

It is a further object of this invention to positively prevent the withdrawal of a tape cartridge from a tape deck at a time after recording tape has emerged from the cartridge and prior to the completion of rewind.

It is still another object of this invention to integrate the system electronics with the loading and positioning equipment.

In a tape system, it is necessary to properly guide the tape past the read and write heads. As the tape moves past the heads, it should not be possible for it to have varying angular positions during recording and reading. Otherwise, it would be possible for the orientation of the tape to be different during playback from its orientation during recording. In the case of data tapes, where data is recorded at a high density, if the tape changes orientation it is possible to read the data incorrectly during playback.

Prior art tape guide systems have been of several types, all of which have shortcomings. For example, prior art tape guides have been known to stretch one edge of the tape or to clog with dirt; in the alternative, relatively expensive tape guide systems have been used, and even these have had shortcomings.

It is another object of our invention to provide a relatively simply yet highly reliable tape guide system.

In many tape systems, it is possible to move the tape in either direction, and in many cases at more than one speed. In a typical data processing application, DC command inputs specify the direction and speed required of the tape. Although the command inputs are step functions, it is not desirable to have the system attempt to change the tape speed and/or direction instantaneously. The tape tension may be so great in such a case that the tape can break. A smoothing circuit is generally provided to smooth the command signals. The inputs to the command generator circuit are in the form of DC steps. The output of the command generator in every case is a gradually changing DC level, the level changing from a value representative of the old tape speed and direction to a value representative of the new tape speed and direction. In the prior art, DC command generator circuits have been relatively complex, primarily to account for all possible transitions from one DC level to another.

It is another object of our invention to provide a DC command generator of minimum complexity which is capable of generating many different smoothing functions.

In data processing applications employing a phase modulation technique, in order to recover the significant data it is necessary to reject non-significant zero crossings in the data estimination process. To separate significant zero crossings from non-significant zero crossings, in the presence of a varying data rate, complex circuits have generally been required to generate a time window which tracks the data rate; in fact, this window is referred to as a "tracking window."

It is another object of our invention to provide a tracking window circuit which has a broad tracking range (up to several hundred percent and down to 30 percent of the nominal data rate) and a fast pull-in characteristic, does not exhibit false locks and is relatively simple in design.

In data processing applications it is also necessary to verify the leading and trailing edges of blocks of data. This is usually accomplished by checking for the presence or absence of particular bit sequences. Prior art bit sequence detectors have also been relatively complex in design.

It is another object of our invention to provide a bit sequence detector which is highly reliable yet of very simple design.

Additional objects and advantages of this invention will become apparent when considered together with a description of one particular illustrative embodiment of the invention in which a tape system is disclosed. The basic construction of the tape deck included in the system includes the principal tape advance and associated mechanical equipment on the upper surface of the deck, with the drive mechanism and certain responsive electromechanical equipment on the undersurface of the deck. Any electronic circuitry which may be used to control the tape advance functions and the recording and playback function may be mounted on printed circuit boards on the undersurface of the tape deck.

The tape deck comprises a supply reel and a take-up reel at opposite ends of the tape deck. Attached to the take-up reel is a permanent tape leader element which is threaded around a friction capstan and a first pair of tape guide posts, past the write and read heads to a second pair of tape guide posts and finally to a leader clasp. When no cartridge has been loaded on the deck, the leader clasp sits in a home slot in a locator and guide block affixed to the upper surface of the tape deck. The leader clasp is adapted to receive the leading edge of the recording tape from the tape cartridge when the cartridge is mounted onto the tape deck — in particular, the clasp comprises two upwardly projecting posts, the first of which is permanently attached to an eyelet of the tape leader element and the second of which is adapted to receive and grip an eyelet attached to the leading edge of the magnetic tape wound on the cartridge supply reel. Thereafter, when any tape movement occurs, the leader clasp will link the leader and the tape and will pull the tape through the tape path towards the take-up reel, and, ultimately, will pull the tape back towards the supply reel during rewind.

Drive motors are associated with each of the supply and take-up drive reels and are adapted to apply equal and opposite pulling forces to the tape even when the system is not actually advancing tape. Thus, when a tape cartridge has been loaded onto the tape deck as will be described below, the motors are energized and apply torque to their respective shafts in opposite directions (i.e., clockwise for one and counterclockwise for the other). Such opposed directions of motor torque are sufficient to apply the necessary tension to the tape, with the resultant friction forces eliminating any problem attributable to imbalance between the two drive motors. The actual tape motion and direction of travel are determined by the motion of a friction capstan, which may be a cylindrical rubber roller mounted on a shaft extending from a capstan motor affixed to the underside of the tape deck. The friction capstan is positioned outwardly of the take-up reel, so that a substantial portion of its outer periphery is in contact with the tape or leader during all phases of operation — this insures positive pulling control for the capstan with respect to the tape.

The supply drive hub has an upper projecting spindle or shaft in which is mounted a spring clip having two opposed arms which project beyond the cylindrical periphery of the shaft. The spring arms are adapted to mate with one of several pairs of corresponding grooves in the internal wall of the supply reel central hole, or aperture. When the cartridge is lowered onto the supply drive shaft, the opposing spring arms are compressed inwardly and are initially held in that compressed position as the supply drive shaft commences its initial rotation (e.g. when tape tension is applied). However, as soon as the driveshaft rotates sufficiently to bring the compressed spring arms into alignment with any pair of opposed grooves in the aperture of the tape supply reel, the arms will spring outwardly into these slots, thus establishing a firm gripping relationship between the drive shaft and the cartridge supply reel. Moreover, the drive shaft, with its contained spring, and the cartridge with its tape supply reel, are so dimensioned that when the spring arms are captured by the grooves in the supply reel aperture, the supply reel is pulled down firmly onto the supply reel hub and thereby forced to assume a free riding position with respect to the cartridge housing. In this orientation, the supply reel makes no external contact with the cartridge housing; the only external contact from the supply reel is with the supply drive shaft and its underlying flange. Positive and free-moving rotation of the cartridge supply reel is thereby assured.

The mounting of the tape cartridge onto the supply drive hub, together with the linking up of the recording tape eyelet and the leader clasp, are facilitated by the use of a loading carriage hinged to the upper surface of the tape deck. The loader is initially positioned substantially vertically for the tape cartridge to be placed in the loader's receiving cavity. This cavity is located at one end of the loader and is adapted to overlie the supply drive hub of the tape deck when the loader is lowered onto the tape deck. The loader and the receiving cavity portion thereof are dimensioned so that the inner aperture of the tape supply reel of the loaded cartridge will mate with the upwardly projecting supply drive shaft when the loader is lowered onto the tape deck. As described above, this mating relationship serves to force the cartridge down onto the supply drive shaft, compressing the spring arms which project from opposite sides of the shaft. Subsequently, after rotation of the drive shaft commences, the compressed spring arms will ultimately expand into one of the pairs of opposed grooves in the interior periphery of the supply reel aperture.

In addition, after the cartridge is placed in the receiving cavity of the loader, and the loader is subsequently lowered onto the tape deck surface during the loading operation, the lead eyelet of the cartridge will be coupled to the forward retaining post of the leader clasp, thus joining the leader and the magnetic tape contained within the cartridge. This coupling is mandated by the position of the cartridge in the loader in conjunction with the position of the leader clasp in the "home" slot in a locator and guide block on the surface of the tape deck. Unless both of these orientations have been correctly assumed (i.e., the cartridge in the receiving chamber of the loader and the leader clasp correctly positioned in the home slot), the tape eyelet will not become coupled to the retaining post of the leader clasp and tape advance cannot commence. However, the system is arranged such that the simple step of placing the tape cartridge in the receiving cavity of the loader, followed by lowering the loader towards the upper surface of the tape deck, will compel the coupling of the tape eyelet to the leader clasp as long as the leader clasp is in its normal rest position in the home slot.

This latter position for the leader clasp is also established by a further mechanical attribute of the invention: a locking lever, which is moved into a locking position with respect to the loader after the loading step has been completed. Prior to the loading, the locking lever is in the unlocked position. When the locking lever is in the unlocked position, a lug attached to the shaft of the locking lever forces the leader clasp into the proper position in the home slot so that the retaining post of the clasp is aligned to receive the eyelet of the magnetic tape in the cartridge when the loader is lowered onto the tape deck. The lug of the locking lever also serves to prevent the displacement of the leader clasp prior to lowering the loader to the tape deck and before the locking lever is moved into the locking position after loading has been completed. Moreover, in order for the loader to be lowered onto the tape deck, the locking lever must be in the unlocked position; accordingly, the lug attached to the shaft of the locking lever must similarly be in the position forcing the leader clasp to be in proper alignment with the tape eyelet of the cartridge. This alignment procedure insures that the correct portion of the leader clasp will be in position to receive the tape eyelet during the loading step.

Upon loading, the initial contact between the cartridge in the loader and the tape deck occurs with respect to the supply drive shaft and the inner periphery of the cartridge supply reel, and also between the eyelet of the tape and the leader clasp. These elements engage upon the lowering of the loader onto the tape deck. Subsequently, a dual locking arrangement is employed to preclude premature elevation of the loader after it has been lowered onto the tape deck to commence operation of the system, and even more significantly, after tape has begun to be removed from the tape cartridge and is moving past the heads and towards the take-up reel. Such improper movement of the loader at any time after the loading step has been completed could result in severe problems such as mutilating the tape, losing data, recording erroneous data and the like.

The first step in the locking procedure is the manual movement of the locking lever to a locked position in which the lever handle itself overlies the loader in the loaded position. This is accomplished by rotating the locking lever approximately 90° from a first clearance position adjacent to a rectangular cutout in the upper surface of the loader, to a second locked position in which the lever is in contact with a stop on the upper surface of the loader, with the lever thereby being in a fixed position precluding vertical movement of the loader.

The second aspect of the locking arrangement involves the commencement of tape movement. It will be recalled that prior to loading, the leader clasp was compelled to be in the home slot position by virtue of the blocking position of the lug attached to the locking lever shaft. By the same movement of the locking lever from its unlocked position to the locking position to keep the loader in place, the lug which had previously blocked the movement of the leader clasp is concurrently rotated out of the blocking position into a clearance position. Accordingly, the leader clasp, now having attached to it the magnetic recording tape from the cartridge by virtue of the attached eyelet, is free to move towards the tape-up reel when drive power is applied to the system. When the system commences operation, and the leader clasp begins to proceed on the path towards the take-up reel and tape is being withdrawn from the supply reel of the cartridge, the actual withdrawal of the leader clasp from the home slot causes a locking catch, mounted on the upper surface of the tape deck, to engage a catch lip on the loader and thereby further retain the loader in the loaded position.

This locking catch is normally urged towards the locking position by virtue of a spring arm of a microswitch mounted to the undersurface of the tape deck — the microswitch spring arm's bias is transmitted, by means of a connecting lever, both to the home slot position and to the locking catch. However, when the leader clasp is nearing the end of its travel and moving toward the home position (i.e., during rewind), the lever, which includes a ramp portion, is forced downward against the urging of the microswitch spring arm, thus returning the locking catch to the clearance position. It remains in this position so long as the leader clasp stays in the home slot. As soon as the clasp is withdrawn from the home slot as the tape begins to move in the forward direction towards the tape-up reel, the ramp portion of the connecting lever will no longer be restrained in its attempt to move upwardly under the urging of the microswitch spring arm. Accordingly, the ramp will be elevated in response to the removal of the leader clasp from the home position and the locking catch will also be moved into the locked position with respect to the catch lip on the loader itself. This locking arrangement will be maintained as long as the tape is not fully rewound into the cartridge.

In addition, this locking catch feature is essentially independent of the main locking lever, since the accidental movement of the locking lever to the unlocked position, after loading, and starting the tape in a forward direction, will still not permit the loader to be elevated. In order for the loader to be raised, both the locking lever and the locking catch must return to their clearance positions, the former by manual movement of the lever and the latter by full rewinding of the tape into the supply reel of the cartridge. It is only when these two steps have been taken (and no damage can be done to the cartridge or the tape), that the loader can again be elevated and placed in the loading position.

The system of this invention also integrates several electronic functions with the loading, positioning and locking mechanisms described above. Initially, when the cartridge is placed in the receiving cavity of the loader and the loader is lowered onto the tape deck, two related electronic elements are enabled. Both of these elements comprise upwardly spring-biased pins projecting through the surface of the tape deck — the bias for each of these pins is supplied by a microswitch spring arm on which each pin rests, the microswitches being attached to the undersurface of the tape deck. The first such pin normally mates with a clearance hole in the cartridge loader — when no cartridge is present in the loader and the loader is lowered onto the tape deck, the clearance hole will pass over and around the first spring-biased pin, causing no responsive action. However, when a cartridge is present in the loader and the loader is lowered onto the tape deck, the cartridge itself occupies a space immediately above the clearance hole and forces the first spring-biased pin downward against the urging of the spring arm of the microswitch. The activation of this "cartridge-loaded" microswitch informs the system that a cartridge has been loaded into the tape deck.

The cartridge is also equipped with a removable "write enable" pin or plug, which can optionally be inserted in a cavity in the undersurface of the cartridge housing. The purpose of this plug is to control certain of the electronic functions which the system is to be permitted to perform with respect to the tape of that particular cartrdige — for example, it may well be that the tape in the cartrdige contains important data which must be retained and not erased. If that is the case, the system must be instructed not to write on the tape, and to read only therefrom. On the other hand, if the tape is either blank or contains data which may be read out and then erased, the write function of the system should not be inhibited. The "normal" condition of the cartridge is therefore established to inhibit the writing function unless the control cavity is occupied by the write enable plug. In these normal circumstances, therefore, when the cartridge in the loader is lowered onto the tape deck, the control cavity will accommodate fully the second spring-biased pin with no contact between them. The system electronics is thereby informed that no writing is to be permitted with respect to this particular tape cartridge and that data is only to be read therefrom. On the other hand, when a tape is blank and is to be written on, or contains data which need not be preserved, the write enable plug will be inserted in the control cavity of the cartridge and thus will make contact with the spring-biased pin upon lowering of the loader onto the tape deck. This will depress the pin against the urging of the spring arm of a microswitch, energizing this microswitch and removing the inhibition which had existed with respect to the write function. The system electronics can then operate to perform both write and read functions with respect to the tape contained in that cartridge.

Following the loading in of a tape cartridge, in which the "cartridge-loaded" sensor has been activated, the locking lever is moved into its locking position with respect to the loader. When this position of the locking lever is assumed, a bracket attached to the shaft of the locking lever contacts a spring arm on a third microswitch mounted on the undersurface of the tape deck. The series combination of this switch and the cartridge-loaded switch in the operated states serves to apply tape tension to the system. Specifically, the drive motors for both the supply and take-up reels are thereby energized to apply equal and opposite forces to the tape. However, in the absence of a specific instruction to energize the friction capstan which drives the tape in either the forward or the reverse direction, the tape will not yet commence its movement.

Following the loading step, which activates the two spring-biased pins connected to the sensors attached to the undersurface of the tape deck, and also subsequent to the locking step which causes tape tension to be applied to the system, a fourth electronic sensor is arranged to detect the departure of the leader clasp from the home slot position when tape movement commences. As previously noted, the auxiliary catch arrangement for the loader itself is part of a lever having a ramp-like projection which is normally biased upwardly into the home slot. However, when the leader clasp is in the home slot (prior to any advance), the clasp serves to depress the ramp portion of that lever, which in turn depresses an integral arm of the lever which projects downwardly through the tape deck onto a spring arm of the fourth microswitch. The presence of the leader clasp in the home slot therefore maintains this microswitch in the operated condition until tape movement commences. The electronics of the system is thereby informed that the tape is fully within the cartridge and that reading or writing of data cannot begin until the leading end of the tape has advanced to the read and write heads. After forward tape movement has begun, the leader clasp leaves the home slot and begins to move towards the take-up reel. In leaving the home slot, the ramp member then moves upward in response to the urging of the spring arm of the underlying microswitch. The microswitch thereby moves to an unoperated position, advising the system electronics that at least some portion of the recording tape has been withdrawn from the cartridge. With this microswitch in the unoperated condition after the clasp has left the home slot position, reverse drive power (i.e., rewind) can be applied to the tape; when the leader clasp returns to the home slot position and the microswitch is once again operated, capstan turning can be inhibited and the take-up reel motor can be driven harder so that the take-up reel stops quickly.

It is therefore a feature of an embodiment of this invention that a tape deck includes an attached loading device to facilitate mounting a tape cartridge accurately on the deck.

It it another feature of an embodiment of this invention that a tape deck includes positioning apparatus to correctly align a tape cartrdige, in a loading device, with drive and locking apparatus on a tape deck.

It is a further feature of an embodiment of this invention that dual locking protection is provided against the improper removal of a tape cartridge during the operation of a tape deck system.

It is yet another feature of an embodiment of this invention that a tape cartridge is constructed with an inner supply reel adapted to ride freely within the cartridge housing in accordance with the mounting geometry of the tape deck.

It is also a feature of an embodiment of this invention that retaining means on the supply reel drive spindle establishes free rotational orientation of the supply reel following the mounting thereon of the tape cartridge.

It is still another feature of an embodiment of this invention that electromechanical sensors mounted on a tape deck are responsive to the loading thereon of a tape cartridge to control a plurality of electronic functions.

The need for accuracy of tape travel, which the prior art has not been able to comply with consistently, can best be demonstrated in connection with a specific but typical example. Thus, in a high speed data processing system including tape as the recording medium, it may be desired to have a data concentration of as much as 1600 bits per inch. Where such concentrations of data are involved, a slight angular change of alignment of the tape between write and read operations can result in the recorded data being skewed relative to the gap in the read head. This results in poor signal definition and can cause significant data errors. If the tape is not guided past a write head in the correct orientation, some "skew" will be present during the write cycle, and the attendant flux changes may cause apparently erroneous data entries when attempts are made to recover the data. During the read cycle, tape "skew" with respect to the read head can similarly lead to an incorrect read-out.

The solutions to this problem offered by the prior art have been of some complexity and have not been fully equal to the task. Most tape systems utilize some form of stationary posts to guide the tape to and from the read and write heads. In the common tape recorder used in many homes, a single cylindrical guide post is used, with a recess or cut-out in its outer periphery to accommodate the travelling tape element. The width (i.e., height) of the cut-out is almost precisely equal to the width of the tape, thus making the alignment of the tape and the guide post cut-out quite critical. This type of fixed guide system even using two such posts as is often done, is not adequate for the high concentrations of data referred to above, since the tape frequently tends to curl towards the horizontal surface along either the top or bottom flange of the cut-out, and this curling leads to poor skew control, and hence to data errors as previously noted. One suggested prior art technique of making the laterally fixed guides axially rotatable has not significantly reduced the number of errors created as a result of this problem.

Since one of the main difficulties with fixed guides is their inability to allow for any tape movement in the axial direction without leading to immediate data errors, the data recording art has come forward with a guide comprising one fixed and one spring-biased movable flange, together defining a recess or cut-out. The "normal" dimension between the two inner flange surfaces is slightly less than the width of the tape, and the tape normally rides in the guide slot with one edge against the inner surface of the spring-biased flange (which may take the form of a washer) which slides on a pin to accommodate the slight deviations from correct axial alignment, thus avoiding the curling effect. The "solution" of providing a spring-loaded washer to act as a flange often brings more problems than it eliminates — the flange's aperture can easily become clogged with dirt or some particles of the tape's magnetic coating. Since the washer-flange, once assembled, is difficult if not impossible to clean or lubricate, such an arrangement, although used in some sophisticated data processing system, has led to maintenance difficulties.

Besides using other guide post geometries (e.g., partially conical), the prior art also utilizes specific circuitry to attempt to electronically correct the problems created by the lack of tape alignment. In such "skew correcting" circuits where multiple channels of data are involved, it is possible to correct for timing errors (e.g., by comparison between channels, or with a master timing signal), but it is generally not possible to correct a signal the intensity of which is either too low or even totally missing due to excessive skew. If the tape skew has caused a magnetic signal to be recorded on the tape at too low a recording intensity, external circuitry cannot selectively improve the integrity of the signal. Finally, it is recognized that a better overall approach would be to try to avoid such data errors in the first instance, thus eliminating the need for additional circuits and the delay required to permit such circuits to perform their limited correcting functions.

In accordance with the principles of our invention, in the path of movement of the tape between the supply cartridge and the take-up reel are a first pair of stationary non-rotatable guide posts, the write and read (i.e., record and playback) heads and a second pair of comparable non-rotatable guide posts. (An alternate embodiment of the invention, to be described below, utilizes a single guide post, with upper and lower flanges, on one side of the heads, with a pair of guide posts as described herein on the other side of the heads.) In addition, between one pair of such guide posts and the take-up reel is a friction capstan which controls the speed and direction of motion of the tape. Each individual guide post serves to complement its adjacent guide post in aligning the tape with respect to the tape heads. For purposes of this general introduction, the description with respect to one such pair of guide posts will be sufficient.

Specifically, considering a pair of guide posts located between the supply cartridge and the write head, the outermost guide post (i.e., the one closest to the supply cartridge) has generally a T-shape cross-section, with a main cylindrical post rising into a larger upper cylinder forming a surrounding shoulder or flange. Tape travelling past this guide post and towards the write head is free to move in a vertical direction, sliding along the main center shaft, until it comes into contact with the surrounding upper flange. The contact between the upper edge of the tape and the lower inner surface of the surrounding flange of the post serves to limit the direction of upward movement of the tape. Accordingly, based on this first guide post, there can be some deviation of vertical tape orientation in the downward direction, but deviation upwardly is restricted by the presence of the upper shoulder.

The second guide post (the one closest to the write head) has what might be termed an "inverse" construction to the first one, namely, it has a free standing upper shaft portion, with a lower surrounding flange. The relevant portion of this guide post can be considered to have the cross section of an inverted T and thus provides a limitation on the sliding excursion of the tape in a downward direction. On the other hand, this second guide post has no structural limitation on the upper sliding tape motion referred to previously. Since the two guide posts are closely adjacent to each other, however, the upper limiting flange on the first guide post and the lower limiting flange on the second guide post act in tandem to provide an overall limitation on the axial deviational motion of the tape as it travels towards the write head. Relative to an undeflected tape, there is actually an "interference" between the flanges and the tape. This interference constrains the tape to act as a spring, which, due to the tension in the tape, causes the two posts and the tape to act like a spring-loaded guide. In particular, the two guide posts, considered together, serve to provide both upper and lower surfaces for guiding the tape; however, by providing such guide surfaces on separate guide posts, this invention avoids the problems which have plagued the prior art.

In actual practice, th first or outermost guide post, in receiving the upper edge of the tape in contact with the lower surface of the upper flange, acts to force the tape slightly downwardly. Then, when the tape having this slight bias reaches the second innermost guide post, the tape's vertical motion downwardly is limited and stopped by the contact between the lower edge of the tape and the upper surface of the lower flange on that second guide post. In being so limited, the tape essentially "springs" downward into contact with the lower flange of the second guide post and accordingly, exhibits a very slight lateral deflection. However, the distance between the second guide post and the write head is the path of travel of the tape is sufficiently long such that the tape tension in the system keeps the data-bearing portion of the tape against the heads.

In this construction, therefore, the first outermost guide post acts as a "preliminary" guide to generally align the tape. The significant final control with respect to aligning the tape from the guide posts with the write head is accomplished by means of the second guide post. The upper surface of the lower flange on the second guide post is aligned with the write head in a manner to insure that if the tape is properly aligned with that controlling flange surface in the tape guide path, then the tape will also be aligned properly with the effective portion of the write head.

The overall result of the two guide posts operating to complement each other is that the first guide post, with its upper flange, acts to generally align the vertical orientation of the tape and to give a "coarse" alignment. The second guide post, with its lower flange coming into contact with the lower edge of the tape, serves to give the "fine" alignment and passes the now aligned tape on to the write head.

It is therefore a feature of an embodiment of this invention that a pair of stationary guide posts is utilized on at least one side of the recording heads to insure accurate travel of recording tape past the heads.

It is also a feature of an embodiment of this invention that complementing guide flanges on adjacent guide posts serve to guide and align recording tape to and from the heads, with the configuration of the posts and the tape tension of the system acting as a "spring-loaded" guide with respect to the tape.

It is another feature of an embodiment of this invention that one guide post of a pair of such guide posts includes a flange to limit tape deviation in one direction, while the adjacent post of the same pair includes a flange to limit tape deviation in the opposite direction.

It is a further feature of an embodiment of this invention that one of a pair of tape guide posts complements the other post of that same pair with respect to aligning tape moving toward or away from the recording heads of a tape deck.

It is yet another feature of an embodiment of this invention that a pair of complementing one-flange guide posts is arrayed on one side of a tape deck's recording heads, while a single two-flange guide post is located on the other side of the heads, all to achieve proper alignment of the tape with respect to the heads.

In the illustrative tape system, four different command signals may control forward and reverse, and slow and fast speed combinations. The magnitude and polarity of the DC command represents the desired speed and direction. The output of the command generator is used as the input to a servo system whose output drives a DC motor. An error signal is developed in accordance with the motor speed to cause the motor speed to track the input signal. Although the magnitude of the step command represents the desired final speed of the motor, it is apparent that the input signal to the servo system should not change instantaneously. If the input jumps suddenly, an abrupt change in the speed of the mtoor may cause such a large stress to be applied to the tape that the tape stretches beyond its elastic limit. For this reason, the output of the command generator should not change abruptly. Instead, it should change only gradually at a rate which controls the motor speed to build up at a fast enough but safe rate.

Prior art circuits which have been employed for this purpose have generally been complex in design. For example, when one considers that in a system having two directions and two speeds there are five possible DC command signals (stop, slow-forward, fast-forward, slow-reverse, fast-reverse), and that a transition must often be possible from any condition to any other condition (e.g., slow-forward to fast-reverse), it is apparent that the smoothing function circuitry can become exceedingly complex. To go from slow-forward to fast-reverse, for example, the smoothing function must necessarily be different from that required to go from slow-forward to stop.

In accordance with the principles of our invention, DC input step commands (of either polarity depending upon the desired change in direction) are applied to one or both inputs of an operational amplifier. The output of the amplifier, the terminal at which the smoothed command function is generated, is connected back to one of the input terminals through a parallel combination of a resistor and a capacitor. In parallel with the resistor and capacitor is a pair of series connected resistors, the junction of which is connectable through a switch to ground. Depending upon whether the switch is open or closed, the output signal rises to either of two levels at a respective rate.

As will be described in detail below, the additional series-connected resistors allow the feedback impedance to be changed selectively, and thus determine both the final output level and its rate of rise. The capacitor serves two functions. First, because the voltage across it cannot change instantaneously, it causes the output voltage to change gradually in response to a step input (the smoothing function). Second, the capacitor functions as a memory; the voltage across the capacitor represents the output signal (the present speed) at any time. The capacitor voltage is extended back to an input of the operational amplifier. The input to the operational amplifier is the sum of two signals, one representing the present motor speed and the other representing the desired speed. Because the capacitor voltage represents the instantaneous motor speed, whenever a new speed command is extended to the circuit the smoothing function, which is controlled by the capacitor voltage, is necessarily dependent upon the present speed. In this manner, the same smoothing circuit can be used no matter what kind of transition is required.

It is a feature of our invention, in the illustrative embodiment thereof, to provide an operational amplifier with a feedback circuit having parallel connected resistor and capacitor elements, with the resistor elements including at least two serially connected resistors the junction of which can be selectively connected to ground.

In magnetic surface recording devices (disc, drum and tape), the Manchester recording technique (also known as "phase modulation") is widely used for high-density recording. The recorded data consists of significant zero crossings which contain the binary information, and non-significant crossings which provide the phase transitions between successive bits of the same sense. In order to recover the significant data, it is necessary to reject the non-significant zero crossings in the data estimation process.

To separate significant zero crossings from non-significant zero crossings, a "time window" is usually generated. This window is synchronized to the significant data rate and "brackets" the significant zero crossings to the exclusion of the non-significant crossings. The window, which is a gating signal used to turn on a gate only when significant zero crossings are anticipated, can be generated in a two-step process. First, each significant zero crossing triggers a time delay circuit. The time delay is slightly shorter than the time period between significant zero crossings. The trailing edge of the time delay pulse triggers a window pulse generator. The width of the window pulse is such that it brackets the time at which the next significant zero crossing is expected.

If the data rate is fixed, time delay and gate window pulse generators having fixed pulse widths can be employed. However, in practice a varying data rate is usually encountered. In a tape drive, for example, the capstan which drives the tape generally reaches its nominal speed very quickly and then rotates at this speed. However, the tape does not move in an identical manner because in effect it is a high-Q spring. A "ringing" effect in the tape speed is observed whenever the tape drive is turned on. It is apparent that if the tape speed varies, so does the data rate. To separate significant and non-significant zero crossings, the time window must follow the data rate in two respects. First, the faster the rate, the earlier that the leading edge of the window must occur following each significant zero crossing. Second, the faster the rate, the shorter the necessary window pulse. Servo loops have been used to control the timing window in this manner, e.g., with the use of phase-locked oscillators with auxiliary timing logic, or controlled delays using radar range techniques (such as split-gate error detection circuits). Since the time window tracks the data rate it is in fact referred to as a "tracking window." In general, the prior art tracking window circuits have been relatively complex, have exhibited relatively narrow tracking ranges, have had relatively slow pull-in characteristics and have been known to falsely lock in on sub-harmonics and harmonics of the nominal signal frequency.

In accordance with the principles of our invention, each significant zero crossing triggers a delay pulse generator. The width of the delay pulse is a predetermined percentage, e.g., 75 percent, of the nominal period between significant zero crossings. At the trailing edge of the delay pulse, a window pulse is generated, the window pulse having a duration which is another fixed percentage, e.g., 50 percent, of the nominal period between significant zero crossings. The window pulse is designed to bracket the next significant zero crossing to the exclusion of an intermediate non-significant zero crossing if such a crossing exists.

If the data rate increases, the widths of both the time delay and window pulses are shortened. Similarly, if the data rate decreases, the widths of both pulses increase. Both pulse widths are controlled such that the leading and trailing edges of the window follow the average data rate and bracket each significant zero crossing. The pulse width variations are controlled by the delay pulse and window pulse waveforms.

The time delay waveform consists of a series of time delay pulses, and the window waveform consists of a series of window pulses. If the duty cycle of each waveform is maintained constant, the time window will automatically track the significant zero crossings.

Each significant zero crossing triggers a one-shot time delay multivibrator. The trailing edge of each time delay pulse triggers a one-shot time window multivibrator. All that is required for the window to track the significant zero crossings is to maintain a fixed duty cycle for each multivibrator. This, in turn, simply requires that the average output of each multivibrator remain constant.

What is equally significant is that the same circuit can be used to keep the duty cycles of the two multivibrators at fixed (different) values. As will be shown below, any change in the average data rate requires the same percentage change in the two duty cycles. Since the same percentage change is required for both, the same error control signal can be used to vary the pulse widths of the two multivibrators.

It is a feature of our invention, in the illustrative embodiment thereof, to provide delay and window controlled one-shot multivibrators in a data recovery tracking window circuit, the duty cycles of both of which are maintained at fixed values.

It is another feature of our invention, in the illustrative embodiment thereof, to derive a single error control signal for adjusting the pulse widths of both multivibrators.

In magnetic recording systems data bits are generally recorded in blocks, with gaps separating successive blocks. As soon as a predetermined number of bit signals exceeding a threshold value and a minimum data rate have been detected, it is an indication that a block of data is being read. Similarly, when the rate of minimum-magnitude bit signals falls too low, it is an indication that the end of the block has been reached.

When a high-speed search is being performed, typically data blocks are counted as they pass by a read head. It is important that the correct number of data blocks be counted. If, for example, a portion of the tape in the middle of a block is defective, the bit signals which should be detected may not exceed the threshold value. In such a case, the system might determine that a gap has been reached and one block of data will actually be counted as two blocks. It is for this reason that a momentary loss of data bits should not be treated as the end of a block.

In a typical system, the following two criteria might be imposed: (1) data bit signals exceeding the threshold value must be detected at a minimum data rate (e.g., one data bit/64 microseconds) for at least two milliseconds before the system will consider that a new block is being read, while (2) the loss of data bit signals for one millisecond will be considered to indicate that the end of the data block has been reached. Such a circuit would be only one of several data recovery timing circuits included in an overall system. Other timing and threshold circuits are required for other purposes. The block detector circuit described above is only illustrative of that class of circuits which provide different timing intrevals at the leading and trailing edges of data blocks. In its broad aspects, a circuit of the type described can be considered to be a bit sequence detector circuit which requires the continuous detection of successive bit signals exceeding a minimum rate for a first time interval to indicate a first condition and the absence of such bit signals for a second time interval to indicate a second condition.

With three different timing functions having to be performed, it is generally necessary to provide at least three one-shot multivibrators inter-connected so as to allow three different time intervals to be measured — the time period between successive bit signals, the time period during which successive bit signals are present at the start of a data block, and the time period during which no bit signals are detected at the end of the data block.

In accordance with the principles of our invention and with reference to the illustrative pulse widths, a first re-triggerable one-shot multivibrator having a pulse width of 200 microseconds is utilized to detect successive data bit signals occurring at a rate exceeding the minimum data rate. Before data bit signals are detected, the second multivibrator is triggered at regular clock intervals. But as soon as the first multivibrator is successively triggered by data bit signals, the second multivibrator is allowed to time out. This occurs after two milliseconds and is an indication that a new data block has been entered.

When the second multivibrator times out, it causes the pulse width of the first multivibrator to be increased to one millisecond. This means that the second multivibrator is not triggered again until one millisecond has elapsed without the detection of a data bit signal. When one millisecond has elapsed in this manner, the first multivibrator times out and the second multivibrator is then continuously re-triggered. This in turn, causes the first multivibrator timing interval to be reset at 200 microseconds.

A DC level is normally present at the output of the second multivibrator. When the DC level terminates it is an indication that a data block is being read. This happens only after data bit signals occuring at least once every 64 microseconds have been detected for two milliseconds. When the DC level again appears at the output of the second multivibrator, it is an indication that the end of the data block has been reached. This happens only after no bit signal has been detected for one millisecond (to allow for a momentary loss of data bit signals as a result of dirt, defective tape, etc. without resulting in the erroneous counting of two data blocks). The three timing functions are accomplished with the use of only two re-triggerable one-shot multivibrators by having the state of the second multivibrator determine the timing period of the first multivibrator.

It is a feature of our invention to provide two series-connected multivibrators in a bit sequence detector with the timing period of the first multivibrator being a function of the state of the second multivibrator.

It is another feature of our invention to continuously apply triggering pulses to the second multivibrator and to prevent this multivibrator from being triggered if the first multivibrator has been triggered.

Additional objects, features and advantages of the present invention will become apparent when taken in conjunction with a presently preferred, but nonetheless illustrative, embodiment of the invention as explained in the following detailed description and as shown in the accompanying drawing, wherein.

Figure 1:
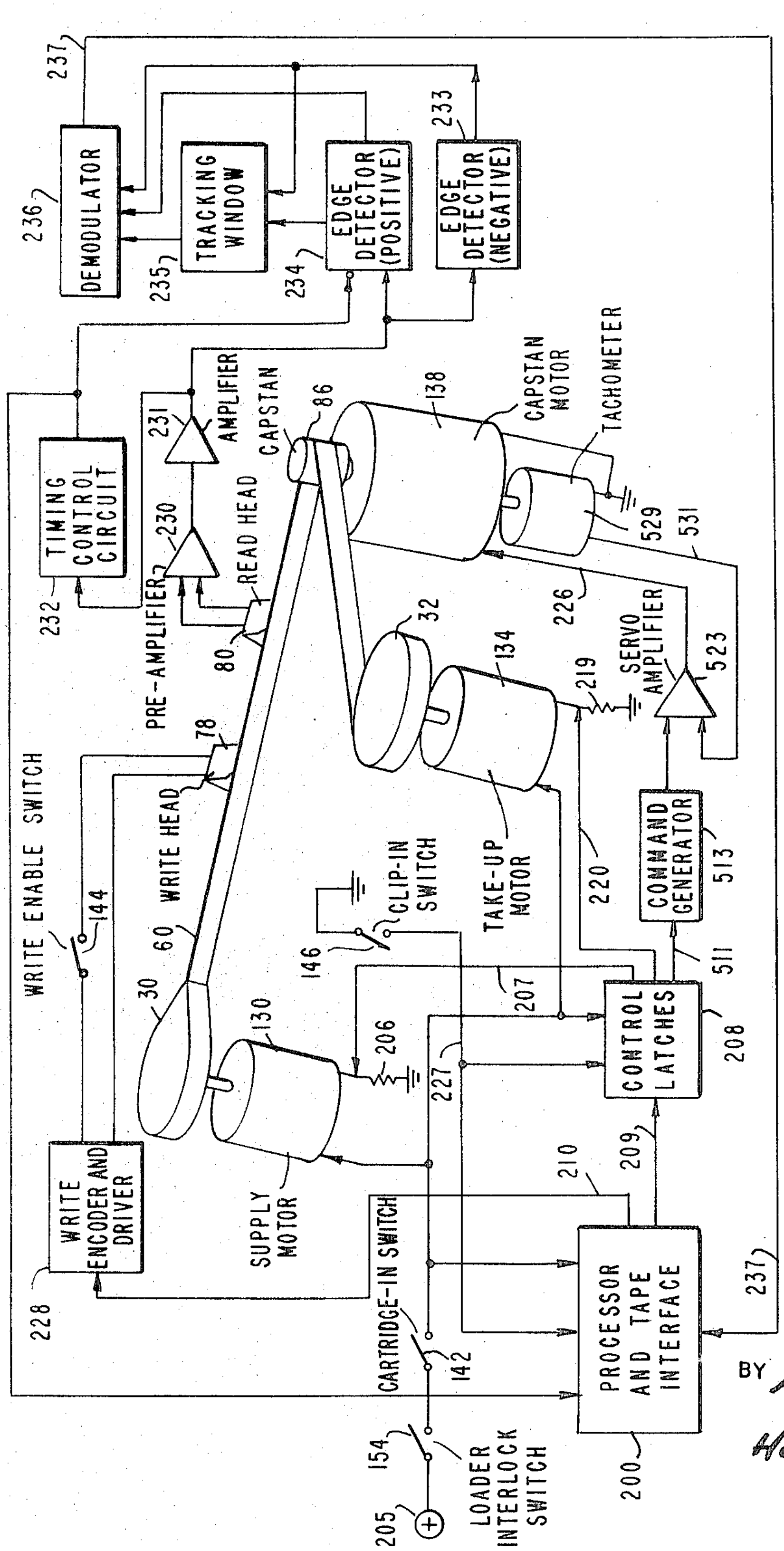
FIG. 1 is a block diagram schematic of an illustrative tape system constructed in accordance with the principles of our invention.

The tape system of the invention is shown in FIG. 1 in block diagram form. Many of the blocks of FIG. 1 are shown in detail in the other figures. The tape deck includes a supply motor 130, a take-up motor 134 and a capstan motor 138. A cartridge 30 is mounted by the loader onto a spindle driven by the supply motor. A leader tape 60 is clasped to the leading end of the magnetic tape in the cartridge, the leader tape passing four guide posts (not shown), write and read heads, and capstan 86 to take-up reel 32. Depending on the direction in which the capstan motor moves, the tape can be moved in either direction.

Processor and tape interface unit 200 controls the overall system operation. When a cartridge is first placed in the loader and the loader is moved down, cartridge-in switch 142 is operated. When the loader is then manually locked by movement of a locking lever, loader interlock switch 154 is also closed. At this time the potential of source 205 is extended through both switches to one of the processor inputs, the supply motor, control latches 208 and the take-up motor. Both motors begin to operate to apply opposite forces to the tape and so to maintain it in tension. (The motors operate only when switches 142 and 154 are both closed.) The processor is informed that a cartridge has been placed on the deck and the control latches are enabled to operate. (Although only a single tape deck is shown in FIG. 1, it is to be understood that a typical system may include two or more tape decks each operating independently of the other under control of the processor.)

The processor applies signals over cable 209 to control latches 208. Each set of signals, as is known in the art, sets various latches to control the motor operations. The control latches have three outputs. One of these is a cable 511 which is extended to command generator 513. The signals on this cable represent the desird speed and direction of the tape, and the command generator functions to derive a DC level which is applied to one input of servo amplifier 523. The output of the servo amplifier is extended to capstan motor 138. The motor shaft, in addition to driving capstan 86, also drives tachometer 529 which develops an electrical signal on conductor 531 which is proportional to the speed of the motor. This signal is fed back to the second input of the servo amplifier, the feedback circuit functioning to control a capstan speed and direction which follow the output of the command generator. The command generator functions to provide a gradual change in the input to the servo amplifier whenever a different tape speed and/or direction are necessary.

When the tape is not in motion, the supply and take-up motors simply serve to tension the tape. However, when the capstan motor starts to turn, the tape is driven in either direction. One of the supply and take-up motors still serves to tension the reel which is supplying the tape. But the other motor must drive its respective reel so that the tape which is being fed past the read and write heads is wound up on the reel. This motor is preferably driven at a faster speed so that no slack develops in the tape and so that any friction which tends to impede tape motion is overcome. Ordinarily, resistor 206 is in the supply motor circuit and resistor 219 is in the take-up motor circuit, and the current supplied to each motor is sufficient for tape tension purposes. However, when the tape is being rewound by the supply motor, control latches 208 short conductor 207 to ground. The supply motor current thus bypasses resistor 206 and is of greater magnitude to control the faster operation of the motor. Similarly, conductor 220 is shorted by the control latches when the tape is moved in the forward direction so that resistor 219 is shorted to ground enabling the take-up motor to exert a sufficiently high torque to prevent slack from developing in the tape.

It should be noted that when switches 142 and 154 first close, supply motor 130 starts to move in a direction to draw the leader tape into the cartridge. The clasp which connects the magnetic tape in the cartridge to the leader tape cannot be drawn into the cartridge. However, the supply motor shaft turns until the spring at the top of its spindle grips the supply reel hub. At this time the motor shaft stops turning and functions to maintain the tape in tension.

The processor also supplies data signals over conductor 210 to write encoder and driver 228 whenever data is to be written on the tape. The write encoder and driver in turn extends write currents to write head 78. However, writing can take place only if write enable switch 144 is closed. This switch is closed only when a cartridge placed on the tape deck includes a "write enable" plug for operating the switch as will be described below.

The clip-in switch 146 is closed whenever the leader clip (or clasp) is in its home position, that is, when the end of the leader tape is positioned so that it can be mated with the leading edge of a cartridge tape when a cartridge is lowered onto the tape deck. The clip-in switch serves several functions. With the switch closed, ground is applied to conductor 227 and the processor is informed that it is leader tape which is adjacent to the read and write heads. As soon as switches 142 and 154 close, thereby indicating to the processor that a cartridge has been placed on the tape deck, the processor is made aware of the fact that reading or writing cannot commence immediately because the leading end of the tape must be withdrawn from the cartridge and moved until it is adjacent to the read and write heads. Thus the processor is informed to wait an extra time interval after the tape starts to move before reading or writing.

After the magnetic tape has been withdrawn from the cartridge, the clip-in switch opens and ground is removed from conductor 227. But as soon as all of the tape is returned to the cartridge following a rewind, and the clip is in its home position to close switch 146, conductor 227 is grounded once again. In addition to informing the processor that the magnetic tape has been completely rewound, the grounding of conductor 227 causes the control latches to shut off the capstan motor; the signal applied to conductor 221 causes the capstan motor to stop turning. During the rewind, conductor 207 is grounded rather than conductor 220 so that supply motor 130 will drive the supply spindle fast enough in the reverse direction such that the tape being rewound will be taken up without any slack being formed. However, as soon as conductor 227 is grounded at the end of rewinding of the tape, conductor 220 is grounded rather than the conductor 207. Take-up motor 134 is driven extra hard so that take-up reel 32 which was priorly turning and feeding tape will not continue to turn as a result of its inertia and erroneously wrap the leader tape around it in the reverse direction. Boosting the take-up motor in this way as soon as the tape is fully rewound causes the tape drive system to come to an abrupt hault and eliminates the danger of an excessive amount of slack in the leader tape from developing.

Signals read by read head 80 are applied to the input of pre-amplifier 230 whose output is fed to the input of amplifier 231. The output of the amplifier is extended to edge detectors 233 and 234, and timing control circuit 232. The timing control circuit functions as a bit sequence detector to verify the presence or absence of a data block. The output of timing control circuit 232 is normally high. Since the output of the circuit is connected to the inhibit input of edge detector 234, this circuit does not normally operate. When the tape starts to move, the timing control circuit detects a bit sequence at the leading portion of any data block. As soon as the presence of a data block is verified, the output of timing control circuit goes low to enable the operation of edge detector 234.

This edge detector detects each positive pulse at the output of amplifier 231 and extends a signal indicative thereof to both an input of tracking window 235 and an input of demodulator 236. Negative edge detector 233 detects a negative pulse in the output of amplifier 231 and similarly extends signals indicative thereof to tracking window 235 and demodulator 236. The initial bits in each data block consist of a series of zero values, which results in negative pulses at the output of amplifier 231. Initially, edge detector 234 does not operate and consequently the only signals which are extended to tracking window 235 are those corresponding to the zero bits in the data block. These initial bits enable the tracking window to adjust various internal pulse widths so that significant zero crossings are tracked. The tracking window timing self-adjusts before timing control circuit 232 signals the presence of a data block. When the timing control circuit output goes low, positive edge detector 234 operates together with the negative edge detector 233. At this time, significant zero crossings representative of 1 bits as well as 0 bits are extended to tracking window 235. The tracking window continues to properly track the significant zero crossings, with signals from the two edge detectors being extended to the demodulator to inform the demodulator of the value of each bit read. The tracking window frames each bit to the exclusion of signals at the output of amplifier 231 which correspond to non-significant zero crossings. The demodulator functions to supply signals on conductor 237 which inform the processor of the reading of a 0 or a 1 bit.

Timing control circuit 232 further functions to cause its output to go high at the end of a data block, when a predetermined time interval has elapsed without the detection of a bit. The output of the timing control circuit is also extended to the processor to inform the processor that another data block has passed read head 80.

I. THE TAPE DECK ELEMENTS

A. The Locator and Tape Guide Blocks; The Leader Clasp

Figure 2A:
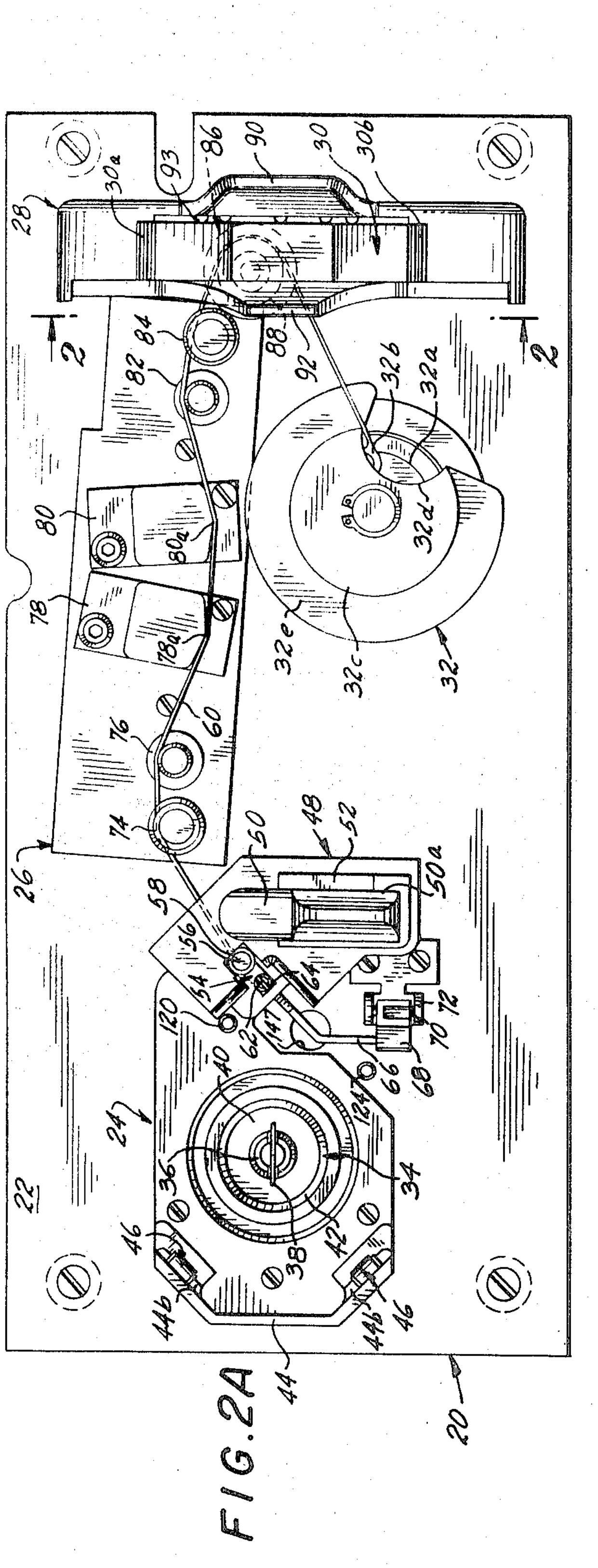
FIG. 2A is a plan view of the tape deck included in the system, illustrating a tape cartridge loader in the vertical or unloaded position.

The basic construction of the tape deck, including the mechanical and electrical apparatus attached to both the upper and lower surfaces thereof, cna be described with respect to several of the figures of the drawing. Initially, FIG. 2A illustrates a tape deck 20 from a plan view in which the upper surface 22 is shown with no cartridge loaded onto the tape deck. Broadly, the elements appearing in FIG. 2A include a positioning or locating block 24, a tape guide and head mounting element 26, a cartridge loader 28, the cartridge 30 (seen in end view) and the take-up reel 32. Positioned within the locator block 24 at the left of FIG. 2A is the supply hub structure 34, which includes drive shaft 36 to which is attached spring clip 38 shown in the normal uncompressed form in FIG. 2A. Drive hub structure 34 also includes main supporting flange 40 having an outer circumferential lip or ridge 42 which is raised somewhat from the level of flange 40. Also associated with positioning block 24 is wall 44, which prevents backward insertion of cartridge 30, and a pair of cartridge retaining clips 46 at opposite corners of block 24.

Tape guide block 48 is situated adjacent to positioning block 24. Locking lever 50, mounted on block 48, is illustrated in the unlocked position, with its right edge 50*a* in contact with a rest stop 52 projecting upward from the block 48. Tape leader clasp 54 includes a first post 56 projecting upward from the clasp to which eyelet 58 of a permanent leader element 60 (e.g., constructed of clear mylar) is attached. The other portion of leader clasp 54 is split post 62, to which an eyelet permanently affixed to the lead end of the magnetic recording tape in cartridge 30 will be attached during the loading step. In FIG. 2A leader clasp 54 is shown positioned in its home slot 64, causing underlying lever 66 (e.g., see FIG. 9) to remain in a depressed condition, and causing catch 68 to be in an open receiving condition for the subsequent loading step. (Catch 68 is pivotable around pin 70 between the upwardly projecting arms of bracket 72, and will ultimately capture a catch lip on loader 28 after loading is completed and tape advance has commenced).

B. Tape Guide Posts and Heads

The path of the permanent tape leader element 60 between leader clasp 54 and take-up reel 32 passes across tape guide post and head block 26. In traversing this tape travel path, a first pair of tape guide posts 74, 76 is reached, with the leader 60 (and subsequently the recording tape 60T itself) passing behind the guide posts and then coming in contact with write head 78 followed by read head 80. The sensitive portions of the write and read heads are found at the apexes 78*a* and 80*a* of the heads respectively, and these heads are generally conventional, operating to detect electrically the magnetic signals written on the tape (the read head) and to apply electrically additional magnetic signals to the tape thereby erasing any existing signals when so instructed by the system electronics (the write head). Beyond the heads is located a second pair of stationary guide posts 82, 84, behind which the leader 60 (and subsequently the leader clasp 54 and the recording tape 60T) passes, next reaching the friction capstan 86 shown hidden in FIG. 2A The principal portion of the friction capstan around which the leader element 60 and subsequently the tape itself passes, is a cylindrical rubber roller 88 which serves to apply the frictional drive forces (either forward or reverse) to the tape to control its actual movement.

C. The Take-Up Reel Assembly

The take-up reel 32 includes an inner hub 32*a* to which the permanent leader element 60 is attached by means of eyelet 32*b*. The inner hub 32*a* is concentric with outer hub 32*c*. Upon the initial application of forward driving power to the system, inner hub 32a is energized to rotate counterclockwise. Drawing leader 60 around its outer periphery (shown only in part in FIG. 2A at this time, outer hub 32*c* does not rotate since no separate drive power is applied to it. Leader 60 is, accordingly, wound up on inner hub 32*a*. When sufficient rotation has occurred such that leader clasp 54, coupling leader 60 and recording tape 60T, arrives at take-up reel 32, leader clasp 54 is lodged within the aperture created by cutout 32*d*. Thereafter, inner hub 32*a* can no longer rotate independently of the outer hub 32*c*, and the two hubs are arranged to rotate together. Accordingly, the recording tape, bearing the data or which is to receive data during a write cycle, will be wound uniformly on outer hub 32*c*.

During the rewind step, the inner and outer hubs 32*a* and 32*c* respectively are coupled together for coincident rotation until all the recording tape has been unwound from outer hub 32*c*. At that point, leader clasp 54 again becomes the leading element of the tape (in reverse) and as it is withdrawn from the aperture created by cutout 32*d*, outer hub 32*c* ceases to rotate and leader tape 60 begins to emerge from its storage position on the outer periphery of inner hub 32*a*. This arrangement avoids the unusually large take-up reels formerly required by the prior art when a leader hook or clasp arrangement was being utilized, and also avoids distortion of the recording tape by recessing the leader clasp within the aperture created by the cutout 32*d*. Finally, the present arrangement obviates the need for using a predetermined length of leader tape, since inner hub 32*a* will accommodate any length of leader element 60 and will begin rotating outer hub 32*c* whenever leader clasp 54 has become lodged in the aperture created by cutout 32*d*.

D. The Loader Carriage and the Cartridge

Figure 2B:
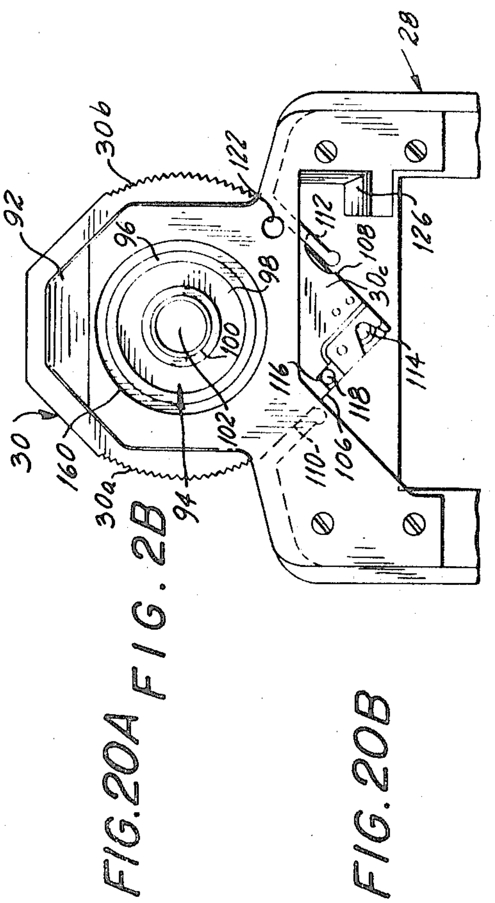
FIG. 2B is a fragmentary view of a tape cartridge and the upper portion of the loading mechanism, taken from the perspective of line 2—2 of FIG. 2A in the direction of the arrows.
Figure 4:
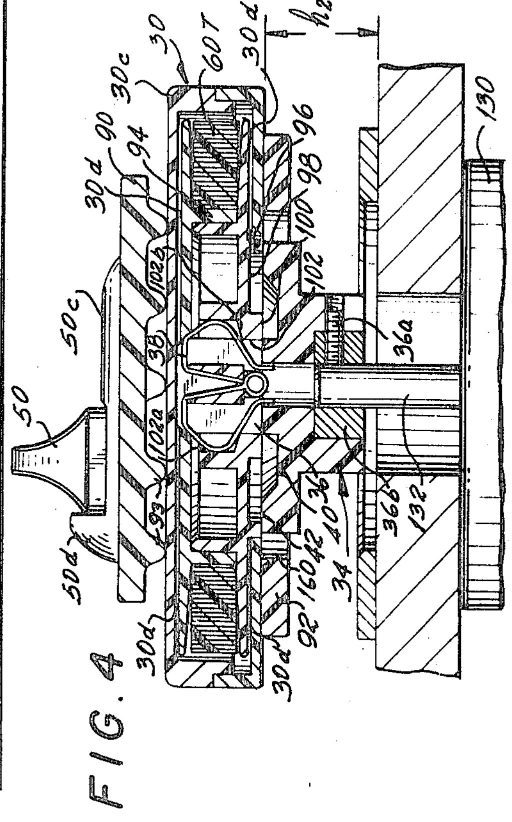
FIG. 4 is a sectional view of the locking lever, cartridge loader, the cartridge and a fragmentary portion of the tape deck including the drive spindle, taken along the line 4—4 of FIG. 3 in the direction of the arrows.

The loader 28 is only apparent in end view in FIG. 2A and is seen to include a first upper projecting tongue 90 and a lower supporting tongue 92. Cartridge 30 is deposited between tongues 90 and 92, and the upper portion of the housing of cartridge 30 rests lightly against the guide ramps 93 on the underside of upper tongue 90. With loader 28 in the position shown in FIG. 2A, cartridge 20 is simply deposited into the cavity formed between tongues 90 and 92, with its downward travel (into the paper in FIG. 2A) being limited by contact between the straight side surfaces of cartridge 30 and the support arms of loader 28. The loading and handling of cartridge 30 is facilitated by the presence of opposed serrated edges 30a and 30b. Referring to FIG. 2B, the position of cartridge 30 when loaded into loader 28 is illustrated from the perspective of line 2—2 of FIG. 2A. Referring to FIGS. 2B and 4, cartridge 30 includes a self-contained supply reel 94 having an outer flange 96, a reduced central flat surface 98 and an interior flange 100 defining main aperture 102 which is adapted to accommodate drive shaft 36 when cartridge 30 is mounted onto the tape deck drive hub 34 during the loading step as will be described below. Supply reel 94, as will also be seen below, will ride freely from its surrounding cartridge housing 30c after mounting is completed.

When cartridge 30 is loaded into loader 28, straight surfaces 106, 108 of cartridge 30 come into contact with downwardly slanted loader support arms 110, 112 respectively, thus defining the receiving chamber or cavity within loader 28 for cartridge 30. In the loaded position as illustrated in FIG. 2B, tape eyelet 114 is visible in the lower square corner of cartridge 30. By the geometry of the system of the invention, eyelet 114 is adapted to overlie split post 62 of leader clasp 54 during the loading step, such that the recording tape 60T contained within cartridge 30 (and wound on supply reel 94) will be attached to leader 60 when post 62 is inserted into eyelet 114.

E. The Loading-Responsive Sensors

Cartridge 30 further includes a cavity 116 which contains, as illustrated in FIG. 2B, a "write enable" plug 118. The insertion of plug 118 in control cavity 116 characterizes the tape of cartridge 30 and indicates to the system electronics that the writing function should not be inhibited with respect to this tape. Should it be desired to preserve whatever data exists on the recording tape in cartridge 30, plug 118 would be omitted (or inserted into the opposite end of cavity 116 for storage), and the corresponding electromechanical sensor on the surface of deck 22 would not be energized during loading. This would act as an indication that the data on this tape should not be erased. In particular, referring to FIGS. 2A and 2B, the presence of write enable plug 118 in control cavity 116 will cause spring-biased sensor 120 to be depressed when loader 28 is lowered towards tape deck surface 22; if enable plug 118 is absent from the underside of cartridge 30 when such loading takes place, sensor 120 will remain stationary.

Similarly, loader 28 is equipped with clearance aperture 122, adapted to mate over sensor 124 on the upper surface 22 of tape deck 20. As can be seen in FIG. 2B, the inserted cartridge 30 in loader 28 occupies the space between tongues 90, 92 immediately behind clearance aperture 122. Accordingly, when loader 28 is lowerd towards tape deck 22, upwardly projecting electromechanical sensor 124 will be depressed, thus informing the system that a cartridge has been loaded onto the tape deck. In the absence of a loaded cartridge the lowering of loader 28 towards tape deck 22 will furnish no responsive result, since aperture 122 will clear sensor 124, thus leaving sensor 124 in its normal position.

F. Auxiliary Locking Feature

Figure 10:
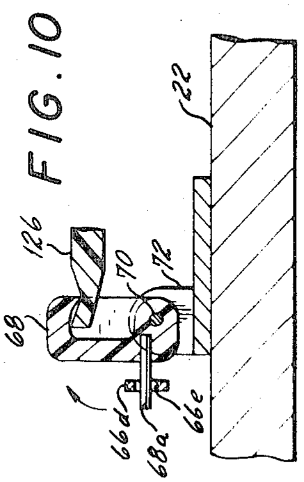
FIG. 10 is a fragmentary sectional view of a latch retaining the loader in the loaded position, taken along the line 10—10 of FIG. 9 in the direction of the arrows.
Figure 9:
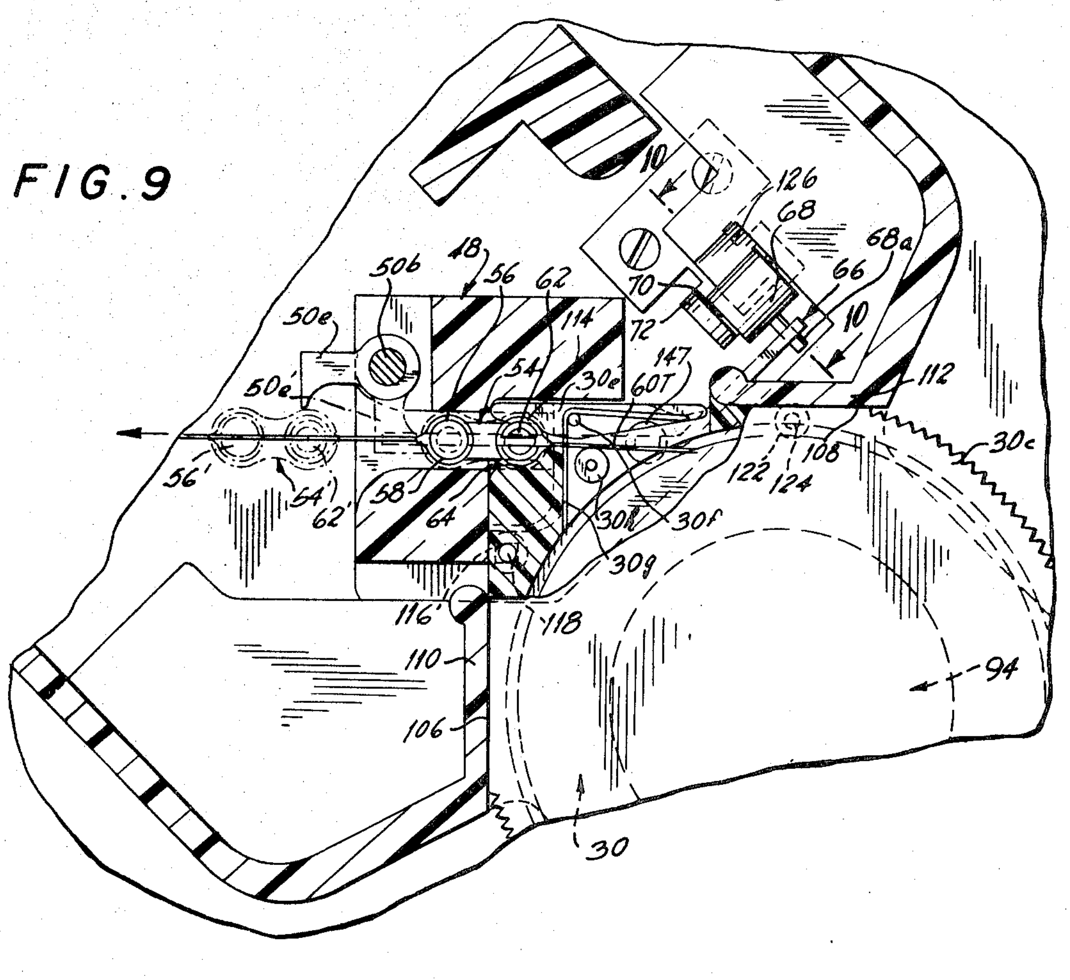
FIG. 9 is an enlarged fragmentary sectional view of the cassette and locking apparatus, illustrating two positions of the tape leader clasp and the locking lever lug, taken along the line 9—9 of FIG. 8 in the direction of the arrows.

Loader 28 is also equipped with catch lip 126, as shown in FIGS. 2B, 9 and 10, which is designed to mate with catch 68 on tape deck surface 22. During the loading step, lip 126 passes freely downward past the hooked portion of catch 68 (e.g., see FIG. 10); however, when leader clasp 54 leaves home slot position 64, catch 68 springs into position to retain loader 28 in its lowered position. This is an auxiliary locking feature of the invention which, together with the action of locking lever 50, serves to prevent raising of loader 28 when tape 60T is threaded through the tape path or when leader clasp 54 is not fully within home slot 64.

G. The Drive Motors

Figure 6:
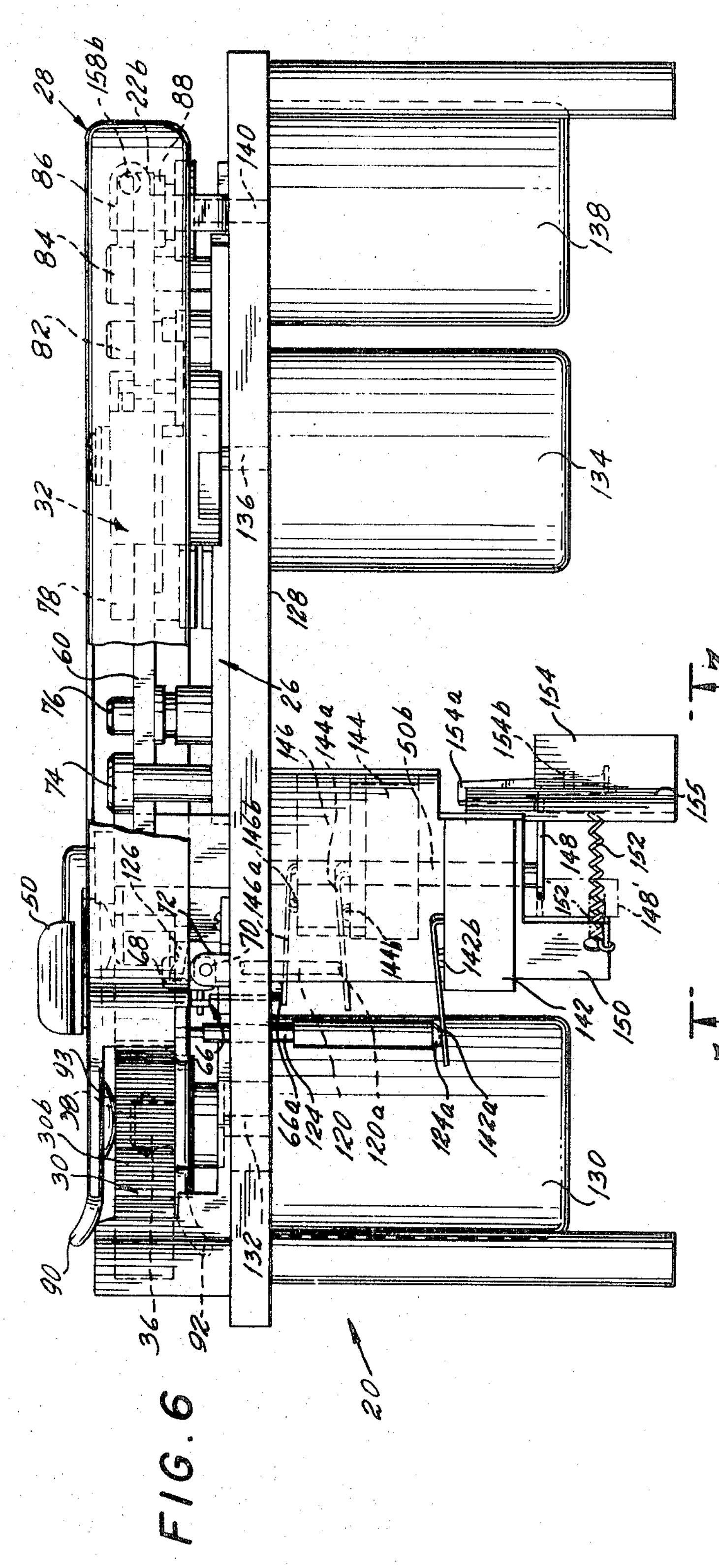
FIG. 6 is a front view of the tape deck with the loader in the loaded position, and showing the upper and lower surfaces of the tape deck and some of the apparatus attached thereto, including multiple electromechanical sensors attached to the undersurface of the tape deck and a plurality of drive motors.

In FIG. 6, showing loader 28 in its lowered loaded position (see also the plan view of FIG. 3), the undersurface 128 of tape deck 20 is also seen to have mounted thereon several of the electrical and electromechanical elements which control the supplying of power to the tape deck system. Drive motor 130 has its drive shaft 132 connected to supply reel drive shaft 36. Towards the other side of tape deck 20, take-up reel 32, shown in phantom in FIG. 6, is powered by a similar drive motor 134, which is connected to take-up assembly 32 by means of drive shaft 126. The thrid drive motor mounted on the undersurface 128 of tape deck 20 is motor 138, which has its shaft 140 connected to friction capstan 86. As previously noted, friction capstan 86 includes a cylindrical rubber drive wheel 88 around which tape leader 60 is initially wound. Leader 60 occupies the same relationship with respect to the various guide posts, heads and the friction capstan as does the recording tape 60T itself when the latter is threaded through the tape path. Capstan wheel 88 serves to supply the main directional driving force to the tape subsequent to the application of tape tension to the system by energizing motors 130 and 135 equally in opposite directions.

H. The Electromechanical Responses of the System

In addition to the tape tension and drive motors 130, 134 and 138 described above, the undersurface 128 of tape deck 20 has mounted thereon the critical electromechanical sensors which respond to various actions occuring on the upper surface of the tape deck to initiate specific electronic responses. The electronic operation of a system which can be utilized to control the subject tape deck as described in FIG. 1.

1. The Responses to the Loading Step

Initially, it has already been noted that the presence or absence of a cartridge within loader 28 is detected by contact between such a cartridge and spring-biased pin 124, which projects upward over the top of tape deck surface 22 — when loader 28 containing a cartridge 30 is lowered to the tape deck surface, the cartridge housing forces such pin 124 downward, activating a switch attached to undersurface 128.

Figure 7:
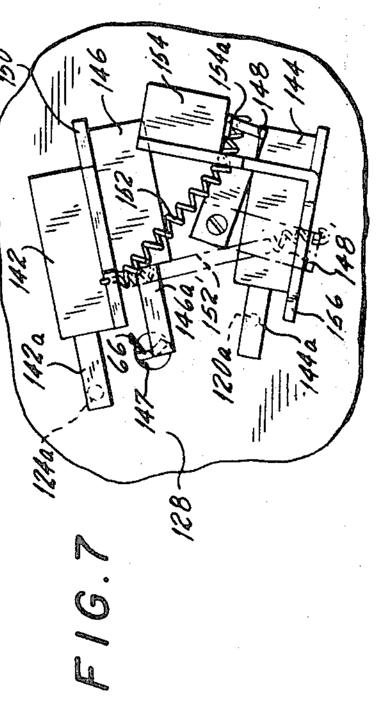
FIG. 7 is a fragmentary bottom view of the underside of a portion of the tape deck, illustrating the electromechanical sensors, as viewed along the line 7—7 of FIG. 6 in the direction of the arrows.

As seen in FIGS. 6 and 7, pin 124 is in its depressed position, being held in that position by the presence of cartridge 30 in loader 28 in the loaded position. This position of pin 24 is achieved when loader 28 is lowered towards upper surface 22 of tape deck 20. In so doing, contact is made between the upper surface of pin 124 and the lower surface of housing 30*c* of cartridge 30 (see initial and subsequent positions 124 and 124' in FIG. 8). As pin 124 is gradually depressed by the lowering of loader 28, contact tip 124*a* of pin 124 forces spring arm 142*a* of microswitch 142 downward, causing switch contact 142*b* to be depressed and energizing microswitch 142. Although this particular energization may be the first to occur as loader 28 is lowered onto surface 22 of tape deck 20, no responsive electronic action occurs immediately; however, a circuit is prepared for ultimate energization based upon the subsequent movement of locking lever 50 into its locking position, which will result later in the application of tape tension to the system.

The second sensor is pin 120, which will be depressed when a cartridge containing a write enable plug 118 is contained in the write enable plug control cavity 116 (FIG. 2B). If such a write enable plug is in the control cavity, this is interpreted as an indication that the electronic writing function can be enabled and that the data, if any, on the tape in cartridge 30, need not be preserved following readout (if no such plug were inserted, pin 120 would not be depressed). Assuming that write enable plug 118 is in position in control cavity 116, the lowering of loader 28 containing cartridge 30 towards upper surface 22 of tape deck 20 will cause pin 120 to be depressed, and its lower contact tip 120*a* will accordingly depress spring arm 144*a* of microswitch 144. The depressing of arm 144*a* also depresses spring-biased contact 144*b*, leading to the energization of microswitch 144. This allows the electronics of the system to enable the writing function while cartridge 30 is in place and the system is operating.

2. THE INITIAL LOCKING STEP

*a*. Mechanical Locking and Clearance Functions

Figure 3:
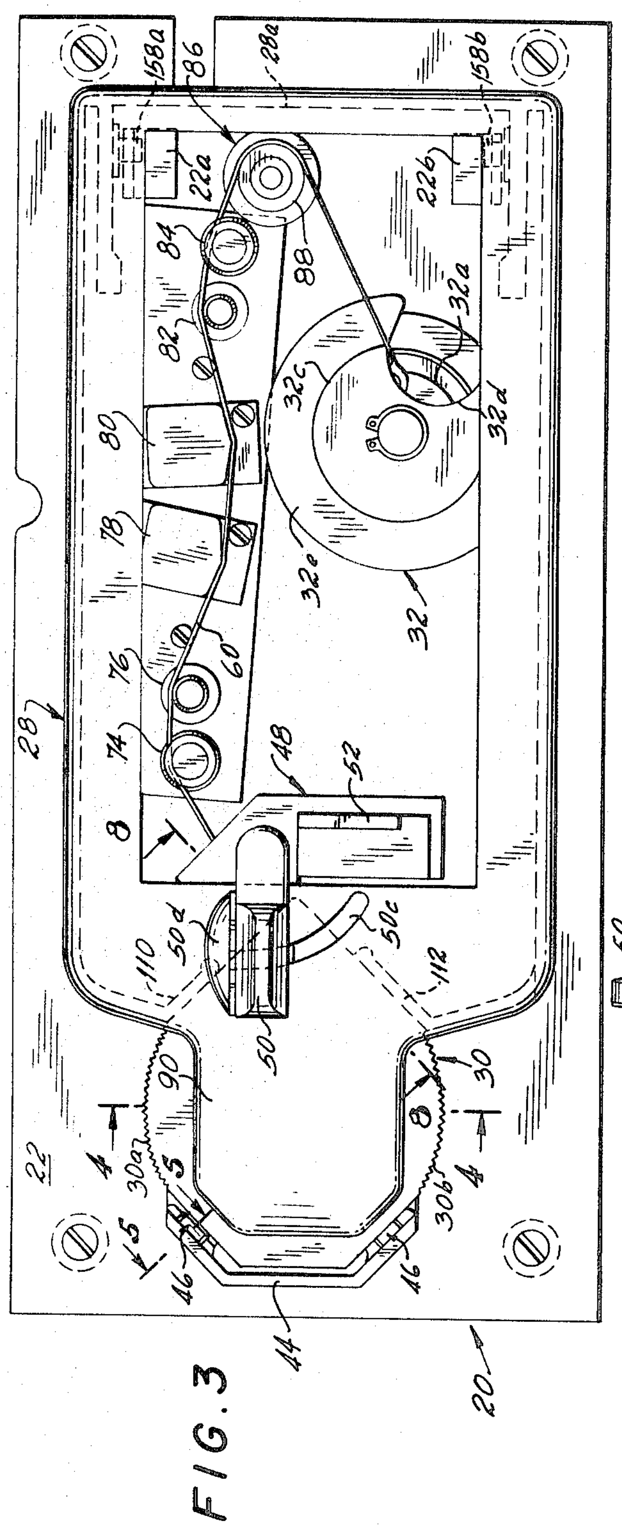
FIG. 3 is a plan view of the tape deck, illustrating the tape cartridge loading mechanism in the loaded position with the loader locked in place.

When leader clasp 54 is in its home slot position 64, as seen for example in FIG. 9, locking lever 50 is in the unlocked position as shown in FIG. 2A; due to the position of shaft 50*b* of lever 50, lug 50*e* coupled thereto will be in the position illustrated in phantom at 50*e'* in FIG. 9. Thus, the tip of lug 50*e* will be in contact with the left edge of leader clasp 54, thus maintaining leader clasp 54 in its home slot position 64. However, after loader 28 is lowered onto tape deck surface 22, with recording tape eyelet 114 having been lowered onto leader clasp retaining post 62, locking lever 50 will be moved to the position illustrated in FIG. 3, representing the loaded position of the system. Locking lever 50 can be readily moved manually along ramp element 50*c*, coming to rest in a depression therein (FIG. 4) and against raised stop 50*d* on the upper surface of loader 28. When this locked position is reached, loader 28 will be restricted against any upward movement by the overlying presence of lever 50, as illustrated in FIGS. 3 and 4. As lever 50 is rotated through the 90° from the unlocked to the locked positions, lug 50e concurrently moves through the same 90° angle from the phantom position 50*e'* illustrated in FIG. 9 to the full line position 50*e*, thereby clearing the tape advance path for leader clasp 54.

*b*. Electronic Switching Response

An additional responsive electronic function is served by the movement of locking lever 50 from the unlocked position illustrated in FIG. 2A to the locked position illustrated in FIG. 3. Thus, it will be recalled that as loader 28 was lowered towards the upper surface 22 of tape deck 20, the presence of a cartridge 30 within loader 28 caused the downward movement of pin 124, thus energizing "cartridge-loaded" microswitch 142 when its spring arm 142*a* was depressed after having been contacted by the lower tip 124*a* of pin 124 (FIG. 6). However, no specific electronic result took place at that time. Subsequently, when locking lever 50 is moved into the locked position shown in plan view in FIG. 3, and als being represented by the showings of FIGS. 6–8, an additional switch is energized, which, together with the prior activation of microswitch 142, will result in the application of tape tension to the system.

Specifically referring to FIGS. 6 and 7, shaft 50*b*, coupled to locking lever 50, controls the angular movement of right angle arm 148, which is screw-mounted to shaft 50*b*. The position of arm 148 and its associated elements illustrated in phantom in FIGS. 6 and 7, is based on locking lever 50 being in the unlocked position, such as is shown in FIG. 2A (FIG. 6 indicates the upper handle portion of locking lever 50 in the locked position, however). In the unlocked position of lever 50, arm 148 is in the phantom position at 148', in contact with the right edge of cutout plate 150. Spring 152, at unlocked position 152' (FIG. 7), is attached at one end to plate 150, and at the other end is coupled to the vertical part of arm 148. As locking lever 50 is rotated 90° clockwise from the position illustrated in FIG. 2A, arm 148 (at position 148') is thereby moved 90° counterclockwise against the slight bias furnished by spring 152 to the full line position at 148 in FIG. 7, coming to rest against the vertical edge of mounting plate 155. During this travel, the tension of spring 152 will be overcome, thus permitting arm 148 to remain in the solid line position indicated in FIGS. 6 and 7. In moving towards this rest position, arm 148 is brought into contact with spring arm 154*a* of vertically mounted microswitch 154. As arm 148 continues to move towards its rest position in contact with plate 155, arm 154*a* is depressed and spring contact 154*b* of microswitch 154 is activated, thus operating this microswitch.

Together with the prior energization of "cartridge-loaded" microswitch 142 in response to the depressing of pin 124, the sequential operation of microswitches 142 and 154 causes the tape to be placed in tension. Each of reel motors 130 and 134 is turned on, the former being connected to supply drive shaft 36 on the latter to take-up assembly 32. In the absence of tape motion, the motors 130 and 134 are biased equally in opposite directions by appropriate electronic means (not shown). The leader element 60, connected to permanent take-up eyelet 32*b* on take-up reel assembly 32, is then placed into tension as is coupled recording tape element 60T (FIG. 8) which, prior to tape motion, is still stored within cartridge 30. Nevertheless, by applying clockwise torque to supply assembly 34 and an equal counterclockwise torque to take-up assembly 32, tape 60T (see FIG. 4) and leader 60, coupled through leader clasp 54, are tensioned throughout the path of travel from supply cartridge 30 to take-up reel 32. Ultimately, when friction capstan motor 138 is energized, and driving power is transmitted to capstan 86 by means of motor shaft 140, either motor 130 (for rewind) or motor 134 (for forward tape advance) will also be supplied with increased voltage; however, the normal bias supplied to the other motor will not be removed, thus insuring proper tape tension. If locking lever 50 is, at any time during system operation, returned to the unlocked position, microswitch 154 will open, removing power from drive motors 130 and 134.

3. THE RESPONSES TO COMMENCEMENT OF TAPE ADVANCE

After locking lever 50 has been placed in the locked position illustrated in FIGS. 3 and 6 (and see description above), and tape movement has commenced, leader clasp 54 will leave its home slot position 64, an important step of which the processor must be advised. The significance of this step is that it gives an immediate indication that some length of recording tape 60T (FIGS. 8, 9) has been removed from cassette 30, and it further indicates to the processor that the rewind control should be permitted to operate, if desired. Moreover, it is of critical importance that the loader 28 now be positively gripped in place once tape has commenced to be withdrawn from cartridge 30, in order to avoid inadvertent lifting of loader 28 while the tape is moving through the system. Accordingly, for all these electrical and mechanical reasons, the departure of leader clasp 54 from home slot 64 results in specific electronic and mechanical outputs.

*a*. The Electrical Control by Lever 66

Figure 8:
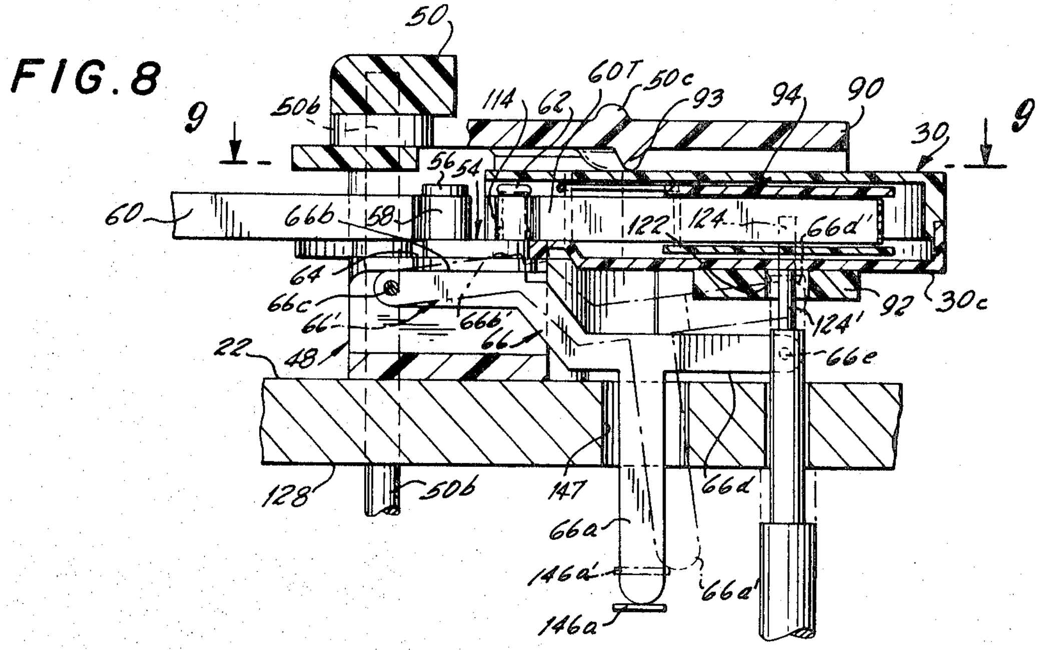
FIG. 8 is an enlarged fragmentary sectional view of the locking and positioning apparatus, including the locking lever, the leader clasp and two of the electromechanical sensor arrangements, all taken along the line 8—8 of FIG. 3 in the direction of the arrows.

Considering the views of FIGS. 2A, 6 and 8 for the electronic result, a multi-purpose, irregularly shaped lever switches from a normal depressed condition at 66 when leader clasp 54 is in the home slot 64, to a slightly elevated position at 66' when the leader clasp is withdrawn from the home slot. Referring to FIG. 8, the normal position of lever 66 is shown in solid line, with an upward spring-biasing force being supplied by spring arm 146*a* of microswitch 146 (see FIG. 6). However, lever 66 remains in the solid line orientation as illustrated in FIG. 8 as long as leader clasp 54 is in home slot 64 — this is attributable to the inability of upper ramp edge 66*b* of lever 66 to move upward because it is in contact with the undersurface of the base of leader clasp 54. As seen in FIG. 6, the normally depressed position of lever 66 causes its downwardly projecting arm 66*a* to maintain spring arm 146*a* of microswitch 146 in the lowered condition, thereby depressing spring contact element 146*b*. At such time, therefore, with the grounding of conductor 227 (FIG. 1), the system electronics is informed that no tape has been withdrawn from cartridge 30 — i.e., that the tape is fully rewound.

When leader clasp 54 does move from its home slot 64 as tape advance commences (e.g., see phantom showing of clasp at 54' in FIG. 9), the view of FIG. 8 indicates that lever 66 rotates slightly in a counterclockwise direction about pin 66c which is fixedly mounted to locator block 24. This rotation, under the upward spring urging of arm 146a of microswitch 146, is now permissible since the lower surface of leader clasp 54 no longer obstructs the upward movement of upper ramp edge 66*b* of lever 66. Accordingly, upper edge 66*b* assumes the position shown in phantom at 66*b'* in FIG. 8, with the position of downwardly projecting arm 66*a* moving to 66*a'* concurrently. This upward movement of arm 66*a* causes spring arm 146*a* to move upward to the phantom position at 146*a'*, thus permitting spring contact 146*b* to spring upwards and moving microswitch 146 to its unoperated condition. This results in the generation of a signal to the processor indicating that the recording tape is not fully rewound; reverse tape motion will therefore no longer be inhibited. As soon as leader clasp 54 returns to its home slot 64, thereby returning microswitch 146 to its normal operated condition (with arm 146*a* at the full line position in FIG. 8), rewind has been completed and that function will thereafter be inhibited.

*b.* The Mechanical Control by Lever 66

The system also responds mechanically to the departure of leader clasp 54 from home slot 64, to lock loader 28 in the lowered loaded position, thereby preventing destruction of the recording tape during operation of the system. This is an obvious prerequisite to preserving existing or new data on the tape and to avoid multilation of the tape element itself, and serves an auxiliary locking function in addition to that of lever 50. When loader 28 is lowered from its elevated position shown in FIG. 2A towards the upper surface 22 of tape deck 20, catch lip 126 (FIGS. 6 and 10) clears the upper hook of catch 68 and reaches the position illustrated in phantom in FIG. 6. After loader 28 has been locked into position by the initial action of locking lever 50 as described above, leader clasp 54 can depart from its home position, this latter departure causing the second auxiliary locking feature of the invention to become effective.

Assuming tape movement then commences leader clasp 54 moves from its position indicated at the right in FIG. 9, to the phantom position at 54' to the left in FIG. 9. As has been noted previously, this causes lever 66 to move from its full line to its phantom position at 66' in FIG. 8. The mechanical response to this movement is controlled by right hand arm 66d of lever 66, which thereby moves from the full line position shown at **66*d* in FIG. 8, to the phantom position shown at 66*d'* in that drawing figure. Normally, pin 68*a*, projecting rearwardly from catch 68, rides within aperture 66*e* of right arm 66*d* of lever 66. When lever 66 is in the full line position illustrated in FIG. 8 (based upon leader clasp 54 being in the home slot position 64), catch 68 is at the clearance position illustrated in the plan view of FIG. 2A; in this position, catch 68 is prevented from rotating about pin 70 in support bracket 72 by the limiting effect attributable to the contact between pin 68*a* and the upper inside edge of aperture 66*e* in arm 66*d*.**

However, when the leader clasp 54 is withdrawn from the home slot 64 at the commencement of tape movement, lever 66 assumes the phantom position at 66' in FIG. 8, thereby causing right arm **66*d* to assume the phantom position at 66*d'* in FIG. 8, and giving rotational force to catch 68 in the direction indicated by the arrow in FIG. 10. This rotation, caused by contact between the lower inside edge of aperture 66*e* and the under surface of pin 68*a* riding within that aperture, causes catch 68 to come in contact with the upper surface of catch lip 126 of loader 28. The locking position illustrated in phantom in FIG. 6, and in the solid line enlarged view of FIG. 10, is thereby assumed. As long as leader clasp 54 is still out of its home slot position 64, any attempted upward movement of loader 28 will be restricted immediately by contact between catch lip 126 and catch element 68.**

This locking action serves an important backup purpose, since there is the possibility that locking lever 50 will inadvertently be returned to its rest position (illustrated in FIG. 2A) before all the tape has been rewound into cartridge 30. If this occurs, lifting of loader 28 at this time would mutilate the tape. However, placing locking lever 50 in its unlocked position is not sufficient to permit loader 28 to be lifted — regardless of the position of locking lever 50 and its coupled lug **50*e* (FIG. 9), catch 68 will continue to retain loader 28 in its loaded position by contact with lip 126 as illustrated in FIG. 10. Unless and until leader clasp 54 returns to home slot position 64, thereby causing catch 68 to rotate opposite to the direction indicated by the arrow in FIG. 10 and thereby release catch lip 126, loader 28** will remain locked in the loaded position.

J. The Free Rotation of the Tape Supply Reel

1. THE CARTRIDGE DESIGN

The design of cartridge 30 is also arranged to provide significant advantages to the system of this invention. As previously noted the shape of cartridge 30 is arranged to mate with the upper section of loader 28, as best illustrated in FIG. 2B. Moreover, the external and internal designs of cartridge 30, when mounted on supply drive structure 34 (FIG. 2A), serve to furnish the full equivalent of a genuine reel-to-reel system. This is unusual when cassettes or cartridges are utilized, and represents a highly desirable feature of the present invention.

The relationship between the construction of cartridge 30 and the freely rotatable mounting position achieved when cartridge 30 is in position on drive structure 34, is best appreciated by a consideration of FIGS. 2A, 2B and 4. Supply reel 94 of cartridge 30 has access to drive structure 34 on upper tape deck surface 22 by means of circular aperture 160 in bottom tongue 92 of loader 28 (FIG. 2B). Further referring to FIG. 2B, supply reel 94, has, as its bottom surface, an outer flange 96, an annular surface area 98 elevated from flange 96, and an internal flange 100 having the same relative height from surface 98 as does flange 96. The presence of internal flange 100 defines central aperture 102, through which drive shaft 36 of supply drive structure 34 will be inserted.

2. THE LOADING OF THE CARTRIDGE

When the loading step is initiated by lowering loader 28 down towards upper surface 22 of tape deck 20, it can be appreciated from a consideration of FIGS. 2A, 2B and 4 that initially, the lower portion of supply reel aperture 102 surrounds the upper tip of drive shaft 36 of drive structure 34 (FIG. 2A). As aperture 102 continues its downward motion over and around drive shaft 36, the oppositely disposed projecting arms of spring clip 38 are compressed inwardly so that the dimension between the outermost projections thereof is equivalent to the diameter of drive shaft 36. This permits cartridge 30, with internal aperture 102 of supply reel 94, to continue its downward mounting motion during loading. Ultimately, mounting is concluded as will be discussed below when cartridge housing **30*c* comes to rest on corner support shoulders 44*b*, FIG. 5.**

The geometry of drive structure 34, and particularly of central drive shaft 36 with projecting spring clip 38, and the complementing geometry of supply reel 94 and particularly of central aperture 102 and surrounding lower flange 96, are such that at the conclusion of loading, and after tension has been applied to the tape, supply reel 94, having recording tape 60T wound thereon, is not in contact with the surrounding housing **30*c* of cartridge 30. The only contact being made by supply reel 94 is with elements applying rotational forces to it from drive motor 130 via shaft 132. None of the usual friction-producing forces, which tend to impede supply reels in cassette or cartridge systems is present, and whether supply reel 94** is feeding tape to the system in the forward direction or having the tape returned to it during rewind, reel 94 is positioned in essentially a free rotational orientation with respect to surrounding housing 30*c* of cartridge 30. Accordingly, supply reel 94 together with take-up reel 32 forms a true reel-to-reel system with no irregularities in motion based upon the presence of the cartridge housing itself.

3. THE SUPPLY REEL AND DRIVE SHAFT MOUNTING RELATIONSHIP

To achieve this free rotational position during mounting, it can be appreciated that as central aperture 102 of supply reel 94 is lowered over supply drive shaft 36, there is initially a clearance between the aperture 102 and the shaft 36. After a very short downward excursion, however, the bottom of aperture 102 will come into contact with the upper projecting portions of spring clip 38. This initial contact will force reel 94 upward with respect to surrounding cartridge housing 30*c*. Thus, even as cartridge 30 is mounted on shaft 36, reel 94 is lifted within cartridge 30 so that it is clear of surrounding housing 30c. The downward mounting continues, with spring clip 38 compressed within the confines of the diameter of shaft 36 (substantially equivalent to the inside diameter of aperture 102), until the lowermost mounting point is reached, with outer flange 96 of supply reel 94 in contact with surrounding ridge 42 of the drive hub 34.

The interior surface of aperture 102 of supply reel 94 contains one or more pairs of oppositely disposed grooves such as 102*a* and 102*b* — each groove is 180° away from the other groove of any pair and the two grooves are adapted to receive the opposed arms of spring clip 38 therein, either upon the mounting of cartridge 30 onto drive shaft 36, or upon the initiation of rotation of drive shaft 36 in response to the driving action supplied by shaft 132 of motor 130 (the driving action from shaft 132 is transferred to shaft 36 by means of threaded member 36a and metal insert 36*b*, which bears against shaft 132 and which are mounted in the main body of drive hub 34). This arrangement insures that there will be direct driving from motor 130 to supply drive structure 34. Generally, during mounting, cartridge 30 will be lodged over drive shaft 36 such that the opposed arms of spring clip 38 are not aligned with any pair of grooves 102*a*, 102*b*. Thus, when shaft 36 begins to rotate at the commencement of tape advance (or in response to the application of tape tension to the system as described above), a firm gripping action between shaft 36 and supply reel 94 will not be established until shaft 94 rotates to a point where the opposed arms of spring clip 38 can expand into receiving grooves 102*a*, 102*b*. If one pair of such grooves is utilized on the interior surface of aperture 102, shaft 36 needs to rotate a maximum of slightly less than 180° to insure the expansion of the opposed arms of spring clip 38 into grooves 102*a*, 102*b*. If, for example, three pairs of such opposed grooves are utilized (thus placing one groove every 60° around the internal circumference of aperture 102), then the maximum rotation of shaft 36 necessary before the expansion of the arms of clip 38 will be slightly less than 60°. In any event, whether upon mounting itself or based upon the slight rotation of shaft 36 mentioned herein, the arms of spring clip 38 will shortly be disposed within receiving grooves 102*a*, 102*b* and positive coupling will then exist between shaft 36 and supply reel 94. This furnishes supply reel 94 with direct rotational power from drive shaft 132 of motor 130.

In addition, the relevant geometry of elements such as shaft 36, spring clip 38, aperture 102, grooves 102*a*, 102*b* and reel 94, all contribute to the resultant position of reel 94 which will permit free rotational movement thereof with respect to its surrounding cartridge housing 30*c*. When cartridge 30 is lowered within loader 28, causing aperture 102 of supply reel 94 to be disposed around shaft 36, contact between the outwardly projecting opposed arms of spring clip 38 and the lowermost corner of interior flange 102 of supply reel 94 causes supply reel 94 to be elevated within cartridge 30. As is apparent from the ultimate position reached by cartridge 30, as illustrated in FIG. 4, the continued downward movement of cartridge 30 maintains reel 94 with a slight clearance with respect to both the bottom and top interior surfaces of cartridge housing 30c. Thus, as shown in FIG. 4, the only contact made by supply reel 94 with any other elements is that between (*a*) expanded spring clip 38 and grooves 102*a*, 102*b*, and (*b*) between supply reel outer flange 96 and surrounding ridge 42 of supply drive structure 34. Internal flange 100 is raised from depressed annular region 40 of supply drive structure 34, while there is a complete clearance space between the outwardly projecting elements of reel 94 and cartridge housing 30*c*. The clearance space is identified in FIG. 4 by numeral 30*d*.

4. AUXILIARY RETENTION OF CARTRIDGE

Following the loading step, it has already been noted that loader 28 is retained in the lowered loaded position both by means of overlying locking lever 50 and, following the initial commencement of tape movement, by locking catch 68. When tape tension is applied by the sequential operation of microswitches 142 and 154, initial drive bias will be applied from supply reel motor 130 via its drive shaft 132 to rotate supply reel drive shaft 36. During this preliminary rotation as tape tension is applied to the system, supply reel 94 will rotate at least as far as is necessary to permit the opposed arms of spring clip 38 to expand into opposed receiving grooves 102*a*, 102*b* on the inner periphery of central aperture 102 of supply reel 94. In making this rotation, and in making the subsequent rotations which will occur during both supply and rewind as the system operates, supply reel 94 will obviously be rotating at considerable speeds with respect to its surrounding housing 30*c* of cartridge 30. In order to insure that the free rotational orientation of supply reel 94 is fully maintained and to prevent any unnecessary buffeting or undesired lateral or vertical movement of cartridge 30, the surrounding cartridge housing 30*c* is firmly retained in place by a pair of spring clips 46, shown in FIGS. 2A and 3 to be disposed at opposite corners of wall 44.

Figure 5:
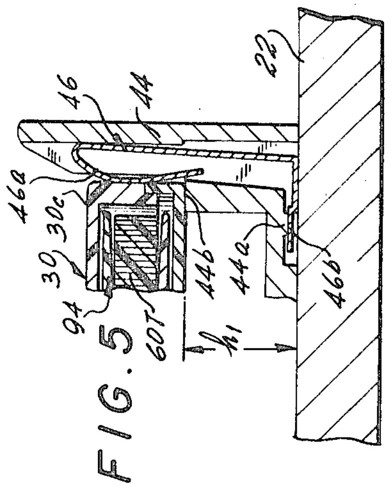
FIG. 5 is a fragmentary sectional view of the cartridge retaining structure mounted on the tape deck, taken along the line 5—5 of FIG. 3 in the direction of the arrows.

As noted in FIG. 5, as cartridge 30 is lowered towards tape deck surface 22, housing 30*c* comes into contact with curved portion 46*a* of spring clip 46. Spring clip 46 has a base portion 46*b* in contact with the upper surface 22 of tape deck 20 and which is fixedly mounted to that tape deck surface by a segment 44*a* of wall member 44. As cartridge 30 continues to be lowered, in loader 28, towards the surface 22 of tape deck 20, the lower outer corner of cartridge housing 30*c* comes into contact with internal retaining shoulder 44*b* or wall 44. Shoulder 44*b* acts as a stop against further downward movement of cartridge 30, and defines the height of loaded cartridge 30 above surface 22 of the tape deck. In the loaded position, the outer vertical edge of cartridge housing 30*c* compresses curved spring arm 46*a* towards wall 44, and spring arm 46*a* thus provides a retaining action with respect to cartridge 30 in the loaded position. As noted, this serves to insure that no undesirable movement of cartridge housing 30*c* takes place during the active cycle (i.e., either tape advance or rewind) of supply reel 94.

The height of shoulder 44b above tape deck surface 22, indicated as $h_1$ in FIG. 5, is identical to the height of the upper surface of the flange wheel of supply drive structure 34 above the same surface, identified as $h_2$ in FIG. 4. Specifically, the distance between the upper surface of surrounding ridge 42 of supply drive wheel structure 34 and upper tape deck surface 22, equals the distance between the upper surface of shoulder 44*b* and tape deck surface 22 (i.e., $h_1=h_2$). When outer flange 96 of supply reel 94 rests on ridge 42 as illustrated in FIG. 4, and the free rotational position has been achieved, the bottom of flange 96 will be in horizontal alignment with (but not touching) the lower surface of surrounding cartridge housing 30*c*. At the same time, shoulder 44*b*, on which cartridge housing 30*c* rests, insures that cartridge 30 will remain at the proper height such that the free rotational position of supply reel 94 is maintained.

II. OPERATION OF THE TAPE DECK SYSTEM

The following description indicates a typical cycle of the system of the invention as the tape cartridge is loaded onto the tape deck and various electronic and electromechanical responsive actions take place.

A. The Pre-Loaded Condition

Tape deck 20 is initially set up, prior to loading, as is generally illustrated in FIG. 2A. Thus, loader 28 is in its elevated position, having been raised to that position by rotation clockwise from the position shown in FIG. 6 about pins 158*a*, 158*b* mounted in respective brackets 22a, 22b affixed to upper tape deck surface 22. Leader clasp 54 is positioned in its home slot 64 within guide block 48, with split post 62 in position to receive thereover eyelet 114 attached to recording tape 60T within cartridge 30. This receiving position for post 62 is assured by the action of lug 50*e*, which is at position 50*e*' in FIG. 9 when locking lever 50 is in the unlocked position. Tape leader 60, which may illustratively be of transparent mylar, is affixed to permanent leader clasp retaining post 56, and is threaded around the back of tape guide post 74, 76, past write and read heads 78 and 80 respectively, behind guide posts 82, 84 and around cylindrical roller (illustratively made of rubber) 88 of friction capstan 86 into take-up reel assembly 32. This path of leader 60 defines the subsequent path of the actual recording tape 60T during both forward and reverse movement of the tape when the system is operational.

B. The Depositing of the Cartridge in the Loader

Loader 28 receives tape cartridge 30 by the lowering of cartridge 30 into the position illustrated in FIG. 2B. The view of FIG. 2B represents cartridge 30 within loader 28 as seen from the perspective of line 2—2 of FIG. 2A — thus, loader 28 is in the elevated position in which it is substantially vertical, and perpendicular to the plane of tape deck surface 22. (Actually, in order to permit loader 28 to remain stationary and stable with cartridge 30 therein, the elevated rest position of loader 28 may be slightly beyond the vertical.)

Cartridge 30 is lowered into the raised loader 28 with the one square corner of cartridge 30 pointing downwards as indicated in FIG. 2B. As cartridge 30 moves downward between upper and lower tongues 90 and 92 respectively of loader 28, it ultimately comes to rest in the position shown in FIG. 2B, with one of its straight side surfaces 106 resting against support arm 110 of loader 28, and the other straight side surface 108 resting against support arm 112. With this positioning, a portion of cartridge housing 30c fully occupies the space immediately behind clearance hole 122 in lower tongue 92 of loader 28. The depositing of cartridge 30 in loader 28 also establishes the concentricity of supply reel 94 with respect to clearance hole 160 in bottom tongue 92 of loader 28, as seen in FIG. 2B. The portions of supply reel 94 which are to mate with drive structure 34 on tape deck surface 22 are thereby accessible for loading and mounting which will generally take place shortly after the cartridge has been deposited in the loader.

C. The Tape Deck Just Prior to Loading

With cartridge 30 having been deposited in loader 28 as shown in FIGS. 2A and 2B and just prior to the mounting step, the elements on tape deck surface 22 appear substantially as they do in FIG. 2A. Thus, locking lever 50 is in its unlocked position, with its surface 50*a* in position against rest stop 52 on guide block 48. Leader clasp 54 is precisely in its home slot 64 to permit alignment between split post 62 and eyelet 114 to which is attached recording tape 60T of cartridge 30. As briefly noted above, the precise home slot positioning of leader clasp 54 is guaranteed by the unlocked position of locking lever 50, since the resultant position of locking lever shaft 50*b* and attached lug 50*e* drives leader clasp 54 into a full and proper residence position in home slot 64. As seen in FIG. 9, the unlocked position of locking lever 50 is equivalent to the phantom position 50*e*' of lug 50*e*, which is coupled to shaft 50*b*. The tip of lug 50*e* in position at 50*e*' in FIG. 9 comes into contact with the base of leader clasp post 56 and forces leader clasp 54 to the far right end of home slot 64 as seen in FIG. 9. This arrangement compels split retaining post 62 to be in alignment with eyelet 114 which is to be lowered onto post 62 during mounting.

The presence of leader clasp 54 in home slot position 64 causes ramp element 66*b* of lever 66 to be depressed against the action of spring arm 146*a* of microswitch 146. Accordingly, lever 66 occupies the solid line position illustrated in FIG. 8, thus maintaining microswitch 146 in the operated condition. The system electronics interprets this state of microswitch 146 to indicate that all of recording tape 60T is within cartridge 30 and that no rewinding should yet be permitted. Of the remaining electromechanical sensors, microswitch 142 is released, since pin 124 has not yet been depressed; microswitch 144 is similarly unoperated at this juncture, because pin 120 has not yet depressed spring arm 144a; and finally, microswitch 154 remains unoperated at this time, because of the unlocked position of locking lever 50, which causes arm 148, attached at the lower terminus of lever shaft 50*b*, to occupy the phantom position at 148' in FIGS. 6 and 7. The unoperated conditions of microswitches 142 and 154 prevent the application of tape tension to the system, since both of these switches need to be closed for that step to take place.

In addition, the auxiliary locking catch 68, which will ultimately retain loader 28 in its horizontal loaded position (FIG. 6), is in the open or clearance position illustrated from above in FIG. 2A. Thus, as loader 28 is lowered towards the horizontal loaded position, catch lip 126 of loader 28 will bypass the upper hook of catch 68 and move into position to receive catch 68 when clasp 54 moves out of home slot 64.

D. The Loading Step

Cartridge 30 having been deposited into loader 28, the actual loading of the cartridge on to tape deck 20 proceeds by rotating loader 28 counterclockwise about support brackets 22*a*, 22*b* which carry pins 158*a*, 158*b* respectively of loader 28. As loader 28 is thusly lowered towards tape deck surface 22, the first physical contact is made between the lowermost surface of supply reel 94 and the uppermost rim of supply drive structure 34 on tape deck 20. Specifically, when the lower inside edge of central aperture 102 of supply reel 94 comes into contact with the upper surface of drive shaft 36, supply reel 94 is preliminarily lifted from a position in which it rests on the lower inside surface of cartridge housing 30*c* to a position such that the reel makes contact with the inside upper surface of cartridge housing 30*c*.

As loader 28 continues to be lowered towards the horizontal position with respect to tape deck surface 22 (FIG. 6), cartridge 30 is further lowered onto drive shaft 36, compressing spring clip 38 inwardly. Ultimately, loader 28 comes to rest by virtue of the contact between the bottom of cartridge housing 30*c* and shoulders 44*b* (FIG. 5), and between loader ribs 93 (FIG. 4) and the top of cartridge housing 30*c*. At this point, therefore, spring clip 38 is compressed into a dimension equivalent to the outer diameter of drive shaft 36. As described in more detail later, when locking lever 50 is turned clockwise until it occupies the position shown in FIG. 3, microswitch 154 is actuated and tension is applied to the tape. This causes rotation of reel 94 until the arms of spring 38 snap into a pair of grooves 102*a*, 102*b* and force the reel down onto hub 34. Accordingly, the only physical contact made by reel 94 in the mounted conditions is with drive structure 34, namely between spring clip 38 and the interior of central aperture 102, and between supply reel flange 96 and support ridge 42. Supply reel 94 is therefore in a position to receive only rotational forces, with no impeding action resulting from sliding or friction forces, for example, with its own housing 30*c*.

This portion of the loading step has resulted in the preliminary activation of two of the microswitches mounted to the undersurface 128 of tape deck 20. Initially, as loader 28 was lowered to surface 22, pin 124 mated with clearance hole 122 of loader 28. As shown in FIG. 8, the presence of cartridge 30 in loader 28 caused pin 124 to move from phantom position 124 in FIG. 8 to the full line position at 124' in FIG. 8. This resulted in the depression of microswitch spring arm 142*a* by tip 124*a*, and hence depression of button 142*b* of microswitch 142. However, the initial operation of microswitch 142 is ineffective to achieve any other responsive action at this time.

Assuming that cartridge 30 contains recording tape 60T on which both the writing and reading functions are to be permitted, a "write enable" plug or pin 118 will have previously been inserted into write control cavity 116 in cartridge 30. During loading, write enable plug 118 will come into contact with pin 120 and will depress that pin against the urging of microswitch spring arm 144*a*. The resultant depressing of switch contact 144*b* will operate microswitch 144, thereby informing the system electronics that the character of the data, if any, contained on tape 60T in this cartridge 30 is such that writing (and thus the erasing of existing date) is to be permitted. On the other hand, if the existing data on tape 60T must be preserved, the write enable plug 118 will be omitted from control cavity 116. In that event, as loader 28 is lowered towards tape deck surface 22, control cavity 116 will clear pin 120 without contact therebetween, thereby causing microswitch 144 to remain in the unoperated condition. This will cause the system electronics to inhibit the writing function throughout the operation of the system with respect to this particular cartridge 30.

E. Initial Locking-in of the Loader

Once loader 28 has been lowered into the horizontal loading position illustrated in FIG. 6, locking lever 50 is then rotated 90° clockwise about its shaft 50*b* which is mounted through guide block 48 and tape deck surfaces 22 and 128, terminating at arm 148 beneath tape deck surface 128 (FIGS. 6, 7). The rotation of locking lever 50 is limited by stop 50d after lever 50 has passed over guide ramp 50*c*; when in the rest position illustrated in FIG. 4 (with the tension of spring 152 having been overcome), locking lever 50 resides in a slight depression in ramp 50*c*. When locking lever 50 assumes the locked position illustrated in FIG. 3, it overlies the upper surface of loader 28 and directly prevents loader 28 from being lifted from tape deck surface 22. This is the first mechanical locking feature of the invention which precludes accidental elevation of loader 28 once the system has become even partially operational.

F. The Electrical Response to the Initial Locking Step

As locking lever 50 moves to the locked position shown in FIGS. 3 and 4, its shaft 50*b* causes the rotation of right angle arm 148 from the phantom position at 148' to the full line position thereof at 148 in FIGS. 6 and 7. This movement, against the slight tension action of spring 152 (which also moves from the phantom position at 152' in FIG. 7 to the full line position at 152), brings the right edge surface of arm 148 into contact with the rear surface (in FIG. 6) of spring arm 154*a* of microswitch 154. This causes contact 154*b* of that switch to be depressed, and microswitch 154 is thereby operated. This step, coupled with the prior operation of microswitch 142, results in the application of tape tension to the system.

Specifically, the system electronics thereby powers drive shafts 132 and 136 of supply and take-up reel motors 130 and 134 respectively to provide equal and opposite torques to supply reel 94 and to take-up reel 32 respectively. Because of the application of equal and opposite driving forces to the supply and take-up reels, no movement of tape leader 60 or recording tape 60T yet commences. However, it will be recalled that during loading, spring clip 38 was compressed into the diameter of shaft 36 as the shaft was captured within the internal surface of aperture 102 of supply reel 94. Spring clip 38 remains in this compressed condition until tape tension is applied to the system — at this point, a clockwise torque (from the perspective of FIG. 2A) is applied to drive shaft 36, which will then rotate slightly to the point at which the opposed arms of spring clip 38 are aligned with receiving grooves 102*a*, 102*b* in the internal surface of central aperture 102. When such alignment occurs, the arms of spring clip 38 will expand into the grooves and thus establish a positive driving relationship between shaft 36 and supply reel 94, forcing reel 94 down onto hub 34 thereby bringing flange 96 into contact with surface 42. If a single pair of grooves 102*a* 102*b* is employed, drive shaft 36 will have to rotate a maximum of 180° before the arms spring into position; if, for example, three pairs of equally spaced grooves are used, the rotation of shaft 36 will only need to be approximately 60°.

G. Tape Motion

The tape deck 20 is now prepared to receive instructions from the processor to control the tape movement.

1. TAPE ADVANCE

Drive motor 138 is energized and its drive shaft 140, coupled to friction capstan 86, supplies the driving movement (e.g., clockwise in FIG. 3) to advance the tape. The control latches also supply additional driving voltage for take-up motor 134 to insure steady tape pulling; however, a bias is also provided to supply reel motor 130, thus insuring the maintenance of proper tape tension.

As leader 60 begins to advance to the right in FIGS. 2A and 3, and is gradually wrapped around internal hub 32*a* of take-up reel 32, leader clasp 54 initially departs from its home slot position 64 and moves to the position indicated at 54' in FIG. 9. This movement is only permitted because of the clearance which was established when locking lever 50 was moved to the locked position indicated in FIG. 3 — this concurrently moved lug 50e to the full line position indicated in FIG. 9. This initial departure of leader clasp 54, with recording tape eyelet 114 attached to retaining post 62 thereof, begins to withdraw tape 60T from cartridge 30. In so doing, cartridge latch 30*e*, which normally holds eyelet 114 secure, is then permitted to rotate counterclockwise about pin 30*f* under the urging of right angle spring 30*g*. The tape advance is facilitated by cartridge guide post 30*h*. When all the tape is later rewound onto supply reel 94, eyelet 114, mounted on split retaining post 62, forces latch 30*e* to rotate clockwise about pin 30*f*, although eyelet 114, even when removed from post 62, cannot enter the interior of cartridge 30 and is thereby captured in the position illustrated in FIG. 9. The upper edge of latch 30e thereby forms a contiguous straight surface 108 for cartridge 30.

When the initial tape advance causes leader clasp 54 to move out of the home slot 64 to the position indicated at 54' in FIG. 9, lever 66 assumes the phantom position at 66' in FIG. 8, under the upward urging of spring arm 146*a* of microswitch 146. Since there is no longer any upper obstruction against ramp edge 66*b* of lever 66, that edge moves to phantom position 66*b*' in home slot 64, with the downward leg of lever 66 moving to skew position 66*a*' as the microswitch arm goes to position 146*a*'. The upward movement of microswitch arm 146*a* causes microswitch 146 to release (i.e., contact 146*b* moves upwardly) and the processor is informed that tape advance has commenced and that the rewind function should no longer be inhibited when rewind is subsequently desired.

The movement of lever 66 to position 66' in FIG. 8 also provides the auxiliary locking action furnished by catch 68 on loader 28. Thus, catch 68 rotates about pin 70 under the upward urging of integral lever arm 66*d*, which moves to position 66*d*' in FIG. 8. Pin 68*a* rides within hole 66*e* in bracket 66*d*, and as the lever arm assumes position 66*d*', catch 68 rotates in the direction indicated by the arrow in FIG. 10 and hooks into retaining position with lip 126 of loader 28. Loader 28 is thereby locked into the loaded horizontal position illustrated in FIG. 6, and even if locking lever 50 is erroneously moved to the unlocked position (e.g., as shown in FIG. 2A), the auxiliary locking action of catch 68 will prevent loader 28 from being elevated from tape deck surface 22 as long as tape 60T has not been fully returned to cartridge 30 (indicated by the return of leader clasp 54 to home slot position 64). The return of leader clasp 54 will cause ramp edge 66*b*' of 66 to re-assume the full line position at 66b in FIG. 8, thereby unlocking catch 68 from lip 126 of loader 28.

In the event that catch 68 inadvertently or improperly becomes linked with lip 126, thereby locking loader 28 to the tape deck (e.g., by the withdrawal of leader clasp 54 from home slot 64 before loading, followed by lowering loader 28 to tape deck surface 22), access may be had to catch 68 to manually unhook it from lip 126. For example, an attendant may correct such inadvertent locking by virtue of the provision of an aperture (not shown) in the upper plate of loader 28 to give direct access, through the loader, to catch 68 and lip 126, thus permitting disengagement of these two elements.

As recording tape 60T advances in the forward direction towards take-up reel 32, leader clasp 54, having moved from the position designated by 54 in FIG. 9 to the position 54' in FIG. 9 and then beyond in the direction of the arrow in FIG. 9, follows the path defined in FIGS. 2A and 3 by leader 60. Inner hub 32*a* of take-up reel 32 rotates in response to counterclockwise rotation of drive shaft 136, with leader 60 being wound around inner hub 32*a*. Outer take-up reel hub 32*c* remains stationary during this initial movement. When leader clasp 54 arrives at cut-out aperture 32*d*, it is captured therein, and forms a substantially circular circumference with the remainder of outer hub 32*c*. Moreover clasp 54 causes inner and outer hubs 32*a* and 32*c* respectively to thereafter rotate in tandem by having become lodged in the aperture formed by cut-out 32*d*. Accordingly, the counterclockwise drive power supplied by motor shaft 136 is thereafter effective to rotate both hubs of take-up reel assembly 32. Thus, all of the magnetic recording tape 60T which is accumulated on take-up reel 32 will be wound around outer hub 32*c* and will stack up above surrounding flange 32*e*, but will not make contact with the flange unless tension is released. As the tape is wound around hub 32*c*, it will also be wound around the opening created by cut-out 32*d* in which leader clasp 54 now resides. Recording tape 60T is therefore uniformly wound on outer hub 32*c*, with no "bumps" and without stretching or distorting the tape.

2. TAPE REWIND

During the system operation, the writing function is achieved, under the control of the system electronics, by write head 78 which is in contact with the tape at head surface 78*a*; similarly, the reading function is achieved by head 80 at pickup surface 80*a*. When the reading and writing functions for any particular tape cartridge 30 have been completed, rewind is accomplished by removing the additional voltage which had been supplied to take-up reel motor 134, by applying such additional voltage to supply reel motor 130 and by reversing the direction of rotation of friction capstan motor 138. In response to the rewind instructions, supply drive hub 34 commences its rotation in the clockwise direction, and the concurrent counterclockwise rotation of friction capstan 86 results in the clockwise rotation of take-up reel 32, thus unwinding recording tape 60T which had been wound on outer hub 32c. Rewind continues, with tape 60T following the path indicated in FIGS. 2A and 3 around guide posts 84, 82, past heads 80 and 78 and finally past guide posts 76, 74 into supply reel 94 via home slot 64.

When leader clasp 54 ultimately arrives in home slot 64, returning it to the position shown in FIG. 8 (and at the position indicated at 54, rather than 54', in FIG. 9), the upper ramp edge of lever 66 is depressed downward from the position at 66*b'* to that of position 66b in FIG. 8. This unlatches catch 68 from catch lip 126 of loader 28 and also depresses the spring arm of microswitch 146 from the position at 146*a'* to that of 146*a* in FIG. 8. The processor and control latches are thereby advised of the return of leader clasp 54 to home slot 64, and the rewind function is thereafter inhibited. The additional bias voltage furnished to supply drive reel motor 130 is removed and applied instead to take-up motor 134, and friction capstan 86 is brought to a halt. However, the tape tension applied to the system by virtue of the opposite pulling forces furnished by motors 130 and 134 will remain until locking lever 50 is returned to its unlocked position, as illustrated in FIG. 2A, which causes microswitch 154 to open.

H. Conclusion of Operation

When the system operation with respect to any cartridge 30 has been completed, following rewind locking lever 50 is returned to its unlocked position, removing tape tension from the system as mentioned above. Loader 28 can then be elevated from the loaded position of FIG. 6 to the substantially vertical unloaded position of FIG. 2A. There are no restrictions to this elevation of loader 28, since catch 68 has been disengaged from lip 126, and locking lever has been removed from its locked position. With the loader 28 in its elevated position, cartridge 30 may be manually removed from the system by gripping serrated edges 30*a*, 30*b*, with the system thereafter being available for the loading in of additional cartridges.

III. THE TAPE TRAVEL GUIDES

The use of the guide posts of the present invention eliminates several problems associated with prior art tape guiding apparatus. One form of such prior art tape guide is illustrated in FIG. 20A, wherein a fixed I-shaped guide post 632 is illustrated. Guide post 632 includes an upper, generally circular, flange 632*a* connected to a similar lower flange 632*b* by central shaft 632*c*. The distance between the lower surface of flange 632*a* and the upper surface of flange 632*b* is just slightly less than the width of tape 634 which is to be guided by guide post 632. Accordingly, the normal orientation of tape 634 with respect to guide 632 is that shown in somewhat exaggerated fashion to the left of shaft 632*c*, namely, with the upper and lower edges of tape 634 slightly "curled" as the tape passes through guide post 632, for example, on its way to the head in a typical prior art tape deck (not shown). Assuming that the first head which tape 634 of prior art tape guide post 632 reaches after leaving the guide post is a write head, it may well be that some part of the curl of tape 634 shown in FIG. 20A will still be present at tape 634 passes by such write head. This will cause at least some portion of the surface of tape 634 to be separated from the effective portion of the write head, thus raising the distinct possibility that some data will not be properly recorded on tape 634. Similarly, it is possible that tape 634 will assume the orientation illustrated at phantom position 634' in FIG. 20A. Thus, while the upper edge of tape 634' has become properly aligned with the lower surface of upper flange 632*a*, the lower edge of tape 634' has assumed an even greater curl than that illustrated at 634, and has commenced to curl out against the horizontal upper surface of flange 632*b*. This degree of curl is totally unsatisfactory, since some erroneous data entries will almost invariably take place where the curl illustrated at 634' in FIG. 20A is not overcome by some external means (e.g., separate circuitry or additional mechanical devices) before the tape arrives at the write heads. The operation of the read head can also be adversely affected, by data not being picked up as the curled tape moves past the head.

Figure 20C:
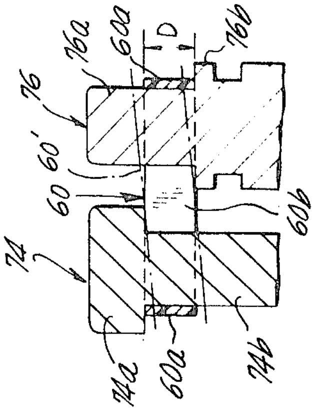
FIG. 20C is an enlarged fragmentary sectional view of one pair of adjacent guide posts in accordance with the present invention, showing a segment of recording tape passing behind both posts in alignment therewith (in solid line) and with an exaggerated deflection (in phantom).
Figure 20A:
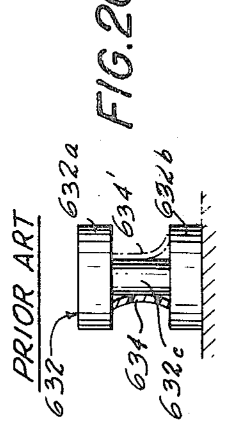
FIG. 20A is a side view of one version of a prior art tape guide.
Figure 20B:
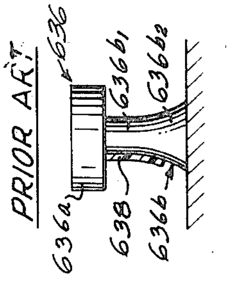
FIG. 20B is a side view of a second version of a prior art tape guide.

Another somewhat unsatisfactory prior art device is illustrated in FIG. 20B, showing guide post 636 having a single upper flange 636*a* and a supporting shaft 636*b* with an upper substantially cylindrical portion $636b_1$ and a lower conical-shaped portion $636b_2$. The presence of conical portion $636b_2$ tends to force tape 638 to ride upwardly so that its upper edge is in contact with the lower surface of flange 636*a*. However, such upward force is attributable to the riding of the lower edge of tape 68 against spread conical portion $636b_2$. The existence of the greater diameter for this lower conical portion tends to stretch tape 638 as it curls outwardly toward the lower edge thereof; such stretching of the tape may result in its permanent distortion, leading to a much greater probability of errors in both the write and read cycles.

The tape travel guide post arrangement of the present invention avoids these prior art shortcomings, and a detailed showing of the relationship of tape 60 as it passes by illustrative guide post pair 74, 76 is given in FIG. 20C. This drawing figure represents a sectional view through a portion of first guide post 74 and second guide post 76. The first guide post with which tape 60 comes in contact in its travel from cartridge 30 towards heads 78, 80, is post 74, having upper flange 74a mounted on underlying shaft 74*b*. While tape 60 is generally free to slide in the downward direction along shaft 74*b*, its upward movement is limited by the lower surface of flange 74*a*. Generally, the upper edge of tape 60 will rides against the lower surface of flange 74*a*, as best illustrated at the left of post 74 in FIG. 20C. Any tendency for tape 60 to rise upward as it passes post 74 will be resisted by the presence of the lower surface of flange 74*a* which, in effect, acts to slightly urge tape 60 downward along shaft 74*b*.

However, any tendency toward downward motion of tape 60 with respect to guide post 74 is restricted by the second guide post 76 of the pair of guide posts 74, 76. Thus, as is seen in FIG. 20C, guide post 76 includes an upper free-standing shaft 76*a* and an underlying flange 76*b*. The lower edge of tape 60 rides on the upper surface of flange 76*b* during tape travel. Thus, any tendency for tape 60 to ride downward along shaft **74*b* is restricted by the presence of adjacent flange 76*b*, which limits the downward movement of tape 60. Any urging of tape 60 upward along shaft 76*a* of post 76 is restricted by contact between the upper edge of tape 60 and the lower surface of flange 74*a* of post 74. It is therefore seen that the two posts 74 and 76 complement each other in restricting the movement of tape 60 in either the upward or downward direction shown in FIG. 20C**.

With guide posts 74 and 76 adjacent to each other, tape 60 is gently urged downward in the course of its travel from post 74 to post 76. The dimension between the lower surface of flange **74*a* of post 74 and the upper surface of flange 76*b* of post 76, identified as D in FIG. 20C, is perhaps a few thousandths of an inch less than the width of the tape 60. For example, where tape 60 has a width of 0.150 inches (+0.000, −0.002), the dimension D in FIG. 20C will be approximately 0.148 inches. For the minimum width of such tape, there will be near perfect alignment with flanges 74*a*, 76*b*. The slight reduction in dimension D as compared to the maximum width of such tape may cause the tape 60 to deflect slightly toward the exaggerated position shown at 60′ in FIG. 20C. However, this slight skew will generally be eliminated by the time tape 60 has traveled between post 76 and effective region 80*a* of head 80, or will not be great enough to interfere with either the rear or write cycles. The effect of any such skew is rendered negligible by making the distance (hereinafter referred to as L) between guide post 76 and effective head region 78a sufficiently long that the deflection, if any, associated with tape 60 as it rides along the upper surface of flange 76*b*, will be dissipated by the time the tape arrives at head region 78*a*. For example, the distance L may be approximately 1 inch, where the tape is utilized on a tape deck system having a read and write speed of 10 inches per second and rewind and search speeds of 40 inches per second. The distances (hereinafter referred to as L′ and L″ respectively) between head regions 78*a* and 80*a*, and between head region 80*a* and inner guide post 82 of the other pair, are similarly relevant to eliminating the effect of any deflection. Distance L″ will be equal to distance L, while distance L′ may be slightly less, e.g., approximately 0.85 inches. The cumulative total of distances L, L′ and L″ will serve to properly align tape 60 with head regions 78*a* and 80*a***.

When tape tension is present in the system, for example, during or prior to tape travel, the tape will be maintained in a relatively taut condition, thus resulting in effective and intimate contact between tape 60 and effective head regions **78*a* and 80*a*. This tensioning of tape 60, together with selecting appropriate distances L, L′ and L″, will serve to maintain tape 60 against and aligned with head portions 78*a* and 80*a* regardless of any deflection which may exist with respect to the lower edge of tape 60 and the upper surface of flange 76.**

The same dimensional relationships which have been described above with respect to the pair of guide posts 74, 76, also exist with respect to corresponding pair of guide posts 82, 84, located between read head 80 and friction capstan 86. In this embodiment, in which two pairs of guide posts are used, there should be symmetry between guide post pairs 74, 76 and 82, 84; thus, the geometry of post 82 will be the same as that of post 76, while the geometry of post 84 will be that of post 74. The lower edge of tape 60 rides on the upper surface of flange **82*b* of post 82, with the tape being essentially free to slide upwards along shaft 82*a* of post 82. However, any such upward movement is restricted by the lower surface of flange 84*a* of post 84, which is adjacent to post 82. The exaggerated skew shown at 60′ in FIG. 20C will be present (with the opposite incline) between posts 84 and 82 during rewind. Both pairs of guide posts 74, 76 and 82, 84 serve, together, to guide tape 60** in its travel either in the forward or reverse directions.

The overall guidance effect achieved by guide post pairs 74, 76 and 82, 84 can be considered in terms of an initial and a subsequent adjustment achieved by each post of each pair. Thus, the significant and ultimately controlling posts of the system of the invention, in the embodiment in which a pair of posts is used on each side of the heads, are innermost guide post 76 and 82. The controlling upper surfaces of flange **76*b* of post 76 and of flange 82*b* of post 82 are established at a height above the surface of the tape deck such that the center of tape 60 will thereby pass across the effective parts of regions 78*a* and 80*a* of heads 78 and 80 respectively. In the forward direction, tape 60 will initially contact the lower surface of flange 74*a* of post 74, and will receive an initial vertical adjustment therefrom; however, in passing to heads 78 and 80 in the forward direction, the vertical orientation of tape 60 will be principally controlled by the contact between the lower edge of tape 60 and the upper surface of flange 76*b* of post 76. Similarly, in the reverse direction (i.e., during rewind), the tape 60 will initially be adjusted vertically by contact between its upper edge and the lower surface of the flange of post 84. However, the controlling vertical adjustment of tape 60 in its travel toward heads 78 and 80 from the right in FIG. 2A will be based upon the contact between the lower edge of tape 60 and the upper surface of flange 82*b* of post 82. Thus, posts 74 and 84 can be considered to establish an initial "coarse" alignment of the vertical position of tape 60 during tape travel; inner posts 76 and 82, however, establish the "fine" control which guarantees the proper alignment of tape 60 with respect to effective head portions 78*a* and 80*a***.

It was noted previously that in the illustrative embodiment utilizing two pairs of guide posts, the arrangement of the posts should be symmetrical in order to be effective to control the vertical alignment of tape 60. This symmetry is demonstrated, of course, in the relative geometry of the posts illustrated, where inner posts 76 and 82 are identical as are posts 74 and 84. The present invention can also operate effectively to achieve the same result if each outer post has the geometry of post 76 and 82, while the inner posts have the geometry of posts 74 and 84. In that event, the inner posts (i.e., those closest to the heads) will still be the controlling ones with respect to the vertical orientation of tape 60. However, the ultimate controlling alignment surface will then be the lower surface of the upper flange of each inner post, which will have a T-shaped cross-sectional appearance. Also in that case, the outer posts, having the geometry of present inner posts 76 and 82, will provide the initial course alignment between the bottom edge of tape 60 and the upper surface of their lower flanges, with the fine adjustment referred to above being made by the inner posts and the lower surfaces of their respective upper flanges.

An alternate embodiment of the present invention utilizes one pair of complementing guide posts on one side of the heads, while employing a single fixed guide post, with both upper and lower flanges, on the other side of the heads. For example, referring to FIG. 2A, the alternate embodiment will still employ guide posts 74 and 76 in the same manner and position as there indicated. However, guide posts 82 and 84, between the heads 78, 80 and capstan 86, will be replaced by a single guide post having a configuration substantially identical to that of guide post 632 shown in FIG. 20A. In this alternate embodiment, however, the distance between the upper and lower flanges of the single guide post is arranged to be slightly greater than the width of the tape, thereby accommodating any slight skew caused by the alignment effected by the guide posts 74, 76 as explained above (e.g., see skew position 60' of the tape in FIG. 20C).

The utilization of a single fixed guide post in place of guide posts 82, 84 is permissible because of the alignment control achieved by guide post pair 74, 76, together with the tension forces applied to the tape by the various drive motors. The spring-like action referred to above still occurs in this embodiment, although here it is based upon the guiding action of flange 74*a* and of the upper flange of the single guide post to the right of the heads, together with the tape tension. In this embodiment, therefore, the upper flange of the single fixed post provides the "fine" alignment of the tape with the "coarse" alignment being provided by the upper flange of guide post 74. In considering this embodiment, it is also relevant to note that the alignment control furnished by guide post pair 74, 76 is slightly more critical with respect to the read and write functions than is the control furnished by any guide post positioned to the right of the heads — thus, the control furnished by the righthand posts is principally effective during the rewind and search cycles, and alignment of the tape with the heads is not as critical during such cycles as it is during the read and write cycles.

It should also be appreciated that the tape travel guide of the present invention can be utilized with media other than magnetic recording tape, for example, film or paper tape, which are also capable of carrying information or images as is well known. Moreover, they can also be adapted for use in other tape handling systems.

IV. TIMING CONTROL CIRCUIT 232

Figure 11:
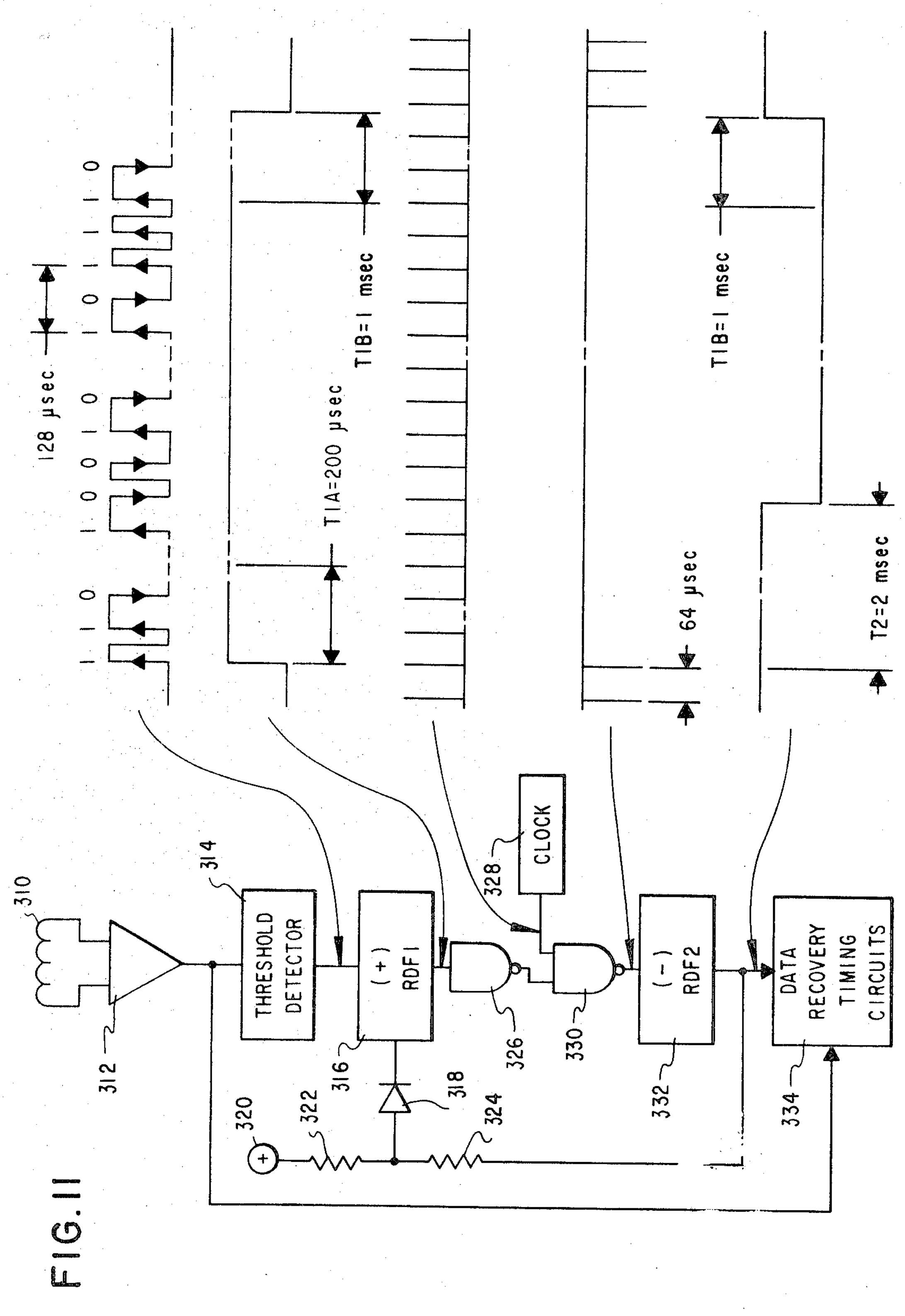
FIG. 11 depicts the bit sequence detector utilized in the tape system together with pulse waveforms at various points in the circuit.

FIG. 11 depicts in detail timing control circuit 232 of FIG. 1. In this figure, a read head 310 is shown as detecting bit signals which are amplified by amplifier 312 (corresponding to amplifiers 230 and 231 of FIG. 1). The resulting signal is then transmitted both to threshold detector 314 and data recovery timing circuits 343. These latter circuits represent those contained in processor and tape interference unit 200 of FIG. 1 (The direct connection from the output of amplifier 312 of FIG. 11 to data recovery timing circuits 334 corresponds to the signals which are transmitted over conductor 237 on FIG. 1 to the processor and tape interface unit 200 after the output of amplifier 231 on FIG. 1 has been operated upon by edge detectors 233 and 234, tracking window 235 and demodulator 236. The connection of the output of multivibrator 332 on FIG. 11 to data recovery timing circuits 334 corresponds to the connection of the output of timing control circuit 232 on FIG. 1 to processor and tape interface unit 200.) Threshold detector 314 functions to generate a square-wave signal at its output, as shown, if the input signal exceeds a minimum percentage (for example, 30 percent) of the nominal value.

The signal at the output of detector 314, as shown in the drawing, is of the phase modulation type. An upward transition symbolizes a bit value of 1 and a downward transition symbolizes a bit value of 0. At the nominal data rate, data bits occur at 64-microsecond intervals. In the event two bits of the same value follow each other, a phase transition is required between them.

The signal at the output of the detector is applied to the input of multivibrator 316. This one-shot multivibrator is triggered by a positive step, that is, when an upward transition is present in the output of threshold detector 314. The multivibrator produces a pulse at its output of predetermined width. A single pulse is generated for each trigger input. If a trigger input is received while a pulse is already being generated at the output of the multivibrator, the timing of the pulse begins anew; that is, the pulse is extended for a time interval equal to the predetermined pulse width.

Assuming that the output of multivibrator 332 is high, as it is before any data bits are detected, the junction of resistors 322 and 324 is at a greater potential than it is when the output of the multivibrator is low. Diode 318 is forward biased and a positive potential is extended to the control input of the RDF1 multivibrator 316. The potential at this control input determines the width of the pulse generated by the multivibrator. When diode 318 is forward biased by the current which flows from source 320 when the output of multivibrator 332 is high, the pulse width of multivibrator 316 is 200 microseconds. This time period is designated T1A in the waveforms of the drawing.

If data bits are received every 64 microseconds, it will be apparent that the maximum interval between two upward transitions is 128 microseconds — in the case of a 101 bit sequence. For any other sequence, upward transistions must occur within less than 128 microseconds. For example, for an all 0 sequence, upward transitions occur every 64 microseconds — between successive data bits. (The phase transistions, as long as they are in the upward direction, also trigge multivibrator 316). Since the timing period of the multivibrator is 200 microseconds and upward transistions occur continuously within this time period as long as a block of data is being read properly, multivibrator 16 is continuously re-triggered and the pulse at its output is continuously extended. This is shown in the drawing; the period T1A (200 microseconds) exceeds the time interval between any successive pair of upward transitions and consequently the output of the RDF1 multivibrator remains high.

Before data bits are detected, the output of multivibrator 316 is low and the output of inverter 326 is high. The clock pulses generated by clock 328 at 64-microsecond intervals cause the output of gate 330 to be pulsed low as long as that input of the gate connected to the output of gate 326 remains high. Thus before multivibrator 316 is triggered, negative pulses are applied to the trigger input ofthe RDF2 multivibrator at 64-microsecond intervals. This multivibrator is similar to multivibrator 316 except that it is triggered by negative pulses, and the width T2 of the pulse generated at its output is two milliseconds. Before any data bits are detected, since trigger inputs are applied to the multivibrator at 64-microsecond intervals, the pulse at its output is continuously extended and remains high. It is this high output that controls the pulse width of multivibrator 316 to be 200 micorseconds.

But as soon as the first positive step at the trigger input of multivibrator 316 is applied, the output of gate 326 goes low. At this time, the output of gate 330 remains high. Since no more trigger pulses are applied to the trigger input of multivibrator 332, its output remains high for only an additional two milliseconds after the last clock pulse. At the end of this interval (provided multivibrator 316 has not timed out, i.e., data bits have been received at at least the minimum rate), the pulse terminates and the output of multivibrator 332 goes low.

When the output of the multivibrator goes low it is an indication to the data recovery timing circuits 334 that a block of data has been accessed. It is apparent that data bits must be detected at a fast enough rate for two milliseconds before the timing circuits are so notified. If at any time two upward transistions at the output detector 314 are not detected within 200 microseconds, the output of gate 326 goes high and the next clock pulse re-triggers multivibrator 332. In such a case the multivibrator pulse is extended for another two milliseconds. A block of data is indicated only if upward transitions are detected no farther apart than 200 microseconds for a total interval of two milliseconds.

When the output of multivibrator 332 goes low, diode 318 is reverse biased. It is at this time that the width of the pluse generated by multivibrator 316 is extended to one millisecond. Thus only if no upward transition at the output of detector 314 is detected within a period of one millisecond does the output of gate 326 go high to allow the next clock pulse to trigger multivibrator 332. In the drawing, the extended pulse width of multivibrator 316 is shown by the notation T1B. It is shown as extending from the last upward transition in the output of detector 314. If no additional upward transition is detected for one millisecond, then the first clock pulse which occurs after the trailing edge of the pulse at the output of multivibrator 316 triggers multivibrator 313 whose output then goes high once again. This is a signal to timing circuits 334 that the end of the data block has been detected. Also, the width of the pulse generated by multivibrator 316 is reduced to 200 microseconds so that data bits at the start of the next block will have to be detected at a fast enough rate (for two milliseconds) before the output of multivibrator 332 goes low again.

It should be noted that were the pulse width of multivibrator 316 to remain at one millisecond no matter what the output of multivibrator 332, there would still be different timing intervals at the leading and trailing edges of the data blocks. However, multivibrator 316 would be re-triggered as long as upward transitions are detected within intervals of one millisecond. Consequently, if in a period of two milliseconds only two upward transitions were detected, the output of multivibrator 332 would go low to indicate the start of a block of data. This is a very unreliable criterion. The start of a data block should be indicated only when an orderly sequence of data bits is detected. This necessarily entails the presence of upward transitions at intervals of at most 200 microseconds. Multivibrators 316 and 332 together determine the start of a data block only if upward transistions are detected at intervals of at most 200 microseconds for a total period of two milliseconds. Thereafter, the only criterion for the end of the data block is the absence of an upward transition for one millisecond — determined by the extended pulse width of multivibrator 316. While there are three time intervals (200 microseconds, one millisecond and two milliseconds) which are of importance in determining the start and end of a data block, all three timing functions are accomplished with the use of only two retriggerable one-shot multivibrators by having the output of one of the multivibrators control the pulse width of the other.

V. THE TRACKING WINDOW 235

Figure 12:
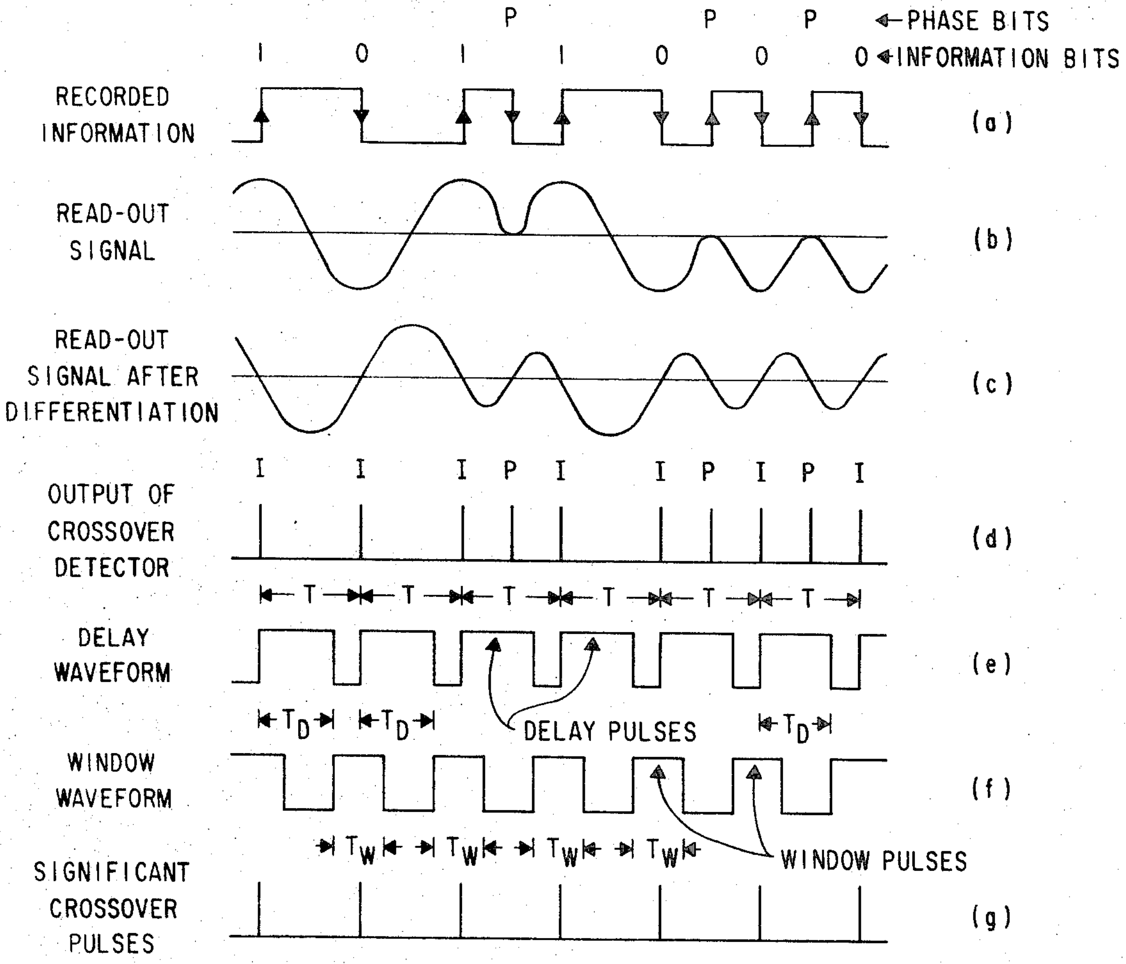
FIG. 12 depicts the relationship between the recorded information and various signals which are derived in typical data recovery systems.

FIG. 12 depicts the relationship between the information recorded on a tape and various signals which are derived in typical data recovery systems, and will be helpful in understanding the tracking window of the invention.

FIG. 12(*a*) depicts the manner in which information is recorded utilzing a phase modulation technique. Information bits are recorded at equally spaced intervals, with a transistion in one direction representing a binary 1 and a transition in the other direction representing a binary 0. It is apparent that if two bits of the same value are to be recorded in sequence, it is necessary for an intermediate transition to be made. The transition recorded in such an intermediate region is known as a phase bit, and is designated by the letter P in FIG. 12(*a*). The object of the data recovery circuit is to separate the significant (information) transitions from the non-significant (phase) transitions.

A typical read-out signal for the information depicted in FIG. 12(*a*) is shown in FIG. 12(*b*). The signal contains two basic frequencies: (*a*) a low-frequency signal which represents a digital code of 1010 . . . , and (*b*) a high-frequency signal (of twice the frequency) which represents the digital code 0000 . . . or 1111 . . . . The minima and maxima of the read-out signal occur whenever a magnetic transition moves past a read head.

What is usually done with the read-out signal of FIG. 12(*b*) is that it is differentiated as shown in FIG. 12(*c*). The differentiated signal has a zero crossing corresponding to every minimum and maximum of the read-out signal; the differentiated read-out signal thus has a zero crossing corresponding to every magnetic transition on the recording medium.

Typically, a crossover detector is used to detect the zero crossings in the differentiated read-out signal. As shown in FIG. 12(*d*), the pulses at the output of the crossover detector represent both information and phase bits. In FIG. 12(*d*) the letter I is indicative of an information bit and the letter P is indicative of a phase bit. The drawing also shows that the time period T separates successive information bits.

In order to isolate the information bits from the phase bits two pulse generators can be provided. The first generates a delay pulse of width $T_D$ (FIG. 12(*e*)). The detection of each information bit (significant zero crossing) triggers the delay pulse generator. At the trailing edge of each delay pulse, a window pulse generator is triggered (FIG. 12(*f*)). The window pulse width is designated $T_W$. It is seen in FIG. 12(*f*) that each window pulse brackets a respective information bit pulse at the output of the crossover detector. In effect, the window pulses enable the system to "look at" only the crossover detector pulses which are bracketed by the window. Consequently, the resulting pulse waveform shown in FIG. 12(*g*) consists of only the "significant" (information) crossover pulses of FIG. 12(*d*).

Although in the above description it has been assumed that the pulses at the output of the crossover detector are always of the same polarity and consequently no distinction is made between the two types (0 and 1) of information bits in the waveform of FIG. 12(*a*), it is understood that each significant crossover pulse (FIG. 12(*g*)) can be used together with the original read-out signal to determine the value of the respective information bit. (The manner in which the delay pulses are initially synchronized to the information bits as opposed to the phase bits, so that they can thereafter cause the system to ignore phase bits and thus allow the delay pulse generator to be triggered only by information bits, will be described below.)

It the data rate is constant then the two time periods $T_D$ and $T_W$ can be fixed. Typically, $T_D$ can be 0.75 of the time interval (T) between information bits, and $T_W$ can be half of this interval. Unfortunately, however, the data rate is rarely constant and this can introduce serious errors. For example, if the delay and window pulse widths remain constant and the time period between information bits increases by slightly more than 25 percent, it will be apparent from FIGS. 12(*d*)–(*f*) that each information bit will fall outside the window. For this reason the time window must be made to track the average data rate.

Figure 13:
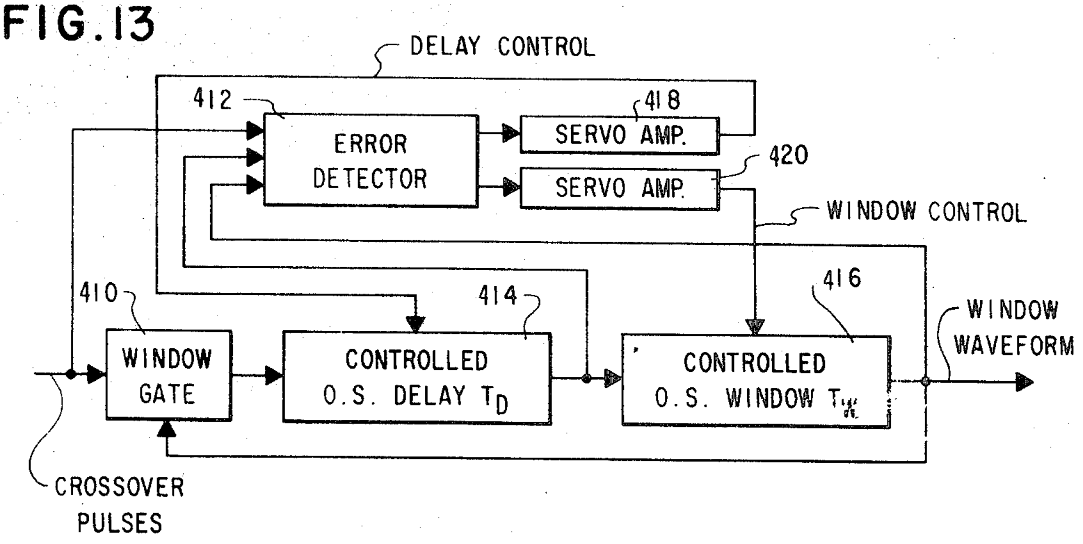
FIG. 13 depicts the principle of a tracking window.

This concept is illustrated in FIG. 13. Each crossover pulse is applied to the input of window gate 410. Assuming that the window waveform at the output of controlled one-shot multivibrator 416 is high when the cross-over pulse is received, window gate 410 is enabled and the crossover pulse is transmitted through the gate to one-shot multivibrator 414. This multivibrator is used to generate a delay pulse of duration $T_D$. The output of the multivibrator goes high and is of the form shown in FIG. 12(*e*). Each crossover pulse re-triggers the multivibrator. The trailing edge of each delay pulse triggers one-shot multivibrator 416 to generate a window pulse of width $T_W$, of the form shown in FIG. 12(*f*). The window pulses are used to enable gate 410.

Error detector 412 serves to develop two signals which are fed through respective servo amplifiers 418 and 420 to the control inputs of the two multivibrators. In effect, two feedback loops are provided, each loop controlling the width of the pulses generated by a respective one of the multivibrators. The inputs to error detector 412 are the cross-over pulses, the delay waveform and the window waveform (FIGS. 12(*d*)–12(*f*)). The error detector functions to compare the three intervals T, $T_D$ and $T_W$ and to vary the latter two so that each window pulse brackets a significant crossover pulse. The pulse widths of the two multivibrators can be controlled by the error detector by having the servo amplifiers apply appropriate signals to the delay control and window control conductors.

Figure 14:
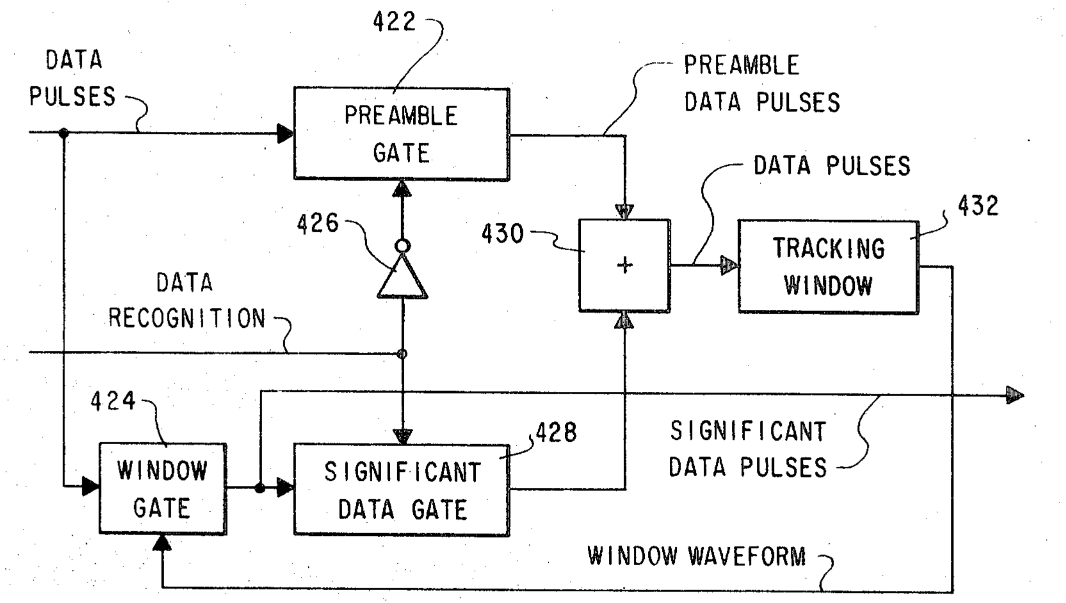
FIG. 14 is a block diagram of a generalized data recovery system utilizing a tracking window.

FIG. 14 depicts how a tracking window can be used in a generalized data recovery system. Although the blocks are not quite the same as those of FIG. 1, the functions performed are the same; the system as depicted in FIG. 14 is most convenient for a description of the fucntions controlled by the tracking window. Data pulses of opposite polarities are applied to the input of preamble gate 422 and the input of window gate 424. The data pulses consist of information bits of both polarities and phase bits of both polarities. When the recording medium first starts to move, it is necessary to synchronize the tracking window 432 to the recorded pulses. Before synchronization, it is difficult to distinguish between information bits and phase bits. For this reason a preamble is usually recorded at the start of each block of information on the record medium. Typically, the preamble can consist of a series of information bits of value 0. In such a case, referring to FIG. 12(*a*), alternate transitions will be detected at a rate of 2/T. The preamble gate is such that it passes only data pulses of the 0 polarity. Consequently, when preamble gate 422 is enabled, preamble data pulses appear at one input of summer 430 at the rate 1/T.

The data recognition conductor is low in potential until logic circuits (not shown) recognize information data (following the preamble). While the data recognition conductor is low, inverter 426 enables preamble gate 422. The preamble data pulses at the output of summer 430 are applied to the input of tracking window circuit 432. The tracking window circuit, which includes delay and window pulse generators, derives a window pulse waveform which is applied to the enable input of window gate 424. The window gate is thus enabled during time intervals which bracket the preamble data pulses. The preamble data pulses appear at the output of the window gate on the "significant data pulse" line. However, as long as significant data gate 428 is disabled, the preamble pulses are not transmitted through this gate to the other input of summer 430.

As soon as information data is recognized, the data recognition line goes high. At this time preamble gate 422 is disabled and significant data gate 428 is enabled. The pulses at the output of window gate 424 are now transmitted through significant data gate 428 to the other input of the summer, and are extended from the output of the summer to the input of tracking window circuit 432. Although information and phase bits of both polarities now appear at the input of window gate 424, the window waveform allows only information bits to be transmitted through the window gate and to appear on the significant data pulse line. In addition, only the information bits are transmitted through gate 428 to the summer input. Information bit pulses of either polarity trigger the delay multivibrator in tracking window circuit 432 and thus the system continues to allow only the information bits to be transmitted through window gate 424. Once the tracking window circuit is synchronized to preamble data bits, it remains synchronized to the information data bits when the data recognition signal goes high. However, this presuppoess that the window waveform is continuously varied in accordance with a changing data rate Referring to FIGS. 12(*d*)–(*f*), consider the relationship between the three time periods T, $T_D$ and $T_W$. Typically, $T_D = 0.75T$ and $T_W = 0.5T$. It follows that $dT_W = 0.5dT$, $dt_D = 0.75\ dT$, and $dT_W/T_W = dT_D/T_D = dT/T$. This latter relationship indicates that if the window pulse, which follows the delay pulse, is to bracket the next significant crossover pulse no matter what the value of T, then the percentage change in TW must equal the percentage change in $T_D$, and both of them must be equal to the percentage change in T. In other words, if T increases by 20 percent, then if the delay pulse width and the window pulse width both increase by 20 percent the window pulse will still not only have a duration equal to 0.5 T, but it will also bracket the next significant zero crossing.

A satisfactory tracking window circuit can thus be built if the percentage changes in $T_D$ and $T_W$ are made to follow the percentage change in T. However, it may be difficult to derive a signal which is dependent upon the percentage change in the data rate. In accordance with the principles of our invention, the necessary change in $T_D$ is effected without even operating upon a signal related directly to the data rate. Referring to FIG.12(*e*), suppose that the data rate decreases (T increases). If $T_D$ in FIG. 12(*e*) remains the same, it is apparent that the delay waveform will be low for a greater percentage of each complete cycle; the duty cycle of the delay waveform will decrease. If $T_D$ is to remain equal to 75 percent (or any other value) of T, then the duty cycle of the delay waveform must be kept constant. If the peak magnitude of the delay waveform is E, then the average value of the delay waveform is $(T_D/T)E$. Even if T increases, if the average value of the delay waveform is somehow kept constant, it will necessarily follow that $T_D$ will increase so that the ratio $T_D/T$ (the duty cycle) will remain constant. It is in this manner that the pulse width $T_D$ is automatically varied in accordance with the data rate; by keeping the average value of the delay waveform constant, the ratio $T_D/T$ is kept constant.

In a similar manner, in order to keep the ratio $T_W/T$ constant, all that is required is to keep the average value of the window waveform signal at a fixed level.

Referring back to FIG. 13, it will be apparent that a tracking window circuit can be constructed which consists of window gate 410, one-shot multivibrator 414, one-shot multivibrator 416, and two comparator circuits. The first comparator functions to compare the average value of the delay waveform at the output of multivibrator 414 to a first reference voltage, and to apply any error signal to the control terminal of the multivibrator. In such a manner, the average value of the delay waveform can be kept constant — if the average value falls below the reference voltage, then the error signal serves to increase the pulse width, and vice versa. Similarly, another comparator can be used in a feedback loop associated with one-shot multivibrator 416 to keep its duty cycle equal to the desired value.

In the preferred embodiment of the invention, however, only a single comparator is necessary — the same error signal can be used to control the period of each multivibrator. The pulse width T of a typical voltage-controlled one-shot multivibrator is given by the following equation: $T=k(e_c)^n$, where $n$ is typically +1 or −1 depending on the type of multivibrator utilized and $e_c$ is the control voltage. Taking the derivative of this equation, and then dividing the derivative by the expression for the pulse width, there results: $dT/T = n(de_c/e_c)$. The significance of this result is that the percentage change in the pulse width is seen to be equal to a percentage change in the control voltage. It will be recalled that for the proper operation of the system, $dT_WT_W = dT_d/T_d = dT/T$. Therefore, the same error signal which controls the proper change in $T_D$ or $T_W$ can be used to control the proper change in the other pulse width.

Figure 15:
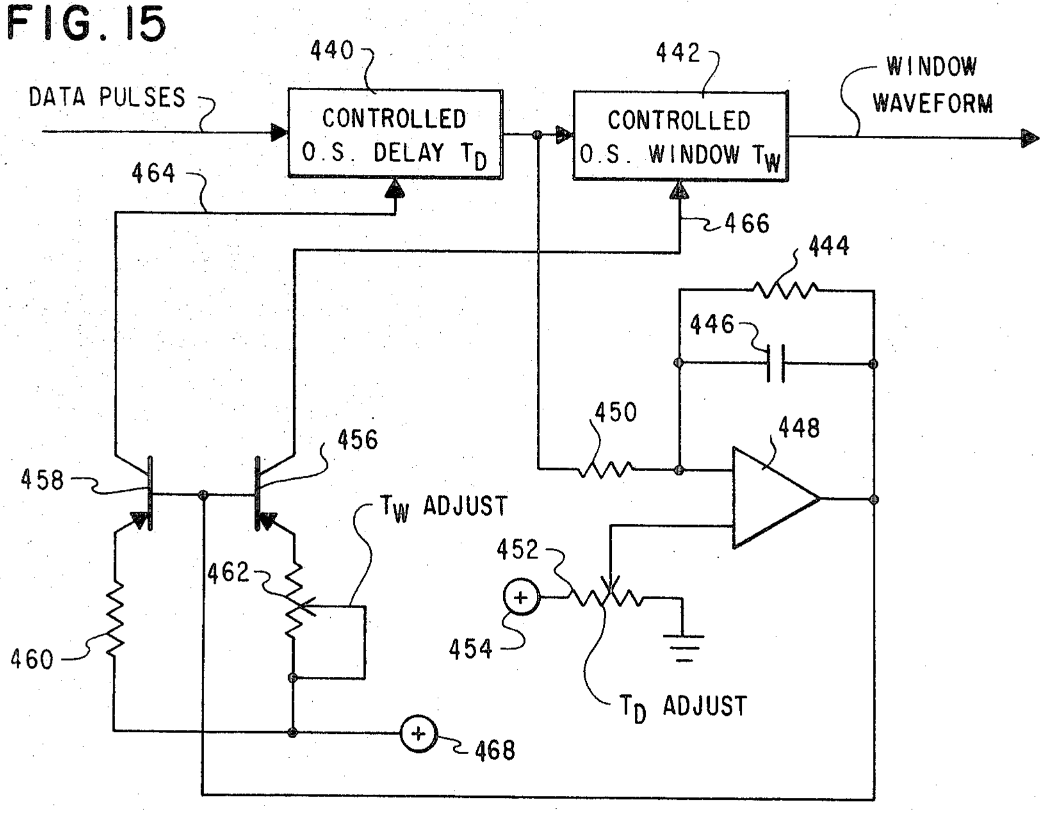
FIG. 15 depicts the tracking window circuit used in the tape system of the invention in which the two multivibrators are controlled by a common error signal.

A circuit for accomplishing this is shown in FIG. 15. Each data pulse applied to the input of multivibrator 440 produces a pulse at the output having a duration $T_D$. At the trailing edge of the pulse, multivibrator 442 is triggered and a window pulse of width $T_W$ is generated. The output of multivibrator 440 is extended through resistor 450 to one input of operational amplifier 448. Capacitor 446 and resistor 444, connected between one input of the operational amplifier and the output, serve to cause the operational amplifier to function as an integrater. The signal at that input of the operational amplifier connected to the feedback loop is proportional to the average value of the delay waveform. The other input of the multivibrator is connected to potentiometer 452, one end of which is grounded and the other end of which is connected to source 454. The output $e_c$ is dependent upon the difference between the two inputs.

The output is extended to the base of transistor 458. The emitter of this transistor is connected through resistor 460 to source 468. As the base voltage varies, the current delivered through transistor 458 to control conductor 464 varies. The feedback is such that the pulse width $T_D$ is continuously adjusted so that the average value of the delay waveform at the output of multivibrator 440 remains equal to the potential at the tap of potentiometer 452. Depending on the setting of the potentiometer (the $T_D$ adjust circuit), the duty cycle of multivibrator 440 remains fixed at the pre-set value, e.g., 75 percent. As described above, this is one of the two control functions which must be accomplished in order for the timing window to track the data rate.

The same error signal $e_c$ is applied to the base of transistor 456. The emitter of this transistor is extended through potentiometer 462 to source 468 and the collector of the transistor is connected over conductor 466 to the control input of multivibrator 442. The setting of potentiometer 462 (the $T_W$ adjust circuit) determines the nominal value of the pulse width of one-shot multivibrator 442 for the nominal data rate. Any change in the data rate results in a change in $e_c$, which in turn varies the current flow through transistor 456. This controls the pulse width of multivibrator 442 so that the duty cycle of the multivibrator also remains constant at the pre-set value (50 percent in the illustrative embodiment of the invention). It is not necessary to provide two separate feedback loops. The same comparator can be used to control two different constant duty cycles.

VI. THE COMMAND GENERATOR 513

Figures 16, 17, 18, 19:
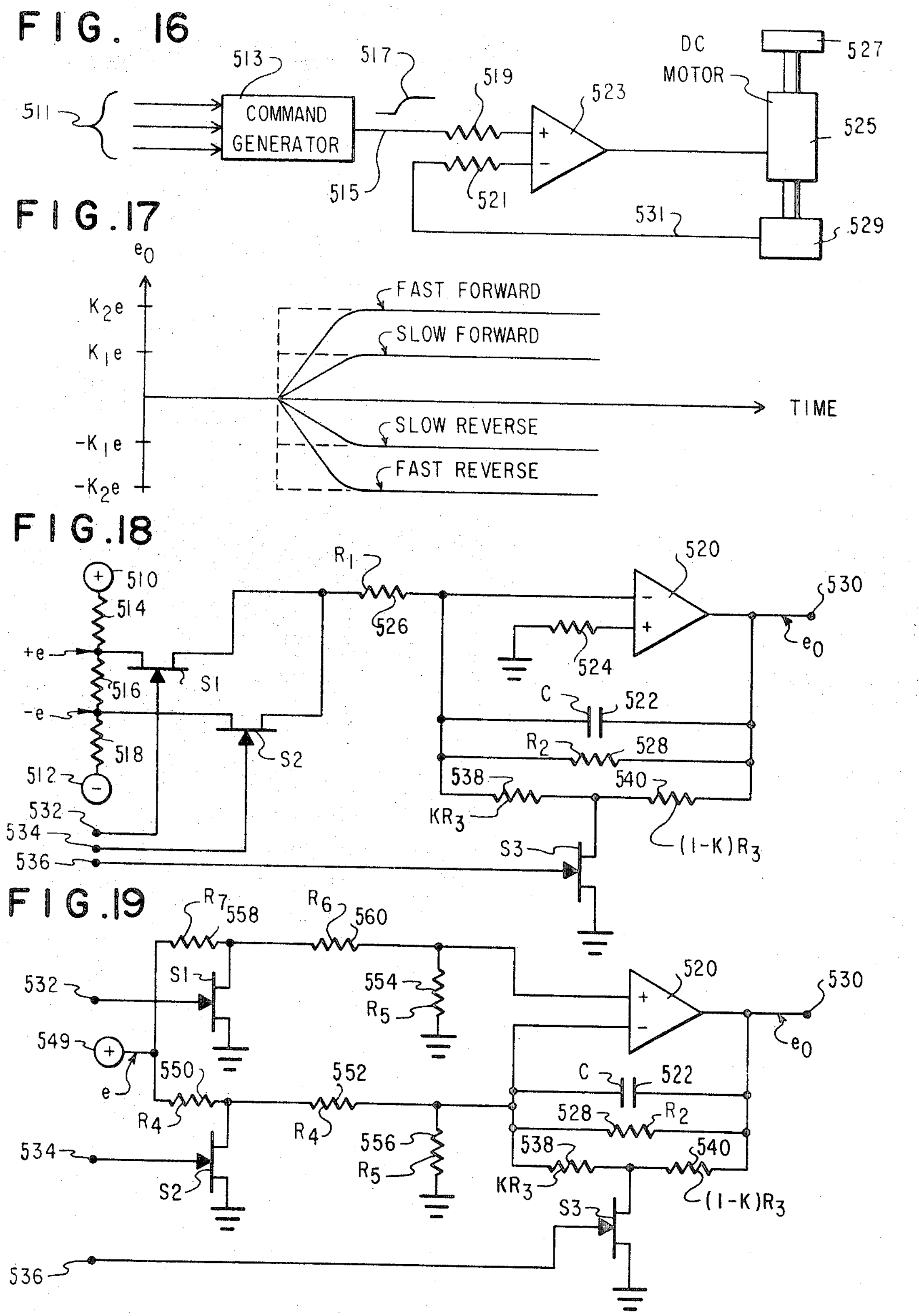
FIG. 16 depicts symbolically a typical servo controller having a DC command generator at its input.
FIG. 17 depicts typical smoothing functions required of the command generator.
FIG. 18 depicts a first DC command generator which can be used in the tape system of the invention.
FIG. 19 depicts a second DC command generator which can be used in the invention.

FIG. 16 depicts symbolically the servo amplifier 523 of FIG. 1 having a DC command generator 513 at its input. On FIG. 16, the amplifier is shown as driving a generalized motor 525. A single output shaft of the motor drives both capstan 527 and tachometer 529. The capstan moves the magnetic tape. The tachometer provides a signal on conductor 531 which is proportional to the motor speed.

The output of command generator 513 on conductor 515 is extended through resistor 519 to one input of the difference amplifier. The tachometer signal is extended through resistor 521 to the other input of the amplifier. This conventional feedback system results in a motor speed which is directly proportional to the level of the signal on conductor 515. DC command signals, as shown by the numeral 511, are applied to various inputs of command generator 513. The function of the command generator is to produce a DC signal on conductor 515 in accordance with the input command signals on conductors 511. The input command signals are step functions from control latches 208 (FIG. 1) which are used to derive a DC potential on conductor 515 whose polarity and magnitude represent the desired direction and speed of the motor. However, while the inputs may be step functions, the signal developed on conductor 515 should rise only gradually as shown by waveform 517. An abrupt step applied to the input of operational amplifier 523 might cause the motor to accelerate so rapidly that an unsafe stress would be applied to some of the system components.

FIG. 17 shows typical desirable output signals from the command generator. The dotted waveforms depict the form of the step commands which would result in the absence of a smoothing function. The step commands can be of either polarity and, in the illustrative embodiment of the invention, of either of two magnitudes (one for a slow speed and the other for a fast speed). In the case of a "slow-forward" command input, the output $e_o$ of the command generator rises to a level of $k_1e$. For a "fast-forward" command, the output rises to the level of $k_2e$. For "slow-reverse" and "fast-reverse" commands, the output signals are smoothed in similar fashions but the final signal levels are negative.

When the motor is to stop, the output of the command generator should go to ground — also without an abrupt change. Although all four of the speed signals are shown in FIG. 17 as starting from an "at rest" position, it should be understood that generally a transition may be made from any speed to any other speed. For example, it is possible to go from slow reverse to fast forward. In such a case, the output signal must rise from $-k_1e$ to $k_2e$ with a rise time comparable to those shown in the drawing. One of the problems with prior art circuits is that several different smoothing circuit and/or extensive logic circuits have been required to control smooth transitions from any signal level to any other signal level.

Referring to FIG. 18, resistors 514, 516 and 518 are connected in series between positive and negative supplies 510 and 512. A potential $+e$ is developed at the junction of resistors 514 and 516, and a potential $-e$ is developed at the junction of resistors 516 and 518. Each of the junctions is connected to the source of one of FET switches S1 and S2. The drains of the two transistors are connected together and to one end of resistor 526 which has a magnitude $R_1$. The other end of this resistor is connected to the minus input of operational amplifier 520. The gaete of each of the FET switches is connected to a respective one of terminals 532 and 534. A positive potential at one of the two terminals causes the rspective switch to turn on. The other (positive) input of the operational amplifier is connected to ground through resistor 524.

The output of the operational amplifier is connected to output terminal 530 at which output signal $e_o$, the smoothed command function, is formed. The output is also fed back through caacitor 522 and resistor 528 to the minus input of the operational amplifier. Resistor 528 has a magnitude $R_2$. In parallel with resistor 528 is a pair of series-connected resistors 538 and 540. The resistors in series have a total magnitude of $R_3$ ohms; resistor 538 has a magnitude $kR_3$ ohms and resistor 540 has a magnitude of $(1-k)R_3$ ohms, where $k$ is greater than 0 and less than 1. The junction of the two resistors is connected to the drain of FET switch S3, the source of which is grounded. The transistor is turned on when a positive potential is applied to control terminal 536.

The impedance seen looking out of the minus input of the operatioanl amplifier consists of resistors 526, 528 and 538 in parallel (assuming that switch S3 is turned on and the junction of resistors 538 and 540 is grounded). Although a ground potential is applied to the plus input of the operational amplifier, in order that equal impedances be connected to both inputs, the impedance of resistors 524 is made equal to the effective impedance presented by three resistors of magnitudes $R_1$, $R_2$ and $kR_3$ connected in parallel. (When switch S3 is open, the third component of the total impedance is $R_3$ rather than $kR_3$. However, this makes little difference since $R_3$ is relatively large in the first place, and $k$ can be made close to 1.)

When switch S1 is closed, a DC step of magnitude $e$ is applied through resistor $R_1$ to the minus input of the operational amplifier. Assuming that switch S3 is closed, resistors 538 and 540 are connected through the switch to ground. This simply means that there is an additional resistor connected at the input and an additional resistor connected at the output of the amplifier, but that neither resistor affects the circuit operation especially if the two resistors are large enough in magnitude. For an input step of $+e$ and an initial output level of $e_{oi}$, the following equation describes the manner in which the output signal $e_o$ changes from the initial level:

$$e_o = e_{oi} - (eR_2/R_1 + e_{oi})\,(1-\epsilon^{-t/\tau}),\ \tau = R_2C$$

At $t=0$, $e_o=e_{oi}$. After a sufficiently long time, when the term $\epsilon^{-t/\tau}$ is negligible compared to unity, $e_o=-e(R_2/R_1)$. The output falls with a time constant equal to $R_2C$.

Similarly, if switch S2 is closed rather than switch S1, then the signal level $-e$ is applied through resistor 526 to the minus input of the operational amplifier. In such a case, the output rises to the level $(R_2/R_1)\,(e)$ from any initial value.

On the other hand, suppose that switch S3 is opened, together with the closing of one of switches S1 or S2. In such a case, the junction of resistors 538 and 540 is no longer connected to ground. Instead, a total resistance of magnitude $R_3$ is connected in the feedback path in parallel with resistor $R_2$. In the equation defining the circuit operation, the magnitude $R_2$ must be replaced by the magnitude of the parallel impedances $R_2$ and $R_3$. Thus, the output signal rises or falls to a lesser magnitude of $(\pm e)\,(1/R_1)\,(R_3R_2/(R_3+R_2))$ with a time constant of $(R_3R_2/(R_3+R_2))C$. With switch S3 open, the output rises or falls to the slow forward or slow reverse level of FIG. 17, while with switch S3 closed the output rises or falls to the fast forward or fast reverse level.

It is the opening or closing of switch S3, together with the closing of only one of switches S1 or S2, that gives rise to the four different output levels of FIG. 17. In the event the motor is running and it is desired to stop it, all that is required is to close both switches S1 and S2 together. In such a case, the junctions of resistors 514 and 516, and resistors 516, and 518, are connected together through the two switches and consequently, assuming equal magnitudes for resistors 514 and 518 and equal magnitude potential sources, a ground signal is applied to the minus input of the operational amplifier. THe equation defining the system operation given above still applies, except that the value $e$ is now 0. Switch S3 should be left open or closed as it was following the previous command so that the rate of output signal change is the same as it was when the previous command was given. After the output goes to ground and the motor stops, switch S3 should be opened to that the effective feedback impedance is less than it is when the switch is closed; this stabilizes the output at the ground level.

The single capacitor in the circuit functions in two capacities — it is the smoothing element and it is 1lso a form of memory. The minus input of the operational amplifier is a virtual ground consequently the voltage across the capacitor is a measure of the output. Since the effective input to the operational amplifier is the sum of the level provided by one or both of switches S1 and S2, and the voltage across the capacitor, whenever a new DC command is provided to the amplifier, the actual input is a function of both the new command and the instantaneous (present) output. And since thee voltage across the capacitor cannot change instantaneously, the instantaneous input is dependent only upon the present output. Consequently, the output signal rises or falls, in a smoothed fashion as determined by the capacitor, from an initial value which is the present value of the output. There are no instantaneous jumps; the output always rises or falls from a level proportional to the present speed of the motor controlled by the output signal. The use of a single capacitor, even though different effective feedback impedances can be inserted in the circuit, insures that the initial charge on the capacitor always corresponds to the present speed of the motor. It is the use of split resistor $R_3$ which permits the same capacitor to be used with different feedback impedances. Simply by grounding the junction of resistors 539 and 540, resistor $R_3$ can be effectively removed from the circuit to provide a larger magnitude feedback impedance.

It should be controlled in accordance with the principles of our invention. For example, suppose that additional split resistors are connected across capacitor 522, each having a connection to ground through a switch such as S3. In such a case, if all of the switches are closed, the net effect is that all of the additional resistors can be ignored insofar as the circuit operation is concerned. However, if any one of the switches is opened, then the respective split resistor must be considered and the total feedback impedance is the parallel combination of resistor 528 and this resistance. By providing different magnitude split resistors, many different feedback impedances can be obtained. But no matter how the effective feedback impedance is changed, the same operational amplifier circuit can be used to control the output function because the capacitor voltage is always proportional to the present speed of the motor; it is always correctly initialized no matter what step functions are applied to the command generator.

It should be noted that although FET switches are shown in FIG. 18, it is possible to use diode bridges or any other comparable switches (e.g., relay circuits) to control the switches in and out of the feedback resistors and to control the polarity of the input signal.

The circuit of FIG. 19 is similar to that of FIG. 18 except that there is now only one source 549 of a command potential of magnitude e, switches S1 and S2 determining whether the command potential is applied to the plus or minus input of the operational amplifier. A resistor 554 or 556 of magnitude $R_5$ is connected between each of the inputs and ground. The minus input of the amplifier is connected through two resistors 550 and 552 to source 549, with the junction of the equal-magnitude ($R_4$) resistors being connected through switch S2 to ground. The plus input of the operational amplifier is similarly connected through two resistors 558 and 560 to source 549, the junction of the two resistors being connected through switch S1 to ground.

Depending on which of switches S1 and S2 is closed, different signals are applied to the plus and minus inputs of the operational amplifier, The controls equal but opposite potentials to be generated at the output of the operational amplifier. If perfect switches are employed, one of the junctions of resistors 558 and 560, and 550 and 552 can beconsidered to be grounded while the other can be considered to be completely isolated from ground. As a practical matter, a perfect ground cannot be made. For this reason, when one of the switches closes, it can be assumed that a small potential source is connected between the "grounded" junction and ground. This potential source can be considered to have a magnitude of$e'$. Assuming that resistors 554 and 556 aee equal in magnitude, the values of resistors 558 and 556 can be determined so that equal magnitude byt opposite polarity signals are generated at terminal 530 depending upon which of switches S1 and S2 is closed.

Suppose that switch S2 is left open and switch S1 is closed along with switch S3. With switch S1 closed, a potential source of magnitude $e'$ may be considered to be connected to the junction of resistors 558 and 560. The equation for the output signal level (after capacitor C has fully charged) is as follows, where the term $e_{o1}$ is the steady-state value of the output signal at terminal 530 when switch S1 is closed:

$$e_{o1} = -e(R_2/2R_4) + e'\,(R_5/R_5+R_6)\,(R_2)\,(R_5+2R_4/R_5(2R_4))$$

The output potential is derived by utilizing the principle of superposition, that is, by considering the effect on the output of each of the two input sources while the other is treated as a short to ground, and then adding the two effects. With respect to source 549 of magnitue $e$, it has no effect on the plus input of the operational amplifier since any signal extended through resistor 558 is shorted through switch S1 to ground. However, source 549 does cause a potential to be applied to the minus input of the amplifier. Resistor 556, connected to the minus input, can be ignored; although this resistor tends to cause a lower voltage level to be applied to the minus input, the resistor affects the feedback in a converse manner such that the ratio of the feedback impedance ($R_2$) to the impedance connected in series with the minus input ($2R_4$) represents the gain of the amplifier with the polarity of the output signal being inverted independent of the value of $R_5$. Thus, the effect of source 549 is to produce a potential component at the output terminal of $-e(R_2/2R_4)$.

With respect to the signal $e'$ extended to the plus input of the operational amplifier, resistor 554 cannot be ignored. The resistor tends to decrease the signal level applied to the plus input of the amplifier without having a converse effect on the feedback. Since signal source $e'$ (switch S1) is applied ot the plus input of the amplifier through resistors 560 and 554, by the voltage divider action the effective input is $e'(R_5/(R_5+R_6))$. The gain of an operational amplifier with respect to a signal applied to its plus input is the ratio of the feedback impedance ($R_2$) to the effective impedance presented by all elements connected to the minus input of the amplifier except the feedback resistor. With switch S2 open, the impedance seen looking out of the minus input terminal is resistor 556 in parallel with resistors 550 and 552 connected in series. Consequently, the $e'$ signal source contributes a component to the output potential as represented by the second term in the equation for $e_{o1}$.

Consider now the case where switch S2 is closed together with switch S3 and switch S1 is open. The output potential $e_{o2}$ is represented by the following equation:

$$e_{o2}=e(R_5/R_5+R_6+R_7)\ (R_2)\ (R_4+R_5/R_4+R_5)\ -e'\ (R_2/R_4)$$

With respect to source 549, it does not extend a voltage component to the minus input of the amplifier since switch S2 provides a short to ground. However, the signal is extended to the plus input of the amplifier. Again, resistor 554 must be considered in determining the actual value of the input to the amplifier as a result of its voltage divider relation with resistors 558 and 560. The magnitude of the signal applied to the plus input is e $(R5/(R_5+R_6+R_7))$. The gain of the amplifier is the ratio of the feedback impedance ($R_2$) to the impedance seen looking out of the minus input of the amplifier (excluding the feedback impedance). With switch S2 closed, this impedance is the parallel combination of resistors 552 and 556. Thus, source 549 contributes a component to the output potential as shown by the first term in the equation for $e_{o2}$. As for the component contributed by switch S2, since it is coupled to the minus input of the amplifier, the gain of the amplifier with respect to this input is simply $-(R_2/R_4)$.

Depending on which of switches S1 and S2 is closed, equal but opposite potentials are desired at the output terminal. To determine the magnitudes of resistors $R_6$ and $R_7$, assuming given magnitudes for impedances $R_4$ and $R_5$, it is necessary to equate $e_{o1}$ to $-e_{o2}$. This condition is satisfied if the respective coefficients of the terms $e$ and $e'$ in the two equations are equated. There results the following two equations:

$$(R_2/2R_4) = (R_5/R_5+R_6+R_7)\ (R_2)\ (R_4+R_5/R_4R_5)$$

$$R_5/R_5+R_6)\ (R_2)\ (R_5+2R_4/R_5(2R_4)) = (R_2/R_4)$$

If these two equations are solved there results the following equations for the two impedances $R_6$ and $R_7$, both of which are independent of $R_2$:

$$R_6 = R_4 - R_5/2$$

$$R_7 = R_4 + 3^R5/2$$

Because the two values are independent of $R_2$, equal but opposite polarity signals are derived at the output for both conditions of switch S3.

An error analysis, assuming slightly different values of $e'$ for switches S1 and S2, shows that $e_{o1}$ and $e_{o2}$ differ in magnitude by no more than a few tenths of a percent for all practical circuits. The advantage of the circuit of FIG. 19 is that it is not necessary to develop two precision voltages $+e$ and $-e$ as in the case of the circuit of FIG. 18. Although a feedback impedance of $R_2$ has been assumed in the analysis above, it is apparent that with a different feedback impedance if switch S3 is open, equal but opposite potentials at terminals 530 are still developed depending on which of switches S1 and S2 is closed. Furthermore, to get a zero output, all that is required is to close both of switches S1 and S2; because the magnitudes of the coefficients of both terms $e$ and $e'$ in the equations for $e_{o1}$ and $e_{o2}$ are equal, when both switches are closed the sum of $e_{o1}$ and $e_{o2}$ is zero.

Circuits designed in accordance with the principles of our invention provide accurate DC command signals with smoothed rise times; only a single integrator element is required for the smoothing functioning even though it is compatible with a large number of commands of either polarity. The circuits are thus of minimal complexity and yet provide complete command flexibility. Because the voltage across the capacitor is always representative of the servo output (e.g., speed of a motor), the command input can be changed at any time without encountering improper initial conditions on the integrator. Furthermore, the circuits provide a smoothing time constant which is matched to the magnitude of the command — the larger the desired output signal level, the larger the time constant.

Although the invention has been described with reference to particular embodiments, it is to be understood that these embodiment are merely illustrative of the application of the principles of the invention. Numerous modifications may be made therein and other arrangements may be devised without departing from the spirit and scope of the invention.

What we claim is:

1. A tape system comprising a tape deck, said tape deck having means for moving tape containing data thereon responsive, to the appliction thereto of command signals, means for reading data recorded on said tape, and means for guiding said tape past said reading means in proper alignment therewith; processing means for extending to said tape moving means commands representative of required motion of said tape; and means for generating a tracking window responsive to data bits read from said tape for identifying successive data bits read from said tape; said tracking window generating means including first means for generating a delay pulse responsive to the presence of each of successive data bits, second means responsive to the termination of each delay pulse for generating a window pulse, and means for controlling the duty cycle of each of said first and second generating means to remain constant.

2. A tape system in accordance with claim 1 further including gate means for extending said data bits to said first generating means, means for enabling the operation of said gate means responsive to the presence of a window pulse, and means for blocking data bits from being transmitted to said first generating means until after successive window pulses are synchronized to said data bits.

3. A tape system, in accordance with claim 2 further including means responsive to a predetermined data bit sequence for operating said blocking means and for applying said predetermined data bit sequence directly to said first generating means, and means responsive to the termination of said predetermined data bit sequence for inhibiting the operation of said applying means and for disabling the operation of said blocking means.

4. A tape system in accordance with claim 1 wherein each of said first and second generating means is a controlled one-shot multivibrator, and said controlling means includes means for comparing the average value of the output of one of said first and second generating means to a predetermined value and for developing an error signal proportional to the difference therebetween, and menas for extending said error signal to a pulse-width control input of each of said first and second generating means.

5. A tape system in accordance with claim 4 wherein said extending means includes first and second means each connected to a respective one of said first and second control inputs for applying control signals thereto, and means for effecting changes in both of said control signals which are directly proportional to the magnitude of said error signal.

6. A tape system in accordance with claim 5 further including means for adjusting said predetermined value to determine the duty cycle of said one of said first and second generating means, and adjusting bias means coupled to the control input of the other of said first and second generating means for determining the duty cycle of said other generating means.

7. A tape system in accordance with claim 1 wherein said controlling means includes feedback means responsive to the average value of the output waveform of one of said first and second generating means for causing said one generating means to provide an output waveform having a constant average value.

8. A tape system in accordance with claim 7 wherein said feedback means is also operative to cause the other of said first and second generating means to provide an output waveform having a constant value.

9. A tape system comprising a tape deck, said tape deck having means for moving tape containing data thereon responsive to the application thereto of command signals, means for reading data recorded on said tape, and means for guiding said tape past said reading means in proper alignment therewith; precessing means for generating step commands representative of required motion of said tape; means for smoothing said step commands to supply smoothed command signals to said tape moving means; means for generating a tracking window responsive to data bits read from said tape for identifying successive data bits read from said tape; and means for identifying the presence and absence of data blocks on said tape; said tracking window generating means including means for generating first and second related signals in synchronism with data read from said tape, and means for maintaining constant the duty cycles of said generating means.

10. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape; means for smoothing said step commands to supply smoothed command signals to said tape moving means; means for generating a tracking window responsive to data bits read from said tape for identifying successive data bits read from said tape; and means for identifying the presence and absence of data blocks on said tape; said tracking window generating means including first means for generating a delay interval responsive to the presence of each of successive data bits read from said tape, second means responsive to the termination of each delay interval for generating a window pulse, and means for controlling the duty cycle of said first generating means to remain constant.

11. A tape system in accordance with claim 10 wherein said controlling means includes feedback means responsive to the average value of the output waveform of said first generating means for causing said first generating means to provide an output waveform having a constant average value.

12. A tape system in accordance with claim 11 wherein said feedback means is also operative to cause said second generating means to provide an output waveform having a constant value.

13. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape; and means for smoothing said step commands to supply smoothed command signals to said tape moving means; said smoothing means including an operational amplifier having at least one input terminal and an output terminal, said output terminal being coupled to said tape moving means, means for applying a step command to said at least one input terminal, capacitor means connected in a feedback configuration with said operational amplifier, and variable resistance means connected in parallel with said capacitor means.

14. A tape system in accordance with claim 13 wherein said variable resistance means includes at least one resistance means connected between input and output terminals of said operational amplifier, and switch means operative to effectively prevent said at least one resistance means from performing a feedback function.

15. A tape system in accordance with claim 14 wherein said variable resistance means further includes a resistor of predetermined magnitude permanently connected between said input and output terminals.

16. A tape system in accordance with claim 15 wherein said step command applying means selectively applies a step function of either polarity to said at least one input terminal.

17. A tape system in accordance with claim 15 wherein said at least one resistance means includes a pair of series-connected resistors, said switch means being operative to selectively short the junction of said pair of resistors to ground.

18. A tape system in accordance with claim 17 wherein said step command applying means selectively applies a step function of either polarity to said at least one input terminal.

19. A tape system in accordance with claim 15 wherein said operational amplifier has two input terminals, and said step command applying means includes source of potential and gating means for selectively coupling said source of potential to a selected one of said input terminals and coupling the other of said input terminals to ground.

20. A tape system in accordance with claim 19 wherein said gating means is further operative to selectively couple both of said input terminals to ground to cause a ground potential to appear at said output terminal.

21. A tape system in accordance with claim 14 wherein said at least one resistance means includes a pair of series-connected resistors, said switch means being operative to selectively short the junction of said pair of resistors to ground.

22. A tape system in accordacne with claim 14 wherein said step command applying means selectively applies a step function of either polarity to said at least one input terminal.

23. A tape system in accordance with claim 14 wherein said step command applying means includes two output terminals having opposite polarity potentials thereon and gating means for selectively coupling a selected one of said output terminals to said at least one input terminal to determine the polarity of the signal at said operational amplifier output terminal.

24. A tape system in accordance with claim 23 wherein said gating means is further operative to selectively couple both of said step command applying means output terminals to said at least one input terminal to cause a ground potential to appear at said operational amplifier output terminal.

25. A tape system comprising a tape deck, said tape deck having means for moving tape containing data thereon responsive to the application thereto of command signals, means for reading data recorded recorded on said tape, and means for guiding said tape past said reading means in proper alignment therwith; processing means for extending to said tape moving means commands representative of required motion of said tape; and means for identifying the presence and absence of data blocks on said tape; said identifying means including first circuit means having two states; said first circuit means normally being in a first state, being responsive to a data bit for switching to a second state, and normally remaining in said second state for T1A seconds after the last data bit; second circuit means having two states; said second circuit means normally being in a first state; means for placing said second circuit means in a second state, said second circuit means thereafter remaining in its second state until said first circuit means has been switched to and remained in its second state for T2 seconds; and means responsive to said second circuit means being in its first state for causing said first circuit means to remain in its second state for T1B seconds rather than T1A seconds after the last data bit.

26. A tape system in accordance with claim 25 wherein T2 is greater than T1B and T1B is greater than T1A.

27. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape; means for smoothing said step commands to supply smoothed command signals to said tape moving means; means for generating a tracking window responsive to data bits read from said tape for identifying successive data bits read from said tape; and means for identifying the presence and absence of data blocks on said tape; said identifying means including first and second re-triggerable one-shot multivibrator means, said first multivibrator means being responsive to a data bit for generating at its output a first pulse of a width dependent upon the presence or absence of a pulse multivibrator means being operative to generate a second pulse at its output which begins at the trailing edge of said first pulse and terminates after a predetermined time interval has elapsed following the leading edge of said first pulse.

28. A tape system in accordance with claim 27 wherein the absence of a pulse at the output of said second multivibrator means controls the width of the pulse generated by said first multivibrator means to be greater than the width of the pulse generated by said first multivibrator means in the presence of a pulse at the output of said second multivibrator means.

29. A tape system in accordance with claim 28 wherein the shorter of the two pulse widths generated by said first multivibrator means is related to the normal rate of the data bits read from said tape, said predetermined time interval is related to the time interval during which data bits should be detected at a normal rate to indicate the start of a data block, and the longer of the two pulse widths generated by said first multivibrator means is related to the time interval during which no data bit should be detected to indicate the end of a data block.

30. A tape system in accordance with claim 27 wherein the shorter of the two pulse widths generated by said first multivibrator means is related to the normal rate of the data bits read from said tape, said predetermined time interval is related to the time interval during which data bits should be detected at a normal rate to indicate the start of a data block, and the longer of the two pulse widths generated by said first multivibrator means is related to the time interval during which no data bit should be detected to indicate the end of a data block.

31. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape; means for smoothing said step commands to supply smoothed command signals to said tape moving means; means for generating a tracking window responsive to data bits read from said tape for identifying successive data bits read from said tape; and means for identifying the presence and absence of data blocks on said tape; said identifying means including first and second signal generating means, said first signal generating means being responsive to an input signal for generating at its output a first signal having a duration dependent upon the presence or absence of a signal at the output of said second signal generating means, said second signal generating means being operative to generate a second signal at its output which is a function of said first signal.

32. A tape system in accordance with claim 31 wherein each of said first and second signal is a two-value signal.

33. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape; means for smoothing said step commands to supply smoothed command signals to said tape moving means; means for generating a tracking window responsive to data bits read from said tape for identifying successive data bits read from said tape; and means for identifying the presence and absence of data blocks on said tape; said identifying means including first re-triggerable one-shot multivibrator means responsive to the presence of a data bit for generating at its output a first signal of predetermined duration, second re-triggerable one-shot multivibrator means for generating at its output a second signal of greater duration, and means for continuously applying trigger pulses to said second one-shot multivibrator means only in the absence of said first signal at the output of said first one-shot multivibrator means.

34. A tape system in accordance with claim 33 further including means responsive to the absence of said second signal at the output of said second one-shot multivibrator means for indicating the presence of a data block.

35. A tape system in accordance with claim 34 wherein the predetermined duration of said first signal exceeds the normal time interval between successive data bits read from said tape, and the time interval between successive trigger pulses is less than the duration of said first signal.

36. A tape system in accordance with claim 33 wherein the predetermined duration of said first signal exceeds the normal time interval between successive data bits read from said tape, and the time interval between successive trigger pulses is less than the duration of said first signal.

37. A tape system comprising a tape deck, said tape deck having means for moving tape containing data thereon responsive to the application thereto of command signals, means for reading data recorded on said tape, and means for guiding said tape past said reading means in proper allgnment therewith; processing means for generating step commands representative of required motion of said tape; means for smoothing said step commands to supply smoothed command signals to said tape moving means; means for generating a tracking window responsive to data bits read from said tape for identifying successive data bits read from said tape; and means for identifying the presence and absence of data blocks on said tape; said identifying means including first means for maintaining a first signal at its output as long as successive data bits are received within a first predetermined time interval, means for generating trigger pulses at a pre-set rate only in the absence of said first signal at the output of said first means, and second means for maintaining a second signal at its output as long as successive trigger pulses are generated within a second predetermined time interval.

38. A tape system in accordance with claim 37 further including means responsive to the absence of said second signal at the output of said second means for indicating the presence of a data bit sequence.

39. A tape system in accordance with claim 38 wherein said second predetermined time interval exceeds said first predetermined time interval.

40. A tape system in accordance with claim 39 wherein said trigger pulses, when generated, occur at intervals shorter than said first predetermined time interval.

41. A tape system in accordance with claim 40 further including means responsive to the absence of said second signal at the output of said second means for extending said first predetermined time interval.

42. A tape system in accordance with claim 39 further including means responsive to the absence of said second signal at the output of said second means for extending said first predetermined time interval.

43. A tape system in accordance with claim 37 wherein said second predetermined time interval exceeds said first predetermined time interval.

44. A tape system in accordance with claim 43 wherein said trigger pulses, when generated, occur at intervals shorter than said first predetermined time interval.

45. A tape system in accordance with claim 44 further including means responsive to the absence of said second signal at the output of said second means for extending said first predetermined time interval.

46. A tape system in accordance with claim 37 further including means responsive to the absence of said second signal at the output of said second means for extending said first predetermined time interval.

47. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape; means for smoothing said step commands to supply smoothed command signals to said tape moving means; means for generating a tracking window responsive to data bits read from said tape for identifying successive data bits read from said tape; and means for identifying the presence and absence of data blocks on said tape.

48. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape, means for smoothing said step commands to supply smoothed command signals to said tape moving means; and means for identifying the presence and absence of data blocks on said tape; said smoothing means including an operational amplifier having at least one input terminal and an output terminal, said output terminal being coupled to said tape moving means, means for applying a step command to said at least one input terminal, capacitor means connected in a feedback configuration with said operational amplifier, and variable resistance means connected in parallel with said capacitor means; said identifying means including first and second re-triggerable one-shot multivibrator means, said first multivibrator means being responsive to a data bit for generating at its output a first pulse of a width dependent upon the presence or absence of a pulse at the output of said second multivibrator means, said second multivibrator means being operative to generate a second pulse at its output which begins at the trailing edge of said first pulse and terminates after a predetermined time interval has elapsed following the leading edge of said pulse.

49. A tape system comprising a tape deck, said tape deck having means for moving tape containing data thereon responsive to the application thereto of command signals, means for reading data recorded on said tape, and means for guiding said tape past said reading means in proper alignment therewith; processing means for extending to said tape moving means commands representative of required motion of said tape; means for generating a tracking window responsive to data bits read from said tape for identifying the presence and absence of data blocks on said tape; said tracking window generating means including first means for generating a delay interval responsive to the presence of each of successive data bits read from said tape, second means responsive to the termination of each delay interval for generating a window pulse, and means for controlling the duty cycle of said first generating means to remain constant; said identifying means including first and second re-triggerable one-shot multivibrator means, said first multivibrator means being responsive to a data bit for generating at its output a first pulse of a width dependent upon the presence or absence of a pulse at the output of said second multivibrator means, said second multivibrator means being operative to generate a second pulse at its output which begins at the trailing edge of said first pulse and terminates after a predetermined time interval has elapsed following the leading edge of said first pulse.

50. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape; means for smoothing said step commands to supply smoothed command signals to said tape moving means; and means for generating a tracking window responsive to data bits read from said tape for identifying successive data bits read from said tape; said smoothing means including an operational amplifier having at least one input terminal and an output terminal, said output terminal being coupled to said tape moving means, means for applying a step command to said at least one input terminal, capacitor means connected in a feedback configuration with said operational amplifier, and variable resistance means connected in parallel with said capacitor means; said tracking window generating means including first means for generating a delay interval responsive to the presence of each of successive data bits read from said tape, second means responsive to the termination of each delay interval for generating a window pulse, and means for controlling the duty cycle of said first generating means to remain constant.

51. A tape system comprising a tape deck, said tape deck having means for moving tape containing data thereon responsive to the application thereto of command signals, means for reading data recorded on said tape, and means for guiding said tape past said reading means in proper alignment therewith; processing means for extending to sad tape moving means commands representative of required motion of said tape; and means for generating a tracking window responsive to data bits read from said tape for identifying successive data bits read from said tape; said tape deck being adapted to operate on tape contained in a cartridge and further including loading means for containing a cartridge and movable between loaded and unloaded positions; said tracking window generating means including first means for generating a delay interval responsive to the presence of each of successive data bits read from said tape, second means responsive to the termination of each delay interval for generating a window pulse, and means for controlling the duty cycle of said first generating means to remain constant.

52. A tape system comprising a tape deck, said tape deck having means for moving tape containing data thereon responsive to the application thereto of command signals, means for reading data recorded on said tape, and means for guiding said tape past said reading means in proper alignment therewith; processing means for extending to said tape moving means commands representative of required motion of said tape; and means for identifying the presence and absence of data blocks on said tape; said tape deck being adapted to operate on tape contained in a cartridge and further including loading means for containing a cartridge and movable between loaded and unloaded positions; said identifying means including first and second re-triggerable one-shot multivibrator means, said first multivibrator means being responsive to a data bit for generating at its output a first pulse of a width dependent upon the presence or absence of a pulse at the output of said second multivibrator means, said second multivibrator means being operative to generate a second pulse at its output which begins at the trailing edge of said first pulse and terminates after a predetermined time interval has elapsed following the leading edge of said first pulse.

53. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape; and means for smoothing said step commands to supply smoothed command signals to said tape moving means; said tape deck being adapted to operate on tape contained in a cartridge and further including loading means for containing a cartridge and movable between loaded and unloaded positions; said smoothing means including an operational amplifier having at least one input terminal and an output terminal, said output terminal being coupled to said tape moving means, means for applying a step command to said at least one input terminal, capacitor means connected in a feedback configuration with said operational amplifier, and variable resistance means connected in parallel with said capacitor means.

54. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape; and means for smoothing said step commands to supply smoothed command signals to said tape moving means; said guiding means including at least a pair of tape guide means each for providing a guide surface only for a respective edge of said tape; said tape deck being adapted to operate on tape contained in a cartridge and further including loading means for containing a cartridge and movable between loaded and unloaded positions; said smoothing means including an operational amplifier having at least one input terminal and an output terminal, said output terminal being coupled to said tape moving means, means for applying a step command to said at least one input terminal, capacitor means connected in a feedback configuration with said operational amplifier, and variable resistance means connected in parallel with said capacitor means.

55. A tape system comprising a tape deck, said tape deck having means for moving tape containing data thereon responsive to the application thereto of command signals, means for reading data recorded on said tape, and means for guiding said tape past said reading means in proper alignment therewith; processing means for extending to said tape moving means commands representative of required motion of said tape; and means for generating a tracking window responsive to data bits read from said tape for identifying successive data bits read from said tape; and guiding means including at least a pair of tape guide means each for providing a guide surface only for a respective edge of said tape; said tape deck being adapted to operate on tape contained in a cartridge and further including loading means for containing a cartridge and movable between loaded an unloaded positions; said tracking window generating means including first means for generating a delay interval responsive to the presence of each of successive data bits read from said tape, second means responsive to the termination of each delay interval for generating a window pulse, and means for controlling the duty cycle of said first generating means to remain constant.

56. A tape system comprising a tape deck, said tape deck having means for moving tape containing data thereon responsive to the application thereto of command signals, means for reading data recorded on said tape, and means for guiding said tape past said reading means in proper alignment therewith; processing means for extending to said tape moving means commands representative of required motion of said tape; and means for identifying the presence and absence of data blocks on said tape; said guiding means including at least a pair of tape guide means each for providing a guide surface only for a respective edge of said tape; said tape deck being adapted to operate on tape contained in a cartridge and further including loading means for containing a cartridge and movable between loaded and unloaded positions; said identifying means including first and second re-triggerable one-shot multivibrator means, said first multivibrator means being responsive to a data bit for generating at its output a first pulse of a width dependent upon the presence or absence of a pulse at the output of said second multivibrator means, said second multivibrator means being operative to generate a second pulse at its output which begins at the trailing edge of said first pulse and terminates after a predetermined time interval has elapsed following the leading edge of said first pulse.

57. A tape system comprising a tape deck, said tape deck having means for moving tape containing data thereon responsive to the application thereto of command signals, means for reading data recorded on said tape, and means for guiding said tape past said reading means in proper alignment therewith; processing means for generating step commands representative of required motion of said tape; means for smoothing said step commands to supply smoothed command signals to said tape moving means; means for generating a tracking window responsive to data bits read from said tape for identifying successive data bits read from said tape; and means for identifying the presence and absence of data blocks on said tape; said smoothing means including an operational amplifier having at least one input terminal and an output terminal, said output terminal being coupled to said tape moving means, means for applying a step command to said at least one input terminal, capacitor means connected in a feedback configuration with said operational amplifier, and variable resistance means connected in parallel with said capacitor means; said tracking window generating means including first means for generating a delay interval responsive to the presence of each of successive data bits read from said tape, second means responsive to the termination of each delay interval for generating a window pulse, and means for controlling the duty cycle of said first generating means to remain constant; said identifying means including first and second re-triggerable one-shot multivibrator means, said first multivibrator means being responsive to a data bit for generating at its output a first pulse of a width dependent upon the presence or absence of a pulse at the output of said second multivibrator means, said second multivibrator means being operative to generate a second pulse at its output which begins at the trailing edge of said first pulse and terminates after a predetermined time interval has elapsed following the leading edge of said first pulse.

58. A tape system in accordance with claim 57 wherein said tape deck is adapted to operate on tape contained in a cartridge and further including loading means for containing a cartridge and movable between loaded and unloaded positions.

59. A tape system in accordance with claim 58 wherein said tape deck further includes means for aligning a cartridge for proper tape movement when said loading means is in its loaded position.

60. A tape system comprising first and second reel means each for wrapping tape therearound starting from respective ends of the tape, first and second motor means for applying torques to respective ones of said first and second reel means in respective directions which oppose each other with respect to movement of said tape between said first and second reel means, means disposed between said first and second reel means for engaging and moving said tape in a selected direction so that one of said first and second reel means turns to wrap tape therearound and the other of said first and second reel means turns in opposition to the torque applied thereto to allow tape to be withdrawn therefrom, and means operative when said tape is moved by said tape moving means for increasing the torque applied by that one of said first and second motor means which is associated with said one reel means.

61. A tape system in accordance with claim 60 further including means responsive to a predetermined maximum amount of tape being wrapped around said first reel means during motion of said tape for disabling the operation of said tape moving means and for controlling an increased torque to be applied by said second motor means.

62. A method for operating a tape system comprising the steps of moving a tape containing data thereon responsive to command signals, reading data recorded on said tape, generating step commands representative of required motion of said tape, smoothing said step commands to derive smoothed command signals, generating a tracking window responsive to data bits read from said tape for identifying successive data bits read from said tape, and identifying the presence and absence of data blocks on said tape.

* * * * *